(12) United States Patent
Shetty et al.

(10) Patent No.: US 11,422,280 B2
(45) Date of Patent: Aug. 23, 2022

(54) METHOD FOR DETERMINING PROPERTIES OF A THINLY LAMINATED FORMATION BY INVERSION OF MULTISENSOR WELLBORE LOGGING DATA

(71) Applicant: SCHLUMBERGER TECHNOLOGY CORPORATION, Sugar Land, TX (US)

(72) Inventors: Sushil Shetty, Arlington, MA (US); Qiwei Zhan, Durham, NC (US); Lin Liang, Belmont, MA (US); Austin Boyd, Cambridge, MA (US); Smaine Zeroug, Lexington, MA (US); Vanessa Simoes, Rio de Janeiro (BR); Fabio Cesar Canesin, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 345 days.

(21) Appl. No.: 16/612,320

(22) PCT Filed: Apr. 23, 2018

(86) PCT No.: PCT/US2018/028826
§ 371 (c)(1),
(2) Date: Nov. 8, 2019

(87) PCT Pub. No.: WO2018/204110
PCT Pub. Date: Nov. 8, 2018

(65) Prior Publication Data
US 2020/0096663 A1     Mar. 26, 2020

Related U.S. Application Data

(60) Provisional application No. 62/502,239, filed on May 5, 2017.

(51) Int. Cl.
*G01V 1/50* (2006.01)
*E21B 43/02* (2006.01)
(Continued)

(52) U.S. Cl.
CPC ............... *G01V 1/50* (2013.01); *E21B 43/02* (2013.01); *E21B 47/005* (2020.05);
(Continued)

(58) Field of Classification Search
CPC . G01V 1/50; G01V 11/00; G01V 1/40; G01V 2210/6244; G01V 2210/6246; E21B 47/005; E21B 49/003
See application file for complete search history.

(56) References Cited

U.S. PATENT DOCUMENTS 6,493,632 B1 * 12/2002 Mollison .................. G01V 3/28
702/2
6,686,736 B2 * 2/2004 Schoen ..................... G01V 3/32
324/303
(Continued)

FOREIGN PATENT DOCUMENTS

WO        2016123014 A1      8/2016

OTHER PUBLICATIONS

Allioli, F. et al., "A New Approach to Computing Formation Density and Pe Free of Mudcake Effects", SPWLA 38th Annual Logging Symposium, Houston, Texas, U.S.A., 1997, 14 pages.
(Continued)

*Primary Examiner* — Ian J Lobo
(74) *Attorney, Agent, or Firm* — Trevor G. Grove

(57) ABSTRACT

A method for determining properties of a laminated formation traversed by a well or wellbore employs measured sonic data, resistivity data, and density data for an interval-of-interest within the well or wellbore. A formation model that describe properties of the laminated formation at the inter-
(Continued)

val-of-interest is derived from the measured sonic data, resistivity data, and density data for the interval-of-interest. The formation model represents the laminated formation at the interval-of-interest as first and second zones of different first and second rock types. The formation model is used to derive simulated sonic data, resistivity data, and density data for the interval-of-interest. The measured sonic data, resistivity data, and density data for the interval-of-interest and the simulated sonic data, resistivity data, and density data for the interval-of-interest are used to refine the formation model and determine properties of the formation at the interval-of-interest. The properties of the formation may be a radial profile for porosity, a radial profile for water saturation, a radial profile for gas saturation, radial profile of oil saturation, and radial profiles for pore shapes for the first and second zones (or rock types).

17 Claims, 37 Drawing Sheets

(51) Int. Cl.
  *E21B 49/00* (2006.01)
  *E21B 47/005* (2012.01)
(52) U.S. Cl.
  CPC .... *E21B 49/003* (2013.01); *G01V 2210/6244* (2013.01); *G01V 2210/6246* (2013.01)

(56) References Cited

U.S. PATENT DOCUMENTS

| | | | |
|---|---|---|---|
| 7,526,413 B2* | 4/2009 | Dahlberg | G01V 11/00 703/2 |
| 7,676,353 B2* | 3/2010 | Bradford | G01V 1/40 703/10 |
| 10,365,405 B2 | 7/2019 | Shetty et al. | |
| 2003/0222651 A1 | 12/2003 | Tabanou | |
| 2006/0042369 A1 | 3/2006 | Al-Ruwaili | |
| 2006/0287201 A1 | 12/2006 | Georgi et al. | |
| 2009/0043510 A1 | 2/2009 | Allen et al. | |

OTHER PUBLICATIONS

Clavaud, J.-B. et al., "Field Example of Enhanced Hydrocarbon Estimation in Thinly Laminated Formation with Triaxial Array Induction Tool: A Laminated Sand-Shale Analysis and Anisotropic Shale", SPWLA 46th Annual Logging Symposium, 2005, 15 pages.
Habashy, T. M. et al., "A General Framework for Constraint Minimization for the Inversion of Electromagnetic Measurements", Progress in Electromagnetics Research, 2004, 46, pp. 265-312.
Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.
Rosthal, R. et al., "Field Test of an Experimental Fully-Triaxial Induction Tool", Paper QQ, SPWLA 44th Annual Logging Symposium, Galveston, Texas, 2003, 14 pages.
Wang, G. L. et al., "Fast simulation of triaxial borehole induction measurements acquired in axially symmetrical and transversley isotropic media", Geophysics, 2009, 74(6), 17 pages.
Search Report and Written Opinion of International Patent Application No. PCT/US2018/028826 dated Jul. 31, 2018, 17 pages.
International Preliminary Report on Patentability of International Patent Application No. PCT/US2018/028826 dated Nov. 14, 2019, 14 pages.
Xu, S. and White, R.E., "A new velocity model for clay-sand mixtures", Geophysical prospecting, 1995, 43(1), pp. 91-118.
Hornby B.E. et al., "Anisotropic effective medium modeling of the elastic properties of shales", Geophysics, 1994, 59 (10), 1570-1583.
Durr, O., et al., "Effective medium theory of conduction in stretched polymer electrolytes" The Journal of Physical Chemistry B, 2002, 106(24), pp. 6149-6155.
Tang, X.M., Cheng, C.H.A. and Cheng, A., 2004. Quantitative borehole acoustic methods (vol. 24). Elsevier, pp. 44, 64 and 157-168.
Mura, "Harmonic Eigenstrains" In Micromechanics of defects in solids, 2nd ed., ser. Mechanics of Elastic and Inelastic Solids, Springer, Netherlands, 1987, Chapter 3.20, p. 139.
Mavko, et al., "Elastic Constants in Finely Layered Media: Backus Average" In The Rock Physics Handbook: Tools for Seismic Analysis of Porous Media, Cambridge University Press, 2009, Chapter 4.13, p. 210.
Zeroug et al., 2006, Monopole Radial Profiling of Compressional Slowness, Society of Exploration Geophysicists, Paper presented at the 2006 SEG Annual Meeting, Oct. 1-6, 2006 (5 pages).

\* cited by examiner

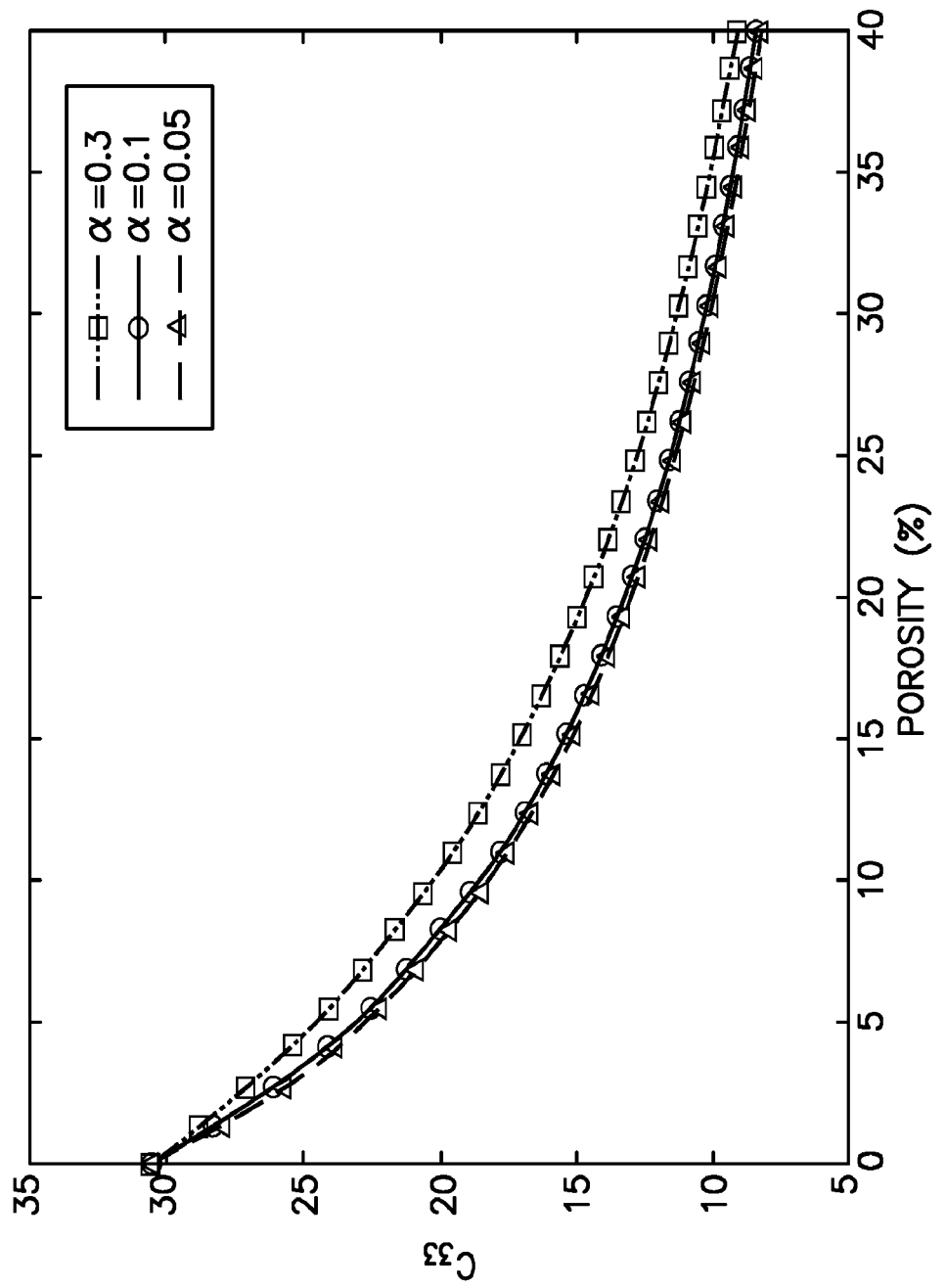

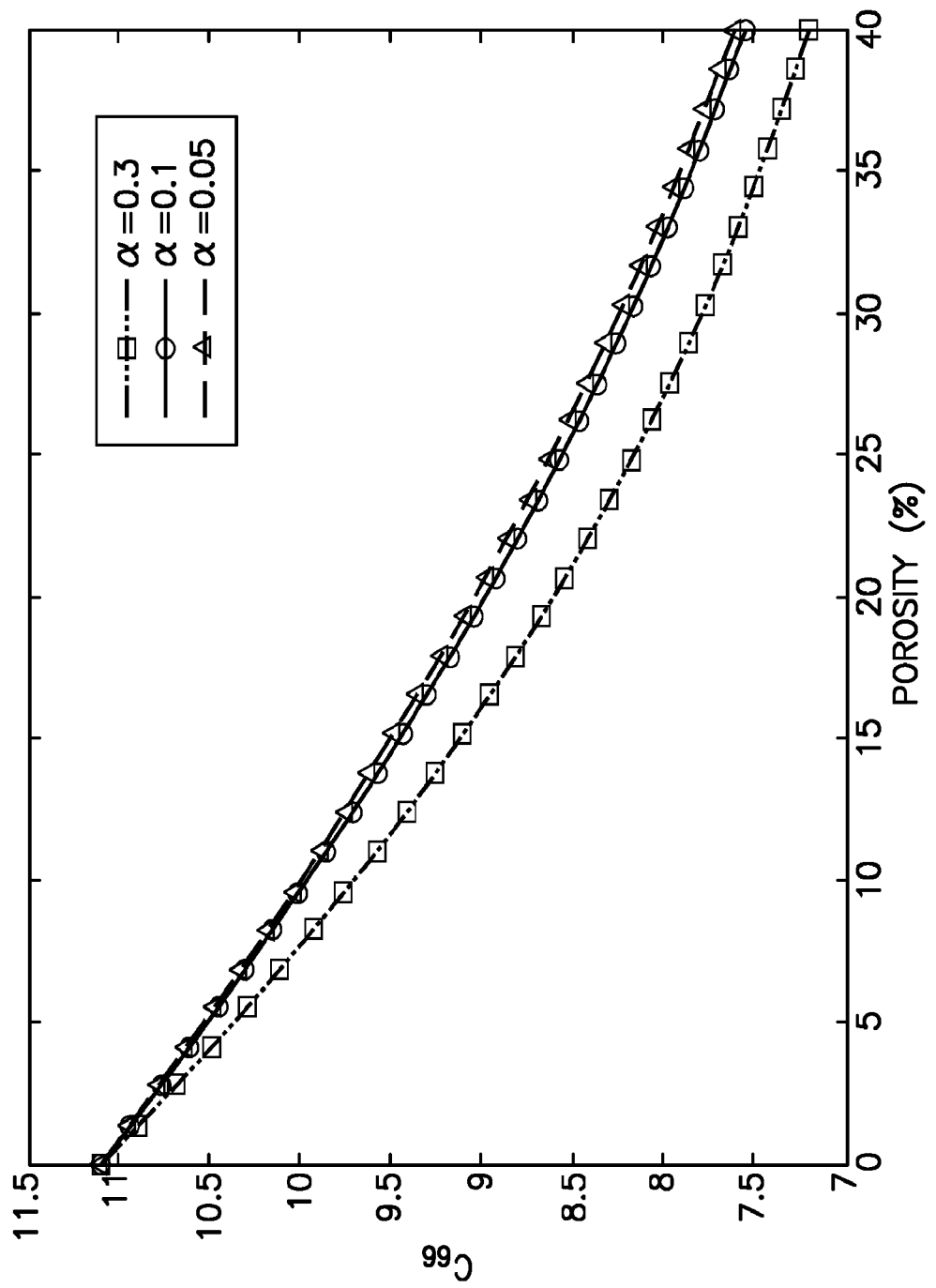

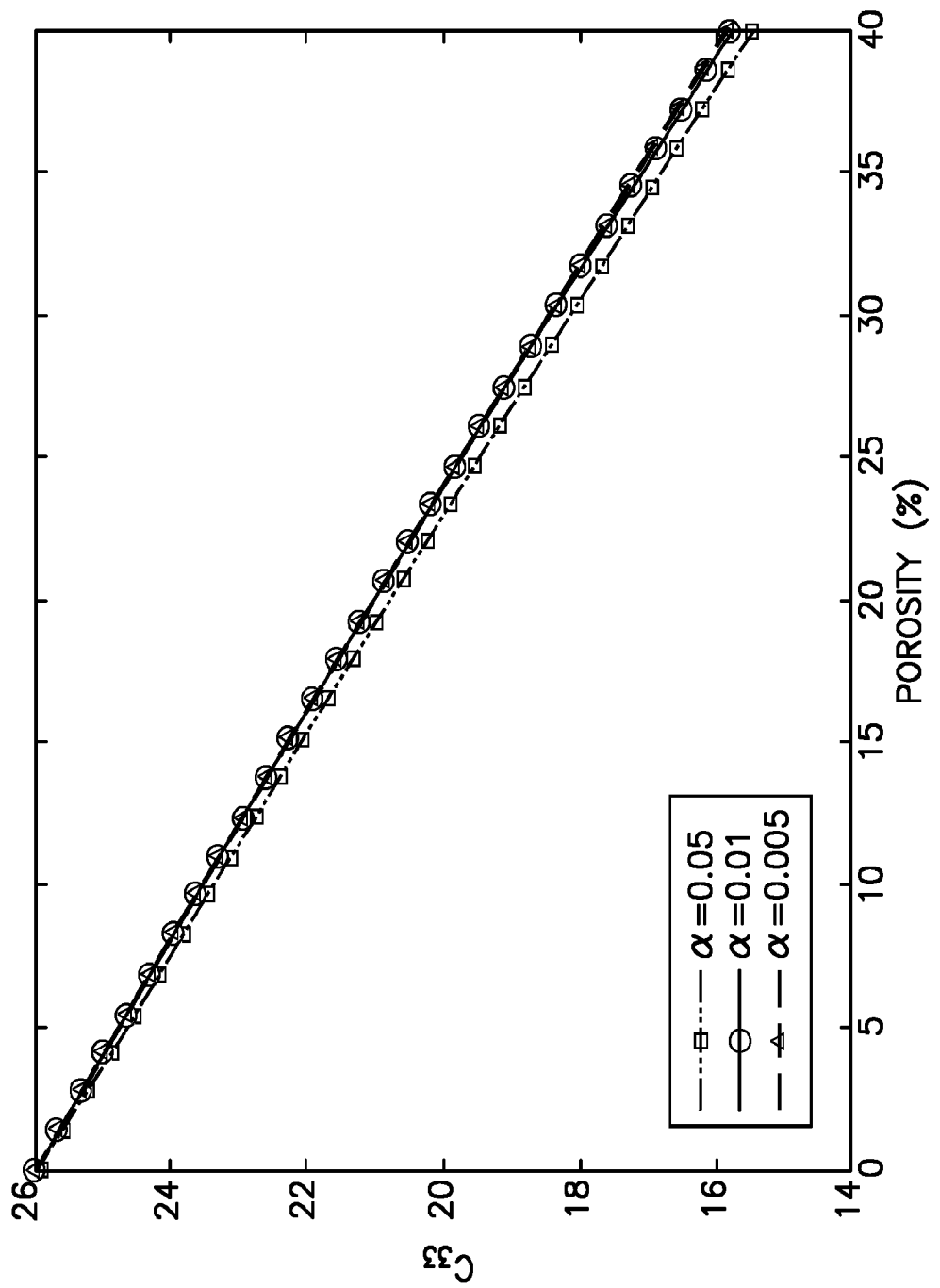

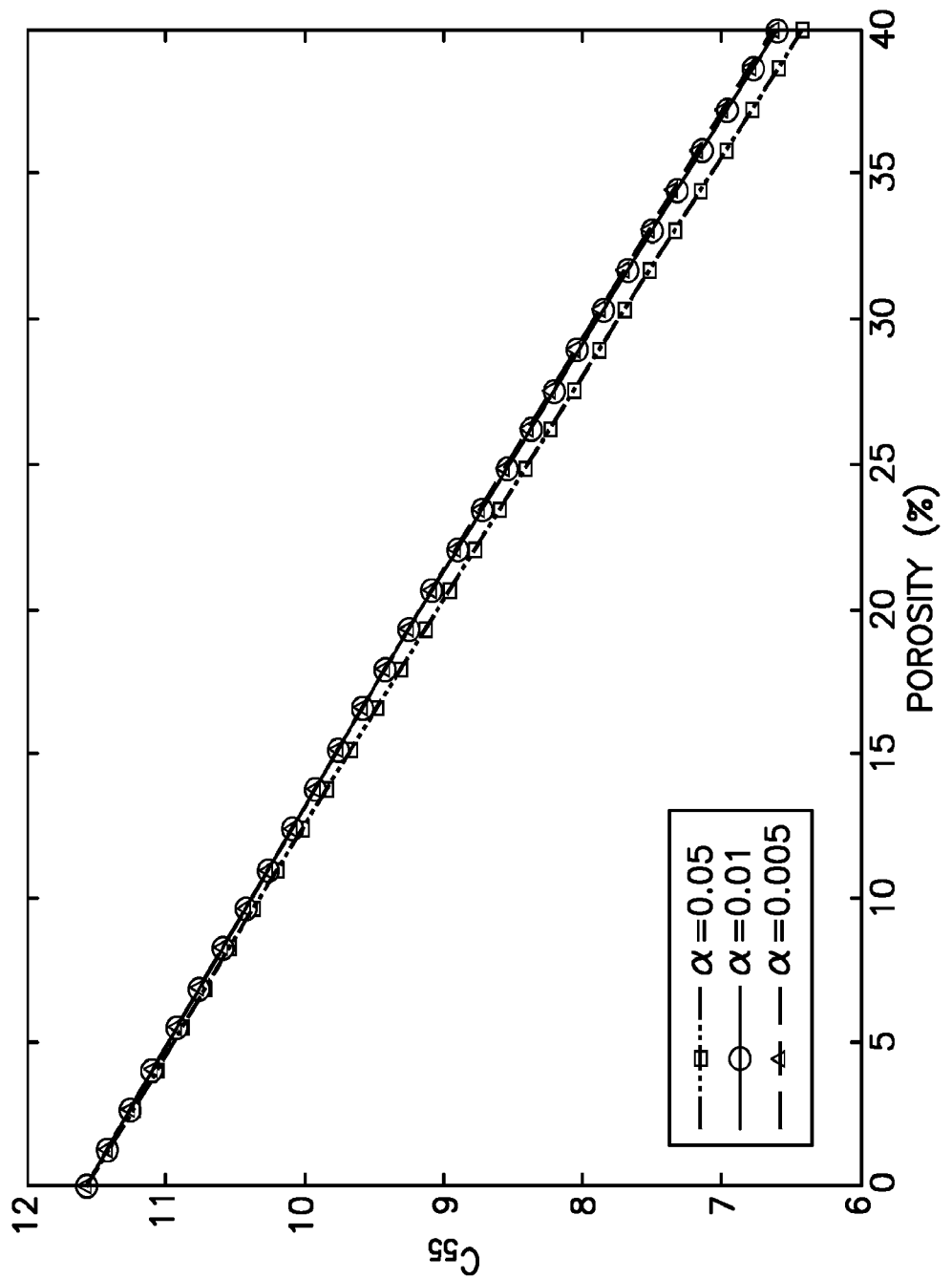

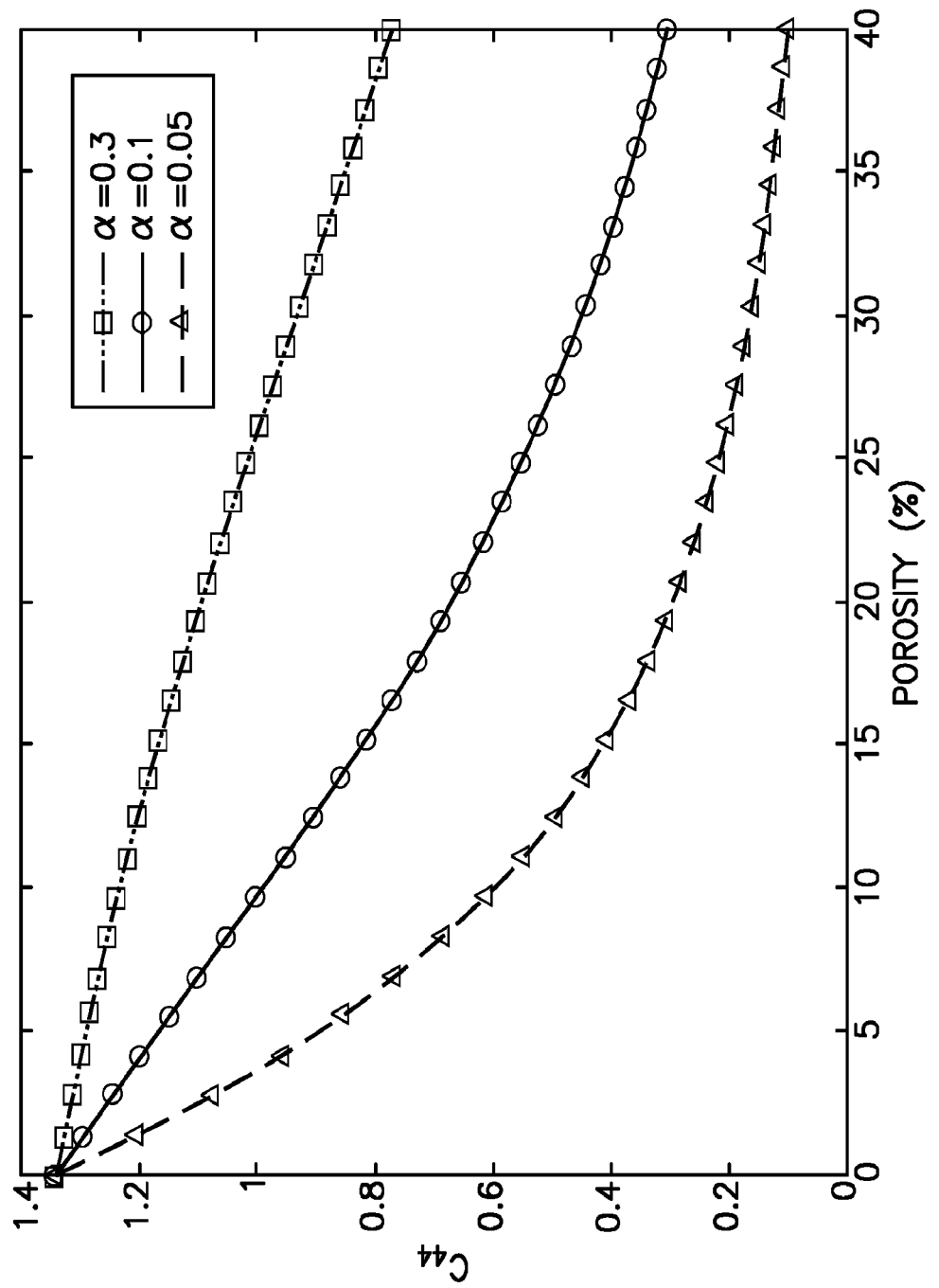

METHOD FOR DETERMINING PROPERTIES OF A THINLY LAMINATED FORMATION BY INVERSION OF MULTISENSOR WELLBORE LOGGING DATA

RELATED APPLICATIONS

The present application claims priority to Provisional Application Ser. No. 62/502,239, filed on May 5, 2017 and entitled "IMAGING NEAR-WELLBORE PETROPHYSICAL PROPERTIES IN THINLY LAMINATED FORMATIONS BY JOINT INVERSION OF MULTISENSOR WELLBORE LOGGING DATA," which is hereby incorporated by reference in their entireties.

FIELD

This disclosure relates to well logging in oil and gas fields. In particular, this disclosure relates to determining reservoir formation properties using well log data.

BACKGROUND

Accurate estimation of formation properties requires that the interpretation of the well log data account for the effects of drilling-induced near-wellbore alteration caused by mud-filtrate invasion or mechanical damage. A method for estimating near-wellbore formation properties is described in co-owned publication No: WO2016/123014, entitled "METHOD FOR DETERMINING FORMATION PROPERTIES BY INVERSION OF MULTISENSOR WELLBORE LOGGING DATA", the contents of which is herein incorporated by reference in its entirety. This method employs joint inversion of sonic, resistivity, and density logging data acquired in a vertical well utilizing a formation model with thick isotropic layers and radial variation in fluid saturation and pore shape arising from filtrate invasion and mechanical damage respectively. For a formation with thin laminations of isotropic sand and transverse isotropic (TIV) shale, the formation model with thick isotropic layers can lead to underestimation of hydrocarbon saturation from conductivity measured by uniaxial induction logs. Thick isotropic layer assumption can also lead to errors in pore shape estimated from shear and compressional sonic logs.

SUMMARY

The formation modelling and inversion workflows described herein can facilitate reservoir characterization and analysis of laminated reservoirs of two different rock types. In embodiments, an interval-of-interest of a laminated reservoir is modeled by a formation model that represents first and second zones of different first and second rock types. The formation model can be used to derive simulated sonic data, resistivity data, and density data for the interval-of-interest. The simulated sonic data, resistivity data, and density data for the interval-of-interest can be compared to measured sonic data, resistivity data, and density data for the interval-of-interest to refine the formation model and determine properties of the laminated formation at the interval-of-interest.

In embodiments, the first rock type of the first zone of the formation model can represent a transverse isotropic rock medium (e.g., shale) and the second rock type of the second zone of the formation model can represent an isotropic or HTI rock medium (e.g., sand).

In embodiments, the formation model can describe properties of the first and second zones of the laminated formation at the interval-of-interest. For example, such properties can include a radial profile of at least one parameter representing pore shape (e.g., pore aspect ratio) for shale micropores of the first zone, a radial profile of at least one parameter representing pore shape (e.g., pore aspect ratio) for randomly-oriented macropores of sand of the second zone, and a parameter representing a bulk modulus for fluid that saturates the randomly-oriented macropores of the sand of the second zone.

In embodiments, the rock medium (sand) of the second zone can include microcracks aligned in a predefined orientation, and the properties of the laminated formation at the interval-of-interest can include a radial profile of at least one parameter representing pore shape (e.g., pore aspect ratio) for the microcracks of the second zone and a bulk modulus for fluid that saturates the microcracks of the second zone.

In embodiments, the properties of the laminated formation at the interval-of-interest can further include at least one of a radial profile of water saturation, a radial profile of gas saturation, a radial profile of oil saturation, and formation porosity.

The formation modeling and inversion workflows can involve determining a radial profile of effective stiffness data for the combined first and second zones of the formation model by determining first stiffness data for the first zone at a given radial dimension, determining second stiffness data for the second zone at the given radial dimension, combining the first stiffness data and the second stiffness data to produce effective stiffness data for the combined first and second zones at the given radial dimension, and repeating these operations for a plurality of radial dimensions. The radial profile of the effective stiffness data can be used to derive the simulated sonic data and simulated density data for the interval-of-interest.

In embodiments, the first stiffness data can be a first stiffness matrix that is based on information that specifies a pore shape of the first zone, the second stiffness data can be a second stiffness matrix that is based on information that specifies a pore shape of the second zone, and the second stiffness matrix can be based on a stiffness matrix for the rock medium of the second zone assuming the rock medium of the second zone is dry and calculations that modify such stiffness matrix to account for fluid that saturates pore space of the rock medium of the second zone.

The formation modeling and inversion workflows can also involve determining a radial profile of effective resistivity data for the combined first and second zones of the formation model by determining first resistivity data for the first zone at a given radial dimension, determining second resistivity data for the second zone at the given radial dimension, iii) combining the first resistivity data and the second resistivity data to produce effective resistivity data for the combined first and second zones at the given radial dimension, and repeating such operations for a plurality of radial dimensions. The radial profile of the effective resistivity data can be used to derive the simulated resistivity data for the interval-of-interest.

In embodiments, the first resistivity data can be based on information that specifies a pore shape of the first zone, and the second resistivity data can be based on information that specifies a pore shape of the second zone.

The formation modeling framework can be used for joint inversion of measured sonic data, resistivity data, and density data for the interval-of-interest to determine properties of the formation at the interval-of-interest. In one embodiment, the properties of the formation can include (i) a radial profile for porosity at the interval-of-interest, (ii) a radial profile for water saturation ($S_w$) at the interval-of-interest, (iii) a radial profile for gas saturation ($S_g$) at the interval-of-interest, (iv) a radial profile of a pore aspect ratio for the first zone (e.g., micropores in shale) at the interval-of-interest; and (v) a radial profile of a pore aspect ratio for the second zone (e.g., macropores in sand) at the interval-of-interest. (vi) a radial profile for oil saturation ($S_o$) at the interval-of-interest.

In one embodiment, the formation properties are parameterized by a formation model derived from a joint-inversion process that uses petrophysical transforms and tool response simulators to derive simulated log data at the interval-of-interest, where the simulated log data includes simulated resistivity data, sonic data, and density data. The simulated log data for the interval-of-interest is compared to measured log data for the interval-of-interest in order to refine (tune) the formation model.

BRIEF DESCRIPTION OF THE DRAWINGS

Those skilled in the art should more fully appreciate advantages of various embodiments of the present disclosure from the following "Detailed Description" discussed with reference to the drawings summarized immediately below.

FIGS. 6A, 6B and 6C are plots that show the $C_{33}$, $C_{44}$, and $C_{66}$ components of the effective stiffness matrix derived from the workflow of FIG. 3 as a function of shale porosity $\phi_{shale}$ for a number of shale pore aspect ratios ($\alpha_{shale}$=0.05, 0.1, and 0.3) at a given porosity $\phi_{sand}$ of 25% and a sand pore aspect ratio $\alpha_{sand}$ of 0.1.

FIGS. 11A, 11B and 11C are plots that show the $C_{33}$, $C_{44}$, and $C_{55}$ components of the effective stiffness matrix derived from the workflow of FIG. 10 for a formation of pure sand, with the components shown as a function of crack porosity $\phi_{crack}$ for a number of crack pore aspect ratios ($\alpha_{sand}$=0.005, 0.01, and 0.05) at a given sand porosity $\phi_{sand}$ of 25% and a sand pore aspect ratio $\alpha_{sand}$ of 0.1.

FIGS. 12A, 12B, 12C and 12D are plots that show the $C_{33}$, $C_{44}$, $C_{55}$ and $C_{66}$ components of the effective stiffness matrix derived from the workflow of FIG. 10 for a formation of 50% shale, with the components shown as a function of shale porosity $\phi_{shale}$ for a number of shale pore aspect ratios ($\alpha_{shale}$=0.05, 0.1, and 0.3) at a given sand porosity (sand of 25% and a sand pore aspect ratio $\alpha_{sand}$ of 0.1 and a given crack porosity $\phi_{crack}$ of 10% and a crack pore aspect ratio $\alpha_{crack}$ of 0.01.

DETAILED DESCRIPTION

Figure 1:
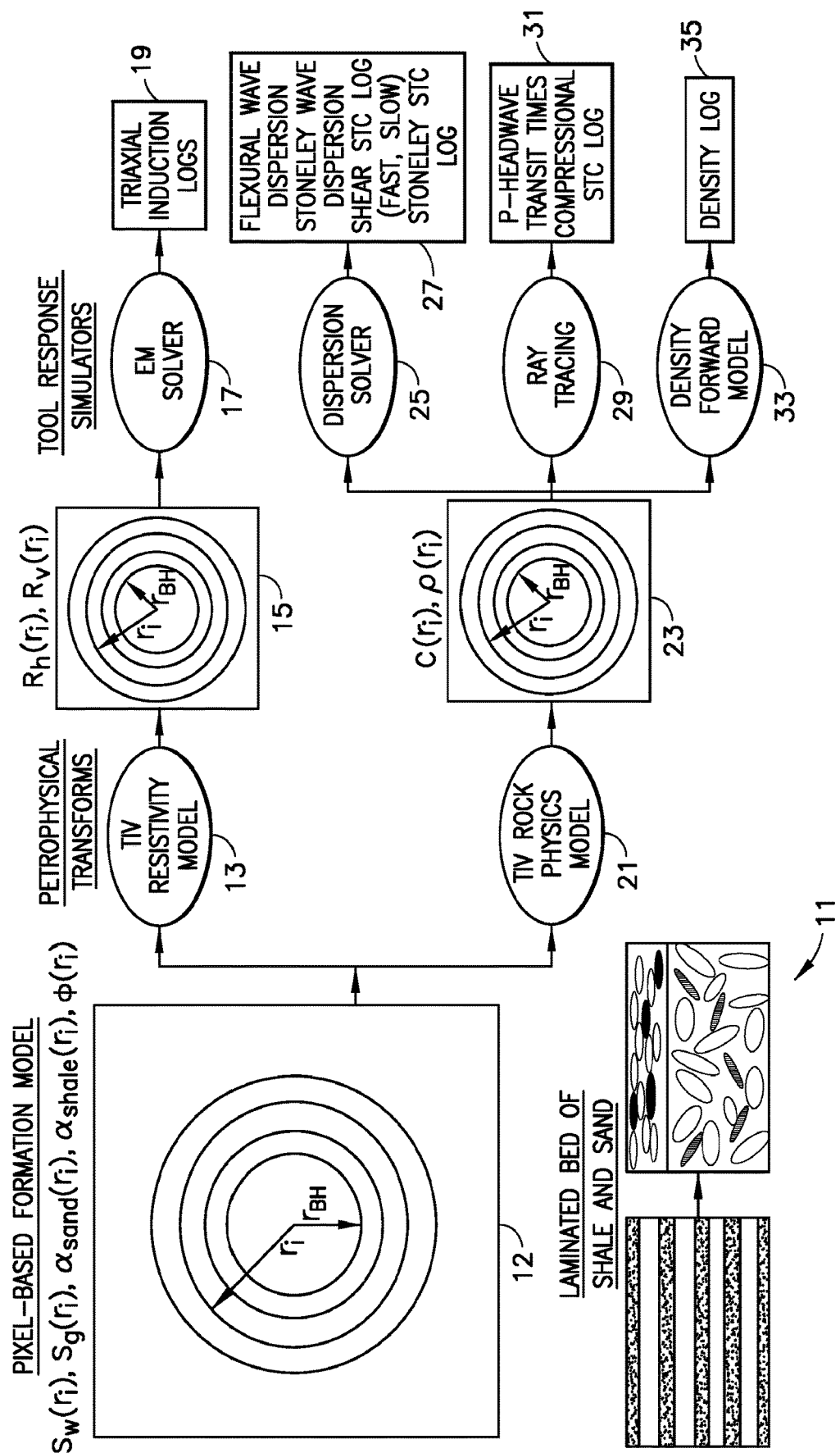
FIG. 1 is a schematic diagram of a forward modeling framework in accordance with one embodiment of the present disclosure.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

The present disclosure is directed to an inversion-based method that integrates resistivity data, sonic data, and density data of a geological formation acquired from within a well (or wellbore) that traverses the geological formation. At each interval-of-interest within the well, properties of the geological formation are parameterized by a formation model that represents first and second zones of two different rock types. In embodiments, the first rock type of the first zone can represent a transverse isotropic rock medium (e.g., shale) and the second rock type of the second zone of the formation model can represent an isotropic rock medium (e.g., sand). In one embodiment, the formation model includes (i) a radial profile for porosity at the interval-of-interest, (ii) a radial profile for water saturation ($S_w$) at the interval-of-interest, (iii) a radial profile for gas saturation ($S_g$) at the interval-of-interest, (iv) a radial profile of a pore aspect ratio for the first zone (e.g., micropores in shale) at the interval-of-interest; (v) a radial profile of a pore aspect ratio for the second zone (e.g., macropores in sand) at the interval-of-interest, and (vi) a radial profile for oil saturation ($S_o$) at the interval-of-interest. The term "radial" means in a direction that extends laterally from the center of the well (or wellbore) into the geological formation. Radial changes in the fluid saturations represent the effect of mud-filtrate invasion, while radial changes in pore shape represent the effect of mechanical damage or stress. The term "interval-of-interest" means a portion of the well corresponding to a location (depth) or measurement station within the well. The formation properties are estimated from the data using a workflow that exploits complementary physical sensitivities, different directional dependence, and different radial depths of investigation (DOI) of the various measurements. Petrophysical transforms (which are specific to the formation lithology) can be used to map the parameters of the formation model to radial profiles of elastic properties and radial profiles of electromagnetic properties. The electromagnetic properties can represent radial profiles of anisotropic resistivity for the combined first and second zones, while the elastic properties can represent radial profiles of an effective stiffness matrix for the combined first and second zones. The electromagnetic properties and elastic properties can be input to tool response simulators, which are used as forward models in a joint inversion process, discussed in greater detail below.

In embodiments, the joint inversion process is based on sonic data, resistivity data and density data acquired by downhole logging measurements acquired in a well (or wellbore) that traverses a subterranean geological formation.

For example, the sonic data can be acquired with a logging tool that consists of cross dipole sources, near and far monopole sources and array of receivers. See Pistre, V., Kinoshita, T., Endo, T., Schilling, K., and Pabon, J., "A modular wireline sonic tool for measurements of 3D (azimuthal, radial, and axial) formation acoustic properties," SPWLA 46th Annual Logging Symposium, New Orleans, La., USA, Jun. 26-29, 2005. In this case, the acoustic sources transmit acoustic energy that interacts with the formation and then is detected by the array of receivers. The measured sonic data can include attributes of acoustic waveforms such as Semblance-Time-Coherence (STC) logs for Stoneley, shear, and compressional waves that interact with the formation. The data also includes dispersion data for the wellbore-guided flexural and Stoneley waves, and compressional headwave transit times. The vertical resolution of the data, with multishot processing, can be up to 1 ft, which is the spacing between adjacent pair of receivers in the array. The flexural and Stoneley wave dispersion can be sensitive to elastic properties of the formation at different radial depths into the formation. Typical radial depths range from 0.5-3 wellbore diameters radially into the formation. Note that other suitable sonic logging tools can be used as well.

In another example, the resistivity data can be acquired with a triaxial array induction tool. See Rosthal, R., Barber, T., Bonner, S., Chen, K.-C., Davydycheva, S., Hazen, G., Homan, D., Kibbe, C., Schlein, R., Villegas, L., Wang, H., and Zhou, F., "Field test of an experimental fully triaxial induction tool," SPWLA 44th Annual Logging Symposium, Galveston, Tex., USA, Jun. 22-25, 2003. In this case, the resistivity measurements are acquired with an array of triaxial sources and an array of triaxial receivers. The array of triaxial sources transmit electromagnetic energy that interacts with the formation and then is detected by the array of triaxial receivers. The measured resistivity data can be corrected for wellbore effects and rotated into the well frame before input to the joint inversion. The component of the resistivity data from the axial source and axial receiver is sensitive to horizontal conductivity whereas the components from transverse sources and transverse receivers are sensitive to vertical resistivity. The logs for different source-receiver spacing have different radial and vertical investigation depths. Typical investigation depths range from 1-4 ft vertically and 1-7 ft radially into the formation. Note that other suitable induction-type resistivity logging tools that induce a current distribution in the formation and measure its magnitude can be used as well.

In yet another example, the density data can be acquired using a gamma-gamma density tool. See Allioli, F., Faivre, O., Jammes, L., and Evans, M., "A new approach to computing formation density and Pe free of mudcake effects," SPWLA 38th Annual Logging Symposium, Houston, Tex., USA, Jun. 15-18, 1997. In this case, the density measurements are acquired with a gamma source that emits gamma radiation that interacts with the formation and then is detected by a gamma detector. The measured density data can be corrected for wellbore effects before input to the joint inversion. The density data can be sensitive to bulk density of the formation up to 2 inches vertically and 6 inches radially from the wellbore. Note that other suitable density logging tools can be used as well.

Forward Modeling

Figure 2:
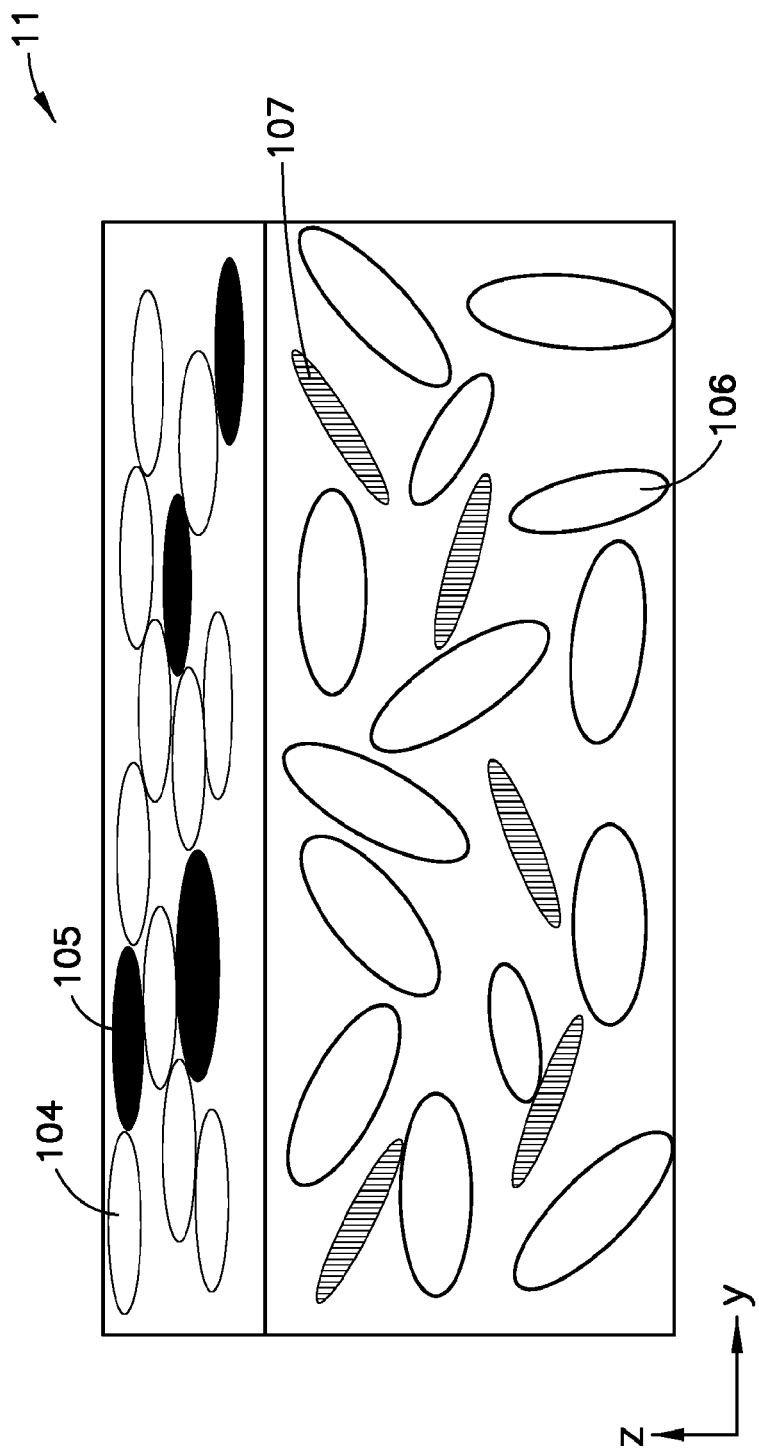
FIG. 2 illustrates constituents of a single zone of shale and constituents of a single zone of sand, where such two zones represent a laminated layer of multiple fine layers of shale and sand in accordance with one embodiment of the present disclosure. The single zone of shale includes oblate spheroidal pores and kerogen inclusions all aligned in parallel with the layering with an aspect ratio ($\alpha_{shale}$). The single zone of sand has randomly oriented pores with an aspect ratio ($\alpha_{sand}$). A proportion of the randomly oriented pores are macropores filled with water-hydrocarbon mixture, and a proportion of the pores are dispersed shale pores filled with water. Parameters representing the constituents of the single zone of shale of FIG. 2 and parameters representing the constituents of the single zone of sand of FIG. 2 can be used in the forward modeling framework and workflow of FIG. 1.

FIG. 1 shows an example forward modeling framework for simulating resistivity data, sonic data and density data acquired by one or more logging tools in a wellbore (well). In the example shown, the wellbore is vertical, and the formation contains multiple laminations (or layers) of an isotropic rock medium (sand) and a TIV rock medium (shale). The properties of the isotropic rock medium (sand) are assumed to be uniform in all directions within a given sand layer. The TIV rock medium (shale) has transverse isotropy with a vertical axis of rotational symmetry. In this case, the properties of the shale are assumed to be uniform horizontally within a given shale layer but can vary vertically within the given shale layer. In the vertical direction, the formation around the wellbore is described by a formation model 11 that approximates multiple thin layers of sand and shale with a single zone of shale and a single zone of sand as shown in FIG. 2. The volume fraction of shale zone $V_{shale}$ and the volume fraction of sand zone $V_{sand}$ are known or derived from log data. The zone of shale consists of pores (micropores) 104 filled with water as well as kerogen inclusions 105. Shale micropores and organic inclusions are aligned in the horizontal direction. The zone of sand contains randomly oriented pores (macropores) 106 filled with water-hydrocarbon mixture and randomly oriented dispersed shale pores 107. The formation model 11 has an axial extent set by the maximum vertical resolution of the sonic, resistivity, and density tools. In the radial direction, the formation around the wellbore is described by a formation model 12 that discretizes the formation into a number N of radial bins or pixels. In each pixel (labelled $r_i$=1, 2, . . . N), values for water saturation $S_w(r_i)$, gas saturation $S_g(r_i)$, oil saturation $S_o(r_i)$, porosity $\phi(r_i)$, pore aspect ratio $\alpha_{shale}(r_i)$ for the shale zone, and pore aspect ratio $\alpha_{sand}(r_i)$ for the sand zone are specified. The radius $r_i$ relates to radial distance from the center of the wellbore. The wellbore extends radially to radius $r_{BH}$. An outermost pixel (i=N) is unbounded in radial extent and represents the far-field formation. The pore aspect ratios $\alpha_{shale}$ and $\alpha_{sand}$ are modeled as being constant in each pixel. Note that radial changes in the pore aspect ratios $\alpha_{shale}(r_i)$ and $\alpha_{sand}(r_i)$ represent mechanical damage or stress effects, and radial changes in the fluid saturations $S_w(r_i)$ and $S_g(r_i)$ and $S_o(r_i)$ are caused by filtrate invasion. The fluid saturations satisfy the constraint that $S_w(r_i)+S_g(r_i)+S_o(r_i)=1$.

The formation models 11 and 12 can be used as in input to a petrophysical transform 21 (labeled TIV Rock Physics model) that maps the formation parameters of the formation models 11 and 12 to corresponding elastic properties (including values for an effective stiffness matrix $C(r_i)$ and density $\rho(r_i)$ for the combined two zones) in each pixel. These properties (labeled 23) are input to a number of physics-based tool response simulators (25, 29) for generating simulated sonic data 27 (such as flexural wave dispersions, Stoneley wave dispersions, Shear STC log data, Stoneley STC log data) and simulated sonic data 31 (such as P-headwave transit time data and Compressional STC log data). The properties (labeled 23) are also input to a physics-based tool response simulator 33 for generating simulated density data 33. The sonic data 27 and 31 as well as the density data 33 can be simulated using the forward models described in WO2016/123014.

Dispersion data for flexural wave and Stoneley wave can be simulated from the acoustic guidance condition matrix, obtained from the boundary conditions satisfied by a wellbore-guided wave at the interface of each pixel (Tang and Cheng, 2004). Compressional headwave transit-times can be simulated by ray-tracing according to Snell's law as given in Zeroug et al., 2006. The compressional slowness log can be obtained from a linear fit to the transit times. The shear and Stoneley wave slowness logs can be computed from $C(r_i)$ in the far-field pixel, and are given by $\sqrt{\rho/C_{44}}$ for fast shear, $\sqrt{\rho/C_{55}}$ for slow shear, and $\sqrt{\rho/C_{66}}$ for Stoneley horizontal shear. The density data can be computed as a weighted sum over all the pixels in the formation model 11. The weights can be precomputed from the normalized sensitivities of the tool response. The weights can be configured to decay with radial distance from the wellbore such that 50% of the response is from 2 inches of the formation and 100% of the response is from 6 inches of the formation.

Figure 3:
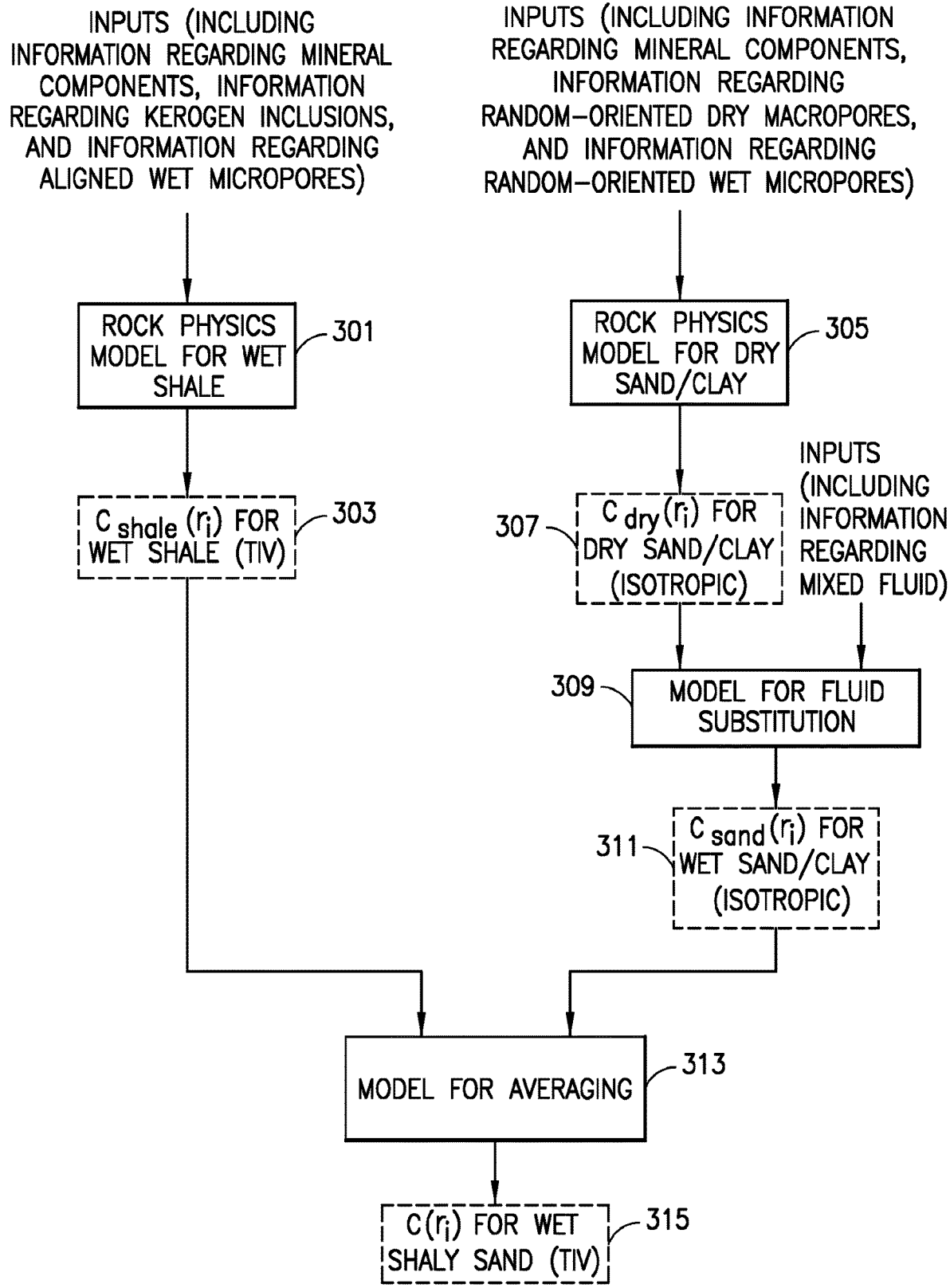
FIG. 3 shows a workflow for estimating an effective stiffness matrix for a laminate layer of shale and sand represented by the constituents of FIG. 2 in accordance with one embodiment of the present disclosure. The workflow of FIG. 3 can be part of the forward modeling framework of FIG. 1.

In embodiments, the petrophysical transform 21 employs an effective medium rock physics model for computing elastic properties of the two-zone formation model as shown in FIG. 3. In this model, effective elastic properties of the shale zone are computed in blocks 301 to 303 separately from effective elastic properties of the sand zone computed in blocks 305 to 311. The results of blocks 303 and 311 are then combined in block 313 to produce effective elastic properties for the combined shale and sand zones (labeled 315). The computation is carried out in each pixel to produce radial profiles of the effective stiffness matrix.

Figure 4:
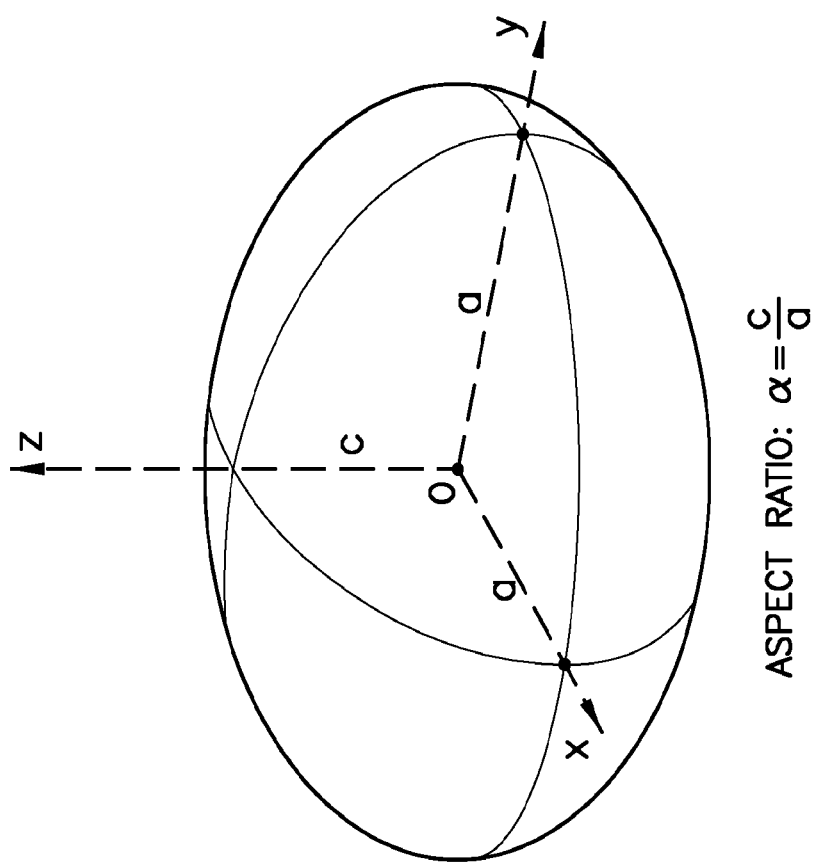
FIG. 4 illustrates an oblate spheroidal pore and grain with an aspect ratio $\alpha$.
Figure 5A:
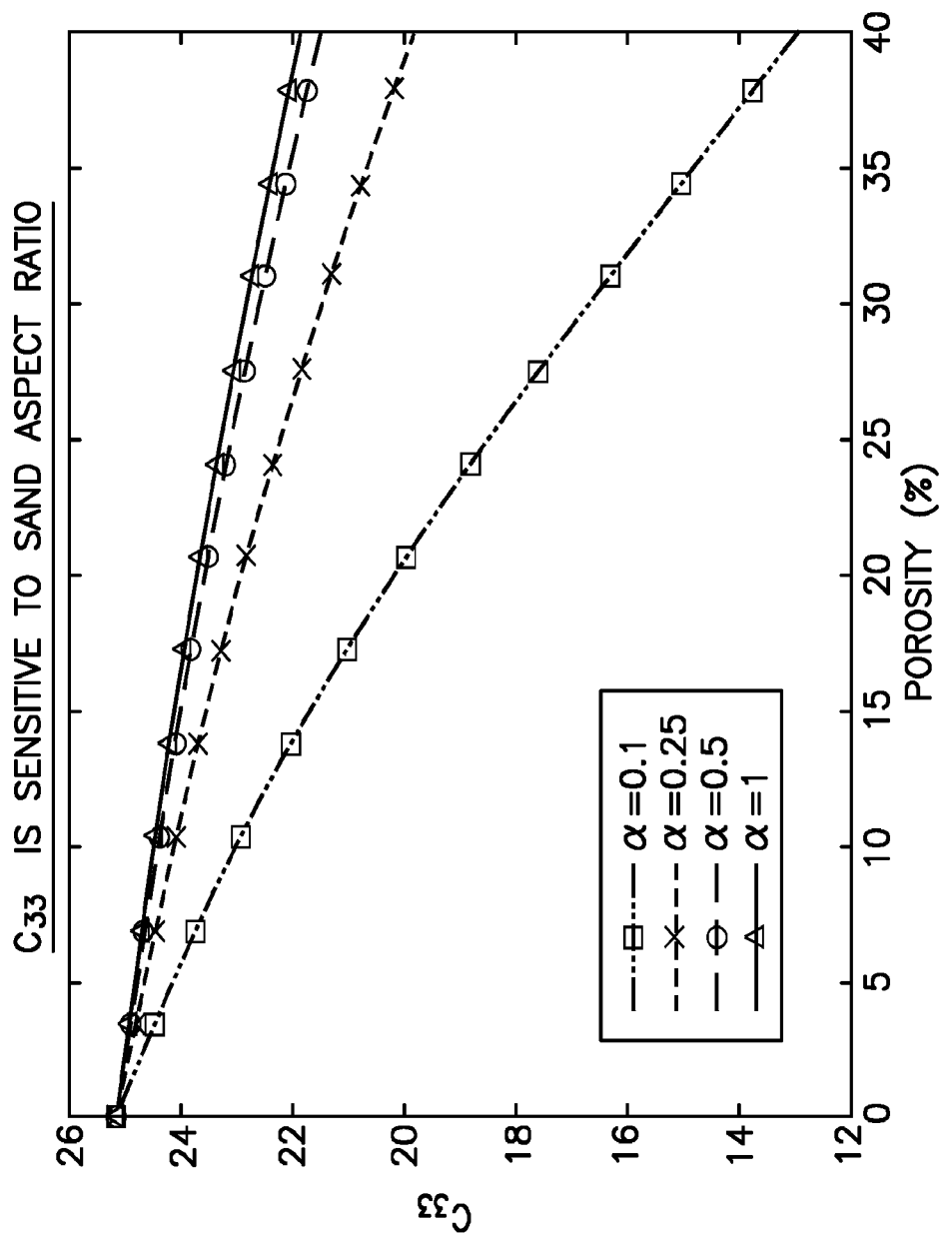
FIGS. 5A, 5B and 5C are plots that show the $C_{33}$, $C_{44}$, and $C_{66}$ components of the effective stiffness matrix derived from the workflow of FIG. 3 as a function of sand porosity $\phi_{sand}$ for a number of sand pore aspect ratios ($\alpha_{sand}$=0.1, 0.25, 0.5 and 1) at a given shale porosity $\phi_{shale}$ of 10% and a shale pore aspect ratio $\alpha_{shale}$ of 0.1.
Figure 5B:
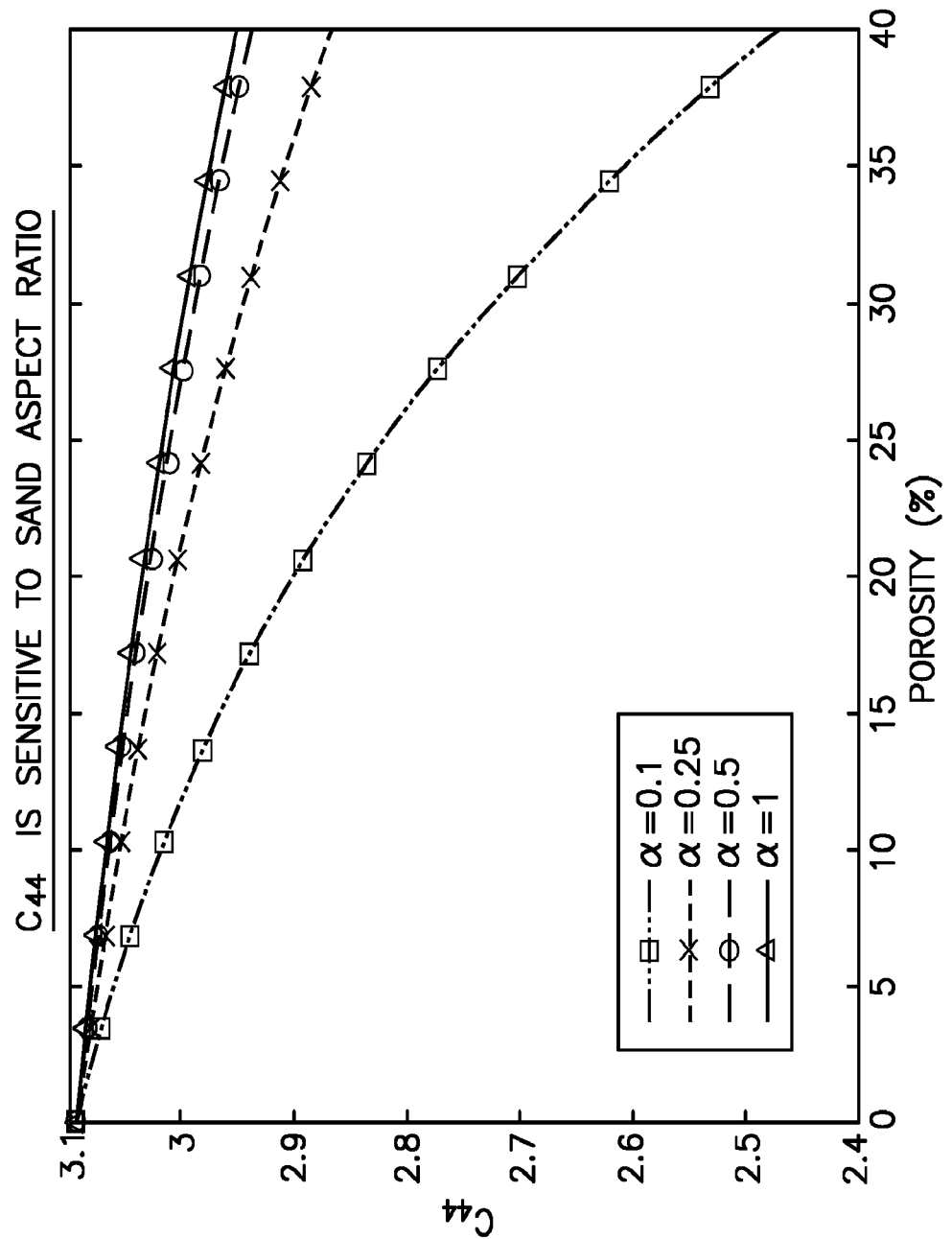
Figure 5C:
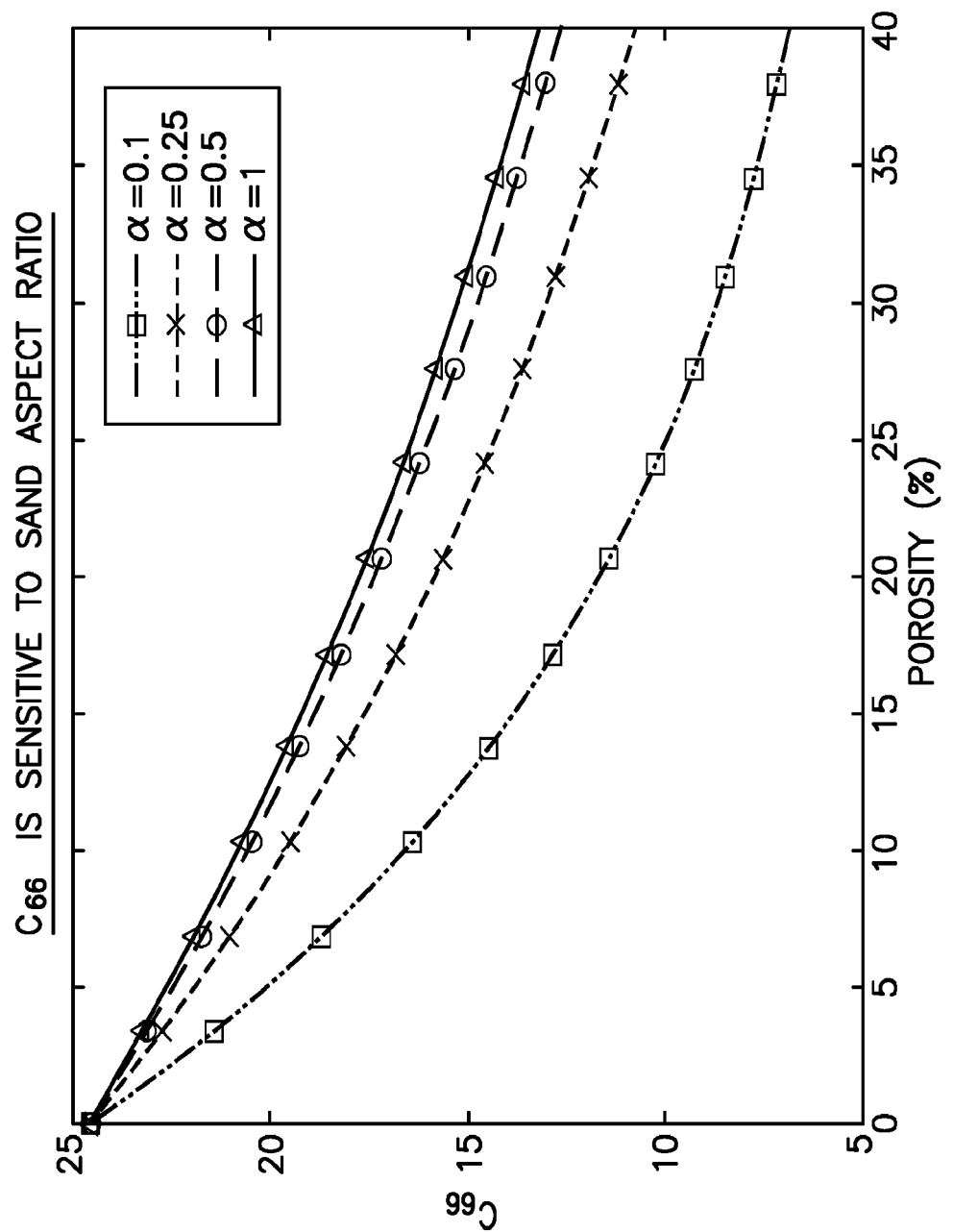
Figure 6B:
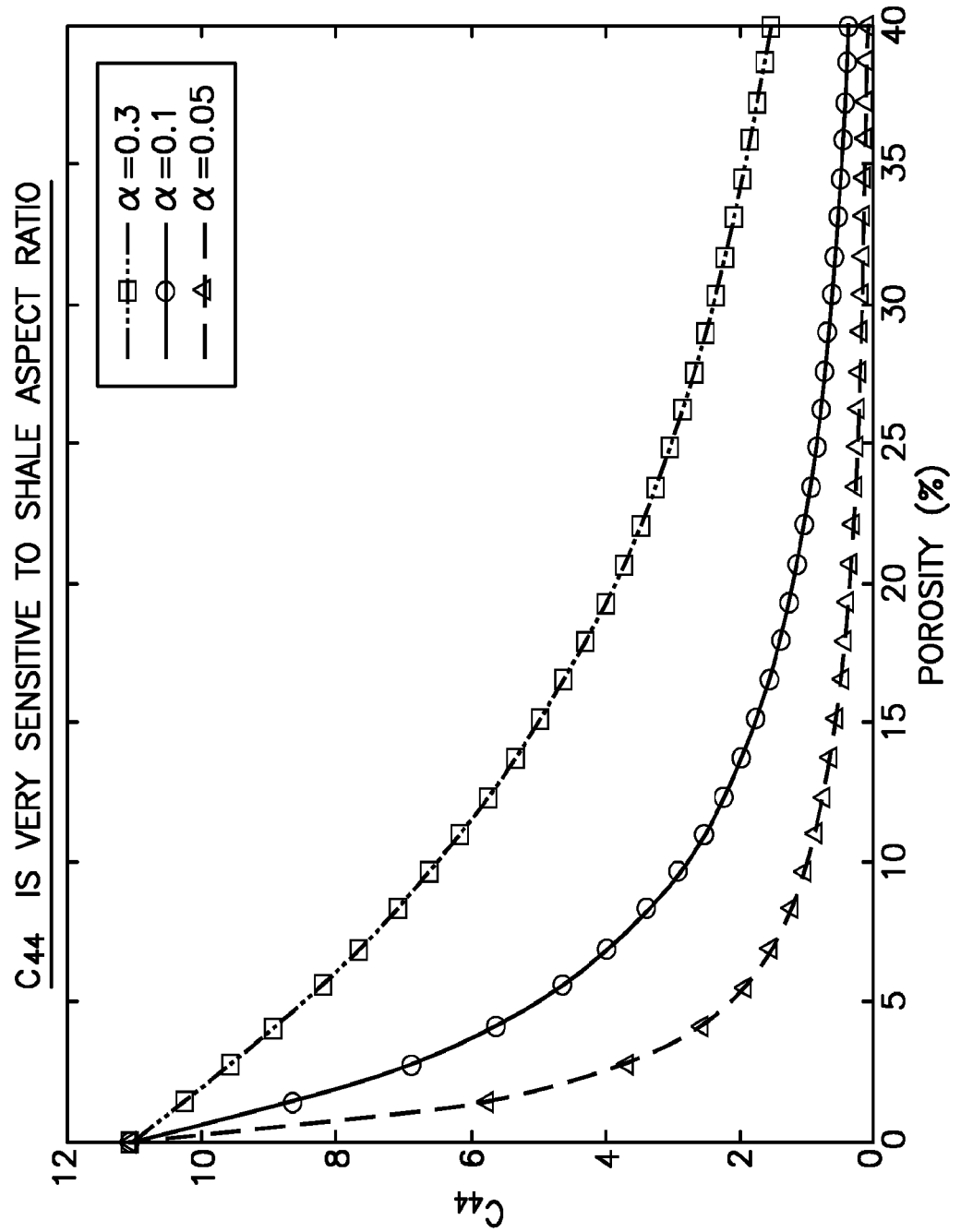

In block 301, a rock physics model for wet shale is used to determine a TIV stiffness matrix for the shale zone (referred to as "$C_{shale}$" and labeled as block 303). In embodiments, the rock physics model of block 301 employs Self-Consistent Approximation (SCA) and Differential Effective Medium Model (DEM). The rock physics model for shale can employ inputs such as the shale mineralogy, porosity $\phi_{shale}$ of the shale zone and pore shape of the grains and pores. For example, the grains and pores of the shale can be defined as oblate spheroids with major axis aligned with layer boundaries and aspect ratio defined in FIG. 4. Organic kerogen inclusions can be added to the shale given the inclusion aspect ratio and mineralogy.

In embodiments, the rock physics model of block 301 employs Self-Consistent Approximation (SCA) followed by Differential Effective Medium Model (DEM). This model supports different aspect ratios for the pores, grains, and organic inclusions. Here, to reduce the number of free parameters, the aspect ratio of grain, pores, and kerogen inclusions can be constrained to be identical, denoted by $\alpha_{shale}$. The shale background with 50% porosity can be computed using SCA followed by incrementally adjusting the background porosity by small amounts until the desired porosity $\phi_{shale}$ is reached. The SCA helps to establish the connectivity of the background matrix. For example, the SCA can involve the following equation:

$$C^{SCA}=[(1-\phi)C_{clay}Q_{clay}+\phi C_{fluid}Q_{fluid}][(1-\text{phi})Q_{clay}+\phi Q_{fluid}]^{-1}, \quad \text{Eqn. 1}$$

where $C^{SCA}$ is the stiffness matrix from SCA, $C_{clay}$ is the stiffness matrix for clay mineral, and $C_{fluid}$ is the stiffness matrix for fluid inclusion. Also, $Q_{clay}$ and $Q_{fluid}$ are the Eshelby terms for clay and fluid inclusions as given in T. Mura, *Micromechanics of defects in solids*, 2nd ed., ser. Mechanics of Elastic and Inelastic Solids. Springer Netherlands, 1987.

For the DEM model of block 301, the following ordinary differential equation can be solved:

$$\frac{dC^{DEM}}{dv} = \frac{1}{1-v}(C^i - C^{DEM})Q^i, \quad \text{Eqn. 2}$$

where $C^{DEM}$ is the stiffness matrix at the end of the $i^{th}$ porosity increment, $C^i$ is the inclusion stiffness matrix, and $Q^i$ is the inclusion Eshelby term that depends on the fluid inclusions and matrix as given in Hornby et al., 1994. Then the stiffness matrix $C_{shale}$ can be determined from the final stiffness matrix after N increments dictated by the porosity $\phi_{shale}$ and the change in porosity per increment. Alternatively, the stiffness matrix $C_{shale}$ can be computed using only DEM starting from a uniform clay background.

For the sand zone, block 305 employs a rock physics model for dry sand to produce an isotropic stiffness matrix for the dry sand (referred to as "$C_{dry}$" and labeled as block 307). The inputs to the model of block 305 can include the sand mineralogy, the porosity parameter di and the pore aspect ratio $\alpha_{sand}$ of the randomly-oriented dry pores of the sand zone.

In embodiments, block 305 can employ a Xu-White effective rock physics model which has the following inputs: porosity parameter $\phi(r_i)$, the pore aspect ratio $\alpha_{sand}(r_i)$, and the mineralogy defined by shear modulus $(\mu_{min})_i$, bulk modulus $(K_{min})_i$, density $(\rho_{min})_i$, and volume fractions $(x_{min})_i$ of each mineral i=1, . . . , $N_{min}$, the interval-of-interest. Note that increasing (or decreasing) the pore aspect ratio $\alpha_{sand}$ for the sand zone has the impact of stiffening (or softening) the rock.

The Xu-White model computes effective bulk modulus $K_{dry}(r_i)$ and effective shear modulus $\mu_{dry}(r_i)$ of the dry rock by partitioning the porosity into dispersed shale porosity $\phi_c$ and sand macroporosity $\phi_s$, proportional to the volume fraction of clay and sand minerals. The Kuster-Toksoz model is then applied iteratively for P iterations, where at each iteration, the background medium has effective moduli from the previous iteration and the porosity is $\phi/P$. The equations at each iteration are:

$$K_{dry}(r_i) - K_m = \frac{1}{3}(K_f - K_m)\frac{3K_{dry}(r_i)+4\mu_m}{3K_m+4\mu_m}\frac{1}{P}\sum_{l=s,c}\phi_l T_{iijj} \quad \text{Eqn. 3(a)}$$

$$\mu_{dry}(r_i) - \mu_m = \frac{(\mu_f-\mu_m)}{5}\frac{6\mu_{dry}(r_i)(K_m+2\mu_m)+\mu_m(9K_m+8\mu_m)}{5\mu_m(3K_m+4\mu_m)} \quad \text{Eqn. 3(b)}$$

$$\frac{1}{P}\sum_{l=s,c}\phi_l\left(T_{iijj} - \frac{T_{ijij}}{3}\right)$$

where $K_m$, $\mu_m$ are the bulk and shear modulus of the background medium, $K_f$, $\mu_f$ are the bulk and shear modulus of the pore fluid, and $T_{iijj}$, $T_{ijij}$ are scalars that depend on the matrix, pore aspect ratio and pore fluid as defined in Appendix B of Xu-White (1995).

Equations 3(a) and 3(b) can be applied with fluid bulk modulus $K_f$ and fluid shear modulus $\mu_f$ both set to zero to obtain the moduli of the dry rock. In the above equations, the moduli of the solid background for the first iteration is obtained from the moduli of the component minerals by a mixing law (e.g., Voigt average or Voigt-Reuss-Hill Average). For example, the Voight average can be calculated as follows:

$$K_m = \Sigma_{i=1}^{N_{min}} x_i (K_{min})_i, \text{ and} \quad \text{Eqn. 4(a)}$$

$$\mu_m = \Sigma_{i=1}^{N_{min}} x_i (\mu_{min})_i. \quad \text{Eqn. 4(b)}$$

In block 309, a model for fluid substitution (such as the Gassman model) is applied to saturate the macropores of the sand zone with fluid of specified bulk modulus $K_f = K_{macro}$ and determine an isotropic stiffness matrix for the saturated sand (referred to as "$C_{sand}$" and labeled block 311). For example, the Gassman model can be represented by the following:

$$K_{eff}(r_i) = K_{dry}(r_i) + \frac{\left(1-\frac{K_{dry}(r_i)}{K_m}\right)^2}{\frac{\phi_s}{K_f(r_i)}+\frac{(1-\phi_s)}{K_m}-\frac{K_{dry}(r_i)}{K_m^2}}, \text{ and} \quad \text{Eqn. 5(a)}$$

$$\mu_{eff}(r_i) = \mu_{dry}(r_i) \quad \text{Eqn. 5(b)}$$

The parameter $K_f$ in Eqn. 5(a) can be determined from Woods law as:

$$K_f = \left(\frac{S_w(r_i)}{K_w} + \frac{S_g(r_i)}{K_g} + \frac{S_o(r_i)}{K_o}\right)^{-1} \quad \text{Eqn. 5(c)}$$

The parameter $K_f$ in Eqn. 5(a) can also be determined from Brie's empirical law as:

$$K_f = (K_w - K_g)S_w^3(r_i) + (K_0 - K_g)S_o^3(r_i) + K_g$$

where $K_w$, $K_o$, $K_g$ are the bulk modulus of water, oil, and gas. Eqn. 5(d)

In block 313, the TIV stiffness matrix $C_{shale}$ (block 303) can be combined with the isotropic stiffness matrix $C_{sand}$ (block 311) to produce effective stiffness matrix C for the combined shale and sand zones (block 315). Block 313 can employ Backus averaging with the shale volume fraction $V_{shale}$ as input. Backus averaging provides the long-wavelength limit, effective TIV stiffness for a medium composed of multiple fine layers of a TIV or isotropic medium, as given in Mavko et al., 2009.

The sensitivities of the stiffness elements $C_{33}$, $C_{44}$, and $C_{66}$ of the effective stiffness matrix for the combined shale and sand zones (315) are shown in the plots of FIGS. 5A-5C and 6A-6C. These plots show that the pore aspect ratio for the sand zone impacts all the stiffness elements of the effective stiffness matrix, while the pore aspect ratio for the shale zone mainly impacts the $C_{44}$ element of the effective stiffness matrix. Note that for a TIV formation, the $C_{55}$ element of the effective stiffness matrix is equal to the $C_{44}$ element of the effective stiffness matrix. Thus, the $C_{55}$ element is not shown in FIGS. 5A-5C and 6A-6C.

The radial profile of density in the combined shale and sand zones can be computed by taking the volumetric averages of the density in the shale and sand zones in each pixel as follows:

$$\rho(r_i) = (1 - \phi_{eff} - \phi_{bw})\sum_{j=1}^{N_{min}}(x_{min})_j(\rho_{min})_j + \quad \text{Eqn. 6}$$

$$\phi_{eff}(S_w(r_i) + \rho_w + S_o(r_i)\rho_o + S_g(r_i)\rho_g) + \phi_{bw}\rho_w,$$

where $x_{min}$ and $\rho_{min}$ are the mineral volume fractions and mineral densities in the entire rock matrix (including both sand and shale zones), $\phi_{eff} = \phi V_{sand}$ is the effective porosity, $\phi_{bw} = \phi_{shale}V_{shale}$ is the boundwater porosity, and $\rho_w$, $\rho_o$, $\rho_g$ are water, oil, and gas densities.

The formation models 11 and 12 can also be used as in input to a petrophysical transform 13 (labeled TIV resistivity model) that maps the formation parameters of the formation models 11 and 12 to corresponding electromagnetic properties (such as horizontal resistivity $R_h(r_i)$ and vertical resistivity $R_v(r_i)$ of the combined shale and sand zones. These properties (labeled 15) are input to a physics-based tool response simulator 17 (labeled "EM Solver") for generating simulated resistivity data 19 (labeled "Triaxial Induction logs"). In embodiments, the physics-based tool response simulator 17 can be based on the forward model described in Wang et al. "Fast simulation of triaxial borehole induction measurements acquired in axially symmetrical and transversely isotropic media," Geophysics, Vol. 74, No. 6, November-December 2009.

Note that for the two-zone model of FIG. 2, the shale zone has intrinsic TIV behavior with anisotropic resistivities ($R_{shale-h}$ and $R_{shale-v}$), while the sand zone is isotropic with resistivity ($R_{sand}$). Following the teaching of Clavaud et al., "Field Example of Enhanced Hydrocarbon Estimation in Thinly Laminated Formation with Triaxial Array Induction Tool: A Laminated Sand-Shale Analysis with Anisotropic Shale," SPWLA 46$^{th}$ Annual Logging Symposium, Jun. 26-29, 2005, the anisotropy ratio ($R_{shale-h}/R_{shale-v}$) for the shale zone can be obtained from log data in a pure shale zone. A drawback of this approach is that pure shale zone may not be present in the logged interval, or shale properties may vary with depth.

Figure 7:
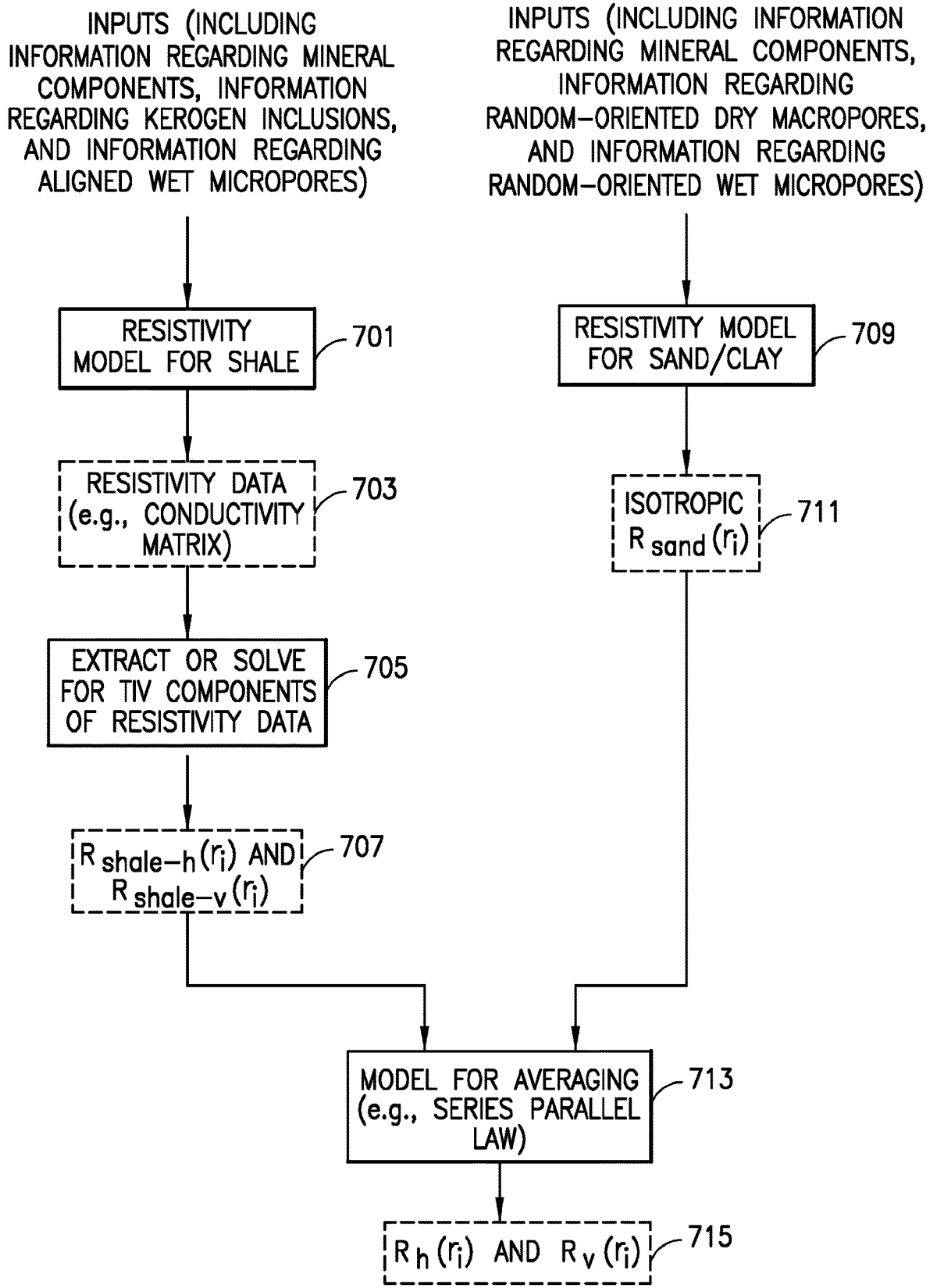
FIG. 7 shows a workflow for estimating effective anisotropic resistivity $R_h$ and $R_v$ for a laminate layer of shale and sand represented by the constituents of FIG. 2 in accordance with one embodiment of the present disclosure. The workflow of FIG. 7 can be part of the forward modeling framework of FIG. 1.

In an alternate approach shown in FIG. 7, petrophysical transforms are used to compute anisotropic resistivity properties of the two-zone formation model. In this approach, resistivity properties of the shale zone are computed in blocks 701 to 707 separately from resistivity properties of the sand zone computed in blocks 709 to 711. The results of blocks 707 and 711 are then combined in block 713 to produce effective anisotropic resistivity properties for the combined shale and sand zones (bock 715). The computations are carried out in each pixel to produce radial profiles of the anisotropic resistivity properties for the combined shale and sand zones of the formation.

In block 701, the anisotropic resistivities ($R_{shale-h}$ and $R_{shale-v}$) for the shale zone can be computed with a resistivity model for the shale zone, which can be given information regarding the mineral components of the shale zone, information regarding kerogen inclusions in the shale zone, and information (such as pore shape) regarding aligned wet micropores in the shale zone. The resistivity model of block 701 produces resistivity data (block 703) that characterizes the resistivity of the shale zone. Block 705 extracts or solves for TIV components of such resistivity to produce the anisotropic resistivities ($R_{shale-h}$ and $R_{shale-v}$) for the shale zone data (block 707).

In embodiments, the resistivity model of block 701 is a Differential Effective Medium (DEM) approximation model, which is given conductivities of the clay matrix of the shale zone, pore aspect ratio of the shale zone $\alpha_{shale}$, and fluid conductivities as input. The DEM model computes a conductivity matrix of the shale zone (block 703) incrementally by adding a small amount of porosity of fluid inclusions into the background clay matrix of the shale zone, until the desired porosity is reached. For example, the DEM model can produce a 3×3 conductivity matrix $\sigma^{DEM}$ as the solution of an ordinary differential equation:

$$\frac{d\sigma^{DEM}}{dv} = \frac{1}{1-v}(\sigma^i - \sigma^{DEM})Q^i,$$  Eqn. 7 where $\sigma^i$ is the inclusion conductivity matrix, and $Q^i$ is the Eshelby term that depends on the fluid inclusions and matrix as defined in Durr et al., 2002. In block 705, the diagonal terms of the conductivity matrix can be extracted to produce values for the horizontal and vertical resistivities $R_{shale-h}$ and $R_{shale-v}$ of the shale zone (block 707).

In other embodiments, block 701 can utilize other resistivity models (such as SCA and DEM models) to characterize the resistivity of the shale zone.

In block 709, the isotropic resistivity ($R_{sand}$) for the sand zone can be computed with a resistivity model for the sand zone, which can be given information regarding the mineral components of the sand zone, information (such as pore shape) regarding random-oriented dry macropores in the sand zone, and information (such as pore shape) regarding random-oriented wet micropores in the sand zone. The resistivity model of block 707 produces resistivity data (block 711) that characterizes the isotropic resistivity ($R_{sand}$) for the sand zone.

In embodiments, the resistivity model of block 709 can relate the isotropic resistivity of the sand zone $R_{sand}$ to porosity $\phi$ and water saturation $S_w$ through Archie's law given cementation and saturation exponents m and n as follows:

$$R_{sand} = (\phi)^{-n}(S_w)^{-m}R_w,$$  Eqn. 8 where $R_w$ is the formation brine resistivity.

In other embodiments, block 701 can utilize other resistivity models (such as a DEM model, SCA and DEM models) to characterize the resistivity of the sand zone.

In block 713, the effective horizontal resistivity $R_h(r_i)$ and vertical resistivity $R_v(r_i)$ of the combined shale and sand zones (block 715) can be obtained by combining the anisotropic shale resistivities (block 707) and the isotropic sand resistivity (block 711). In embodiments, such combining can be accomplished using series and parallel rules for resistivity as follows:

$$\frac{1}{R_h} = \frac{V_{sand}}{R_{sand}} + \frac{V_{shale}}{R_{shale-h}},$$  Eqn. 9

$$R_v = V_{sand}R_{sand} + V_{shale}R_{shale-v}$$

Given the radial profiles of $R_h(r_i)$ and $R_v(r_i)$ of the combined shale-sand zones, the triaxial induction data can be simulated using the numerical mode matching method as described in Wang et al., 2009.

Inversion Workflow

Figure 8A:
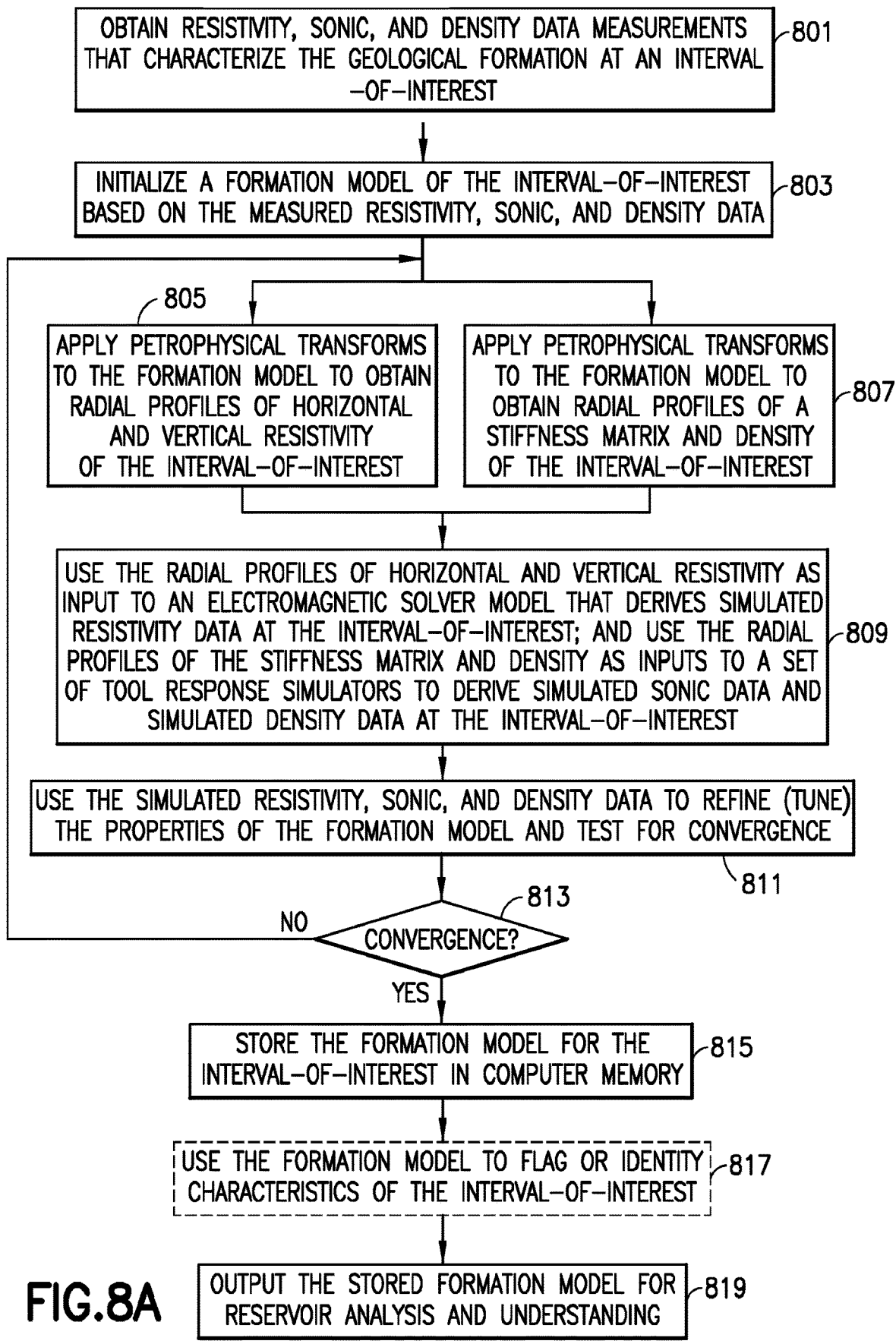
FIG. 8A is a flowchart illustrating an inversion workflow that incorporates the forward modeling framework of FIG. 1.

An embodiment of an inversion workflow employing the forward modeling framework of FIG. 1 is shown in FIG. 8A. At block 801, for a specific interval-of-interest in a well (or wellbore), resistivity data, sonic data, and density data that characterize the formation at the specific interval-of-interest are obtained from well logging operations within the well (or wellbore). In one embodiment, the resistivity data can be wellbore corrected and rotated to true north. The measurements are acquired at different source frequencies and at different spacing between the source and receiver. The measurements from different spacings and frequencies correspond to different channels (identified by a channel index). The sonic data can be generated by processing the measured waveforms with an extended Prony method to extract dispersion data for various wellbore-guided wave modes, followed by a labeling algorithm to extract the dispersion data for the flexural wave mode and Stoneley wave mode. Typically, dispersion data for the flexural wave mode between 1 kHz to 10 kHz is used in the inversion workflow. In various embodiments the sonic data can include the compressional wave velocity log and shear wave velocity log obtained by Semblance-Time-Coherence (STC) processing of the measured waveforms. In various embodiments, the sonic data is generated with multishot, subarray processing to increase the vertical resolution of the data. In another embodiment, sonic data includes the transit times of the first arrival of the compressional headwave extracted from the waveforms measured at each receiver of the sonic logging tool. The measurements at different receivers corresponds to different channels (identified by a channel index). Also, the resistivity data, the sonic data and the density data obtained from well logging operations can be made accessible for use in populating the parameters of the initial formation model, as described in greater detail below.

At block 803, an initial formation model for the interval-of-interest is derived based on the resistivity data, sonic data, and density data measured in block 801 for the interval-of-interest.

At block 805, petrophysical transforms as described above are applied to the modeled values (e.g., fluid saturations, pore aspect ratios of the sand zones, pore aspect ratios of the shale zones, and porosity parameters) to obtain radial profiles of vertical and horizontal resistivity for the combined shale and sand zones (e.g., the vertical and horizontal resistivity for the combined shale and sand zones of block 715).

At block 807, petrophysical transforms as described above are applied to the modeled values (e.g., fluid saturations, pore aspect ratios of the sand zone, pore aspect ratios of the shale zones and porosity parameters) to obtain radial profiles of a stiffness matrix (e.g., the effective stiffness matrix for the combined shale-sand zones of block 315) and density of the formation at the interval-of-interest.

At block 809, the radial profiles of horizontal and vertical resistivities of the combined shale-sand zones at the interval-of-interest (e.g., the vertical and horizontal resistivity for the combined shale and sand zones of block 715) can be used as an input to the electromagnetic physics-based tool response simulator as described above that derives simulated resistivity data for the interval-of-interest. Furthermore, the radial profile of the stiffness matrix (e.g., the effective stiffness matrix for the combined sand-shale of block 315) and the radial profile of density of the formation at the interval-of-interest can be used as inputs to one or more sonic physics-based tool response simulators and a density physics-based tool response simulator as described above that derives simulated sonic data and simulated density data for the interval-of-interest.

At block 811, the simulated resistivity data of block 809, the simulated sonic data of block 809, and the simulated density data of block 809 are compared to the corresponding measured log data to determine if such data match within a predefined threshold, i.e., if the simulated log data and measured log data converge. If the simulated data and measured data do not match (e.g., there is no convergence), then the formation model is refined with new values and blocks 805 to 811 are repeated until the simulated log data matches the measured log data (e.g., there is convergence). If the simulated log data matches the measured log within the threshold (there is convergence as noted by YES at block 813), then the resultant formation model values for the interval-of-interest are stored into computer memory at block 815.

At optional block 817, the resultant formation model can be used to flag or identify characteristics of the interval-of-interest. Specifically, a two-dimensional formation model, with both radial and vertical variation of porosity, fluid saturations and sand/shale pore aspect ratios, can be created by stacking the one-dimensional radially varying formation models obtained as output from the inversion over a sequence of intervals. Simulated data that includes the two-dimensional effect can then be generated by using this created two-dimensional formation model as input to the two-dimensional tool response simulators. The simulated data for the two-dimensional formation model is compared with the simulated data from the inversion. Any intervals where the simulated data for the two-dimensional formation model differs significantly (i.e., beyond a predetermined threshold) from the simulated data from the inversion indicates that two-dimensional effects are significant in those intervals. Accordingly, the output from the inversion in those intervals can be flagged as requiring correction for two-dimensional effects.

At block 819, the stored data that represents the formation model for one or more intervals-of-interest can be output for analysis, such as for reservoir analysis and understanding.

Figure 8B:
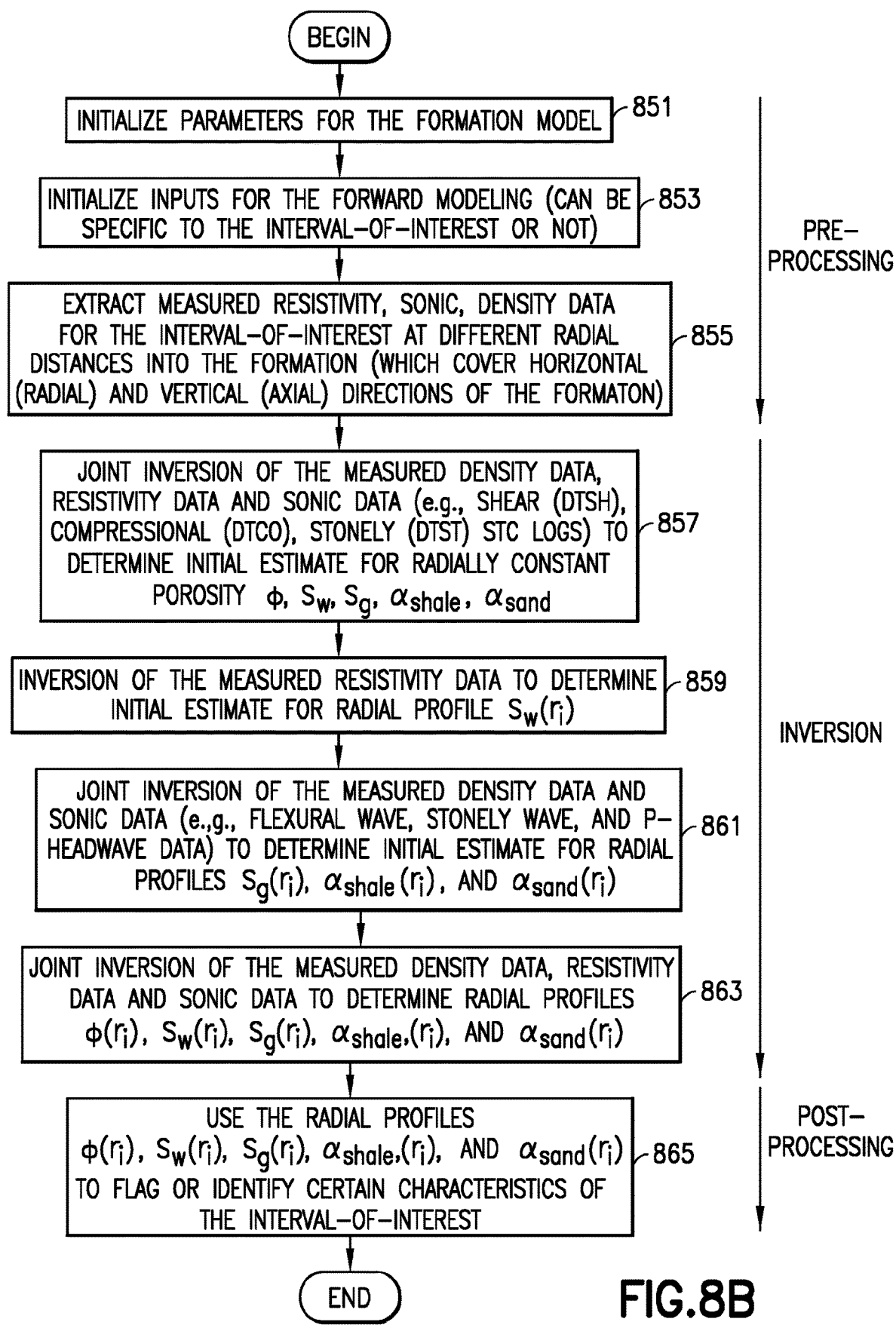
FIG. 8B is a flow chart illustrating an embodiment of joint inversion processing that can be part of the inversion workflow of FIG. 8A.

FIG. 8B shows an embodiment of further details of the inversion workflow of FIG. 8A. Specifically, the inversion processing includes a plurality of sub-blocks 857 to 863 that together carry out a joint, inversion-based solution of the formation model parameters. In the sub-blocks 857 to 863, the simulated data is used to tune the formation model for the interval-of-interest based on a comparison between the measured log data and the simulated log data for the interval-of-interest.

In block 857, joint inversion of the measured density data, resistivity data and sonic data (e.g., Shear (DTSH), Compressional (DTCO), Stoneley Horizontal Shear (DTST) STC logs) can be performed to determine an initial estimate for radially constant porosity $\phi$, $S_w$, $S_g$, $\alpha_{shale}$, and $\alpha_{sand}$ at the interval-of-interest.

In block 859, an inversion of the measured resistivity data can be performed to determine an initial estimate for the radial profile $S_w(r_i)$ at the interval-of-interest.

In block 861, a joint Inversion of the measured density data and sonic data (e.g., flexural wave, Stoneley wave, and P-headwave data) can be performed to determine an initial estimate for radial profiles $S_g(r_i)$, $\alpha_{shale}(r_i)$, and $\alpha_{sand}(r_i)$ at the interval-of-interest.

And in block 863, a joint inversion of the measured density data, resistivity data and sonic data can be performed to determine radial profiles $\phi(r_i)$, $S_w(r_i)$, $S_g(r_i)$, $\alpha_{shale}(r_i)$, and $\alpha_{sand}(r_i)$ at the interval-of-interest.

Various other properties of the formation can be determined from the finally determined values of the formation model.

In the inversion processing of FIG. 8B, the cost-function for the inversion operations can be defined as the squared $L_2$ norm of the relative error in the measured and simulated data. The best-fit parameters can be defined as the minimum of the cost-function on a box domain. A smoothness regularization term can be added to the cost-function to reduce non-uniqueness. The best-fit parameters can be estimated using Gauss-Newton optimization with line-search, adaptive regularization, and non-linear mapping for box constraints. See T. M. Habashy and A. Abubakar, "A general framework for constraint minimization for the inversion of electromagnetic measurements," Progress In Electromagnetics Research, Vol. 46, 265-312, 2004. To increase robustness, the initial guess for the optimization can be obtained by estimating a subset of parameters and subset of data sensitive to those parameters. For example, the initial guess for porosity can be estimated from the density log assuming water-filled pores in the flushed zone. Pore shape of shale and sand in the far-field, and gas-saturation in the flushed zone can be estimated from Stoneley, shear, and compressional logs in block 857. The initial radial profile of water saturation $S_w(r_i)$ can be estimated from resistivity data alone in block 859, keeping all other parameters fixed, starting from radially homogeneous 50% water saturation. The radial profile of the pore shapes $\alpha_{shale}(r_i)$, and $\alpha_{sand}(r_i)$ and gas saturation $S_g(r_i)$ can be further refined from flexural wave dispersion, Stoneley wave dispersion, and compressional headwave transit times in block 861. Finally, starting from the formation parameters from the prior steps, all parameters can be refined simultaneously using all the data in block 863.

Figure 9:
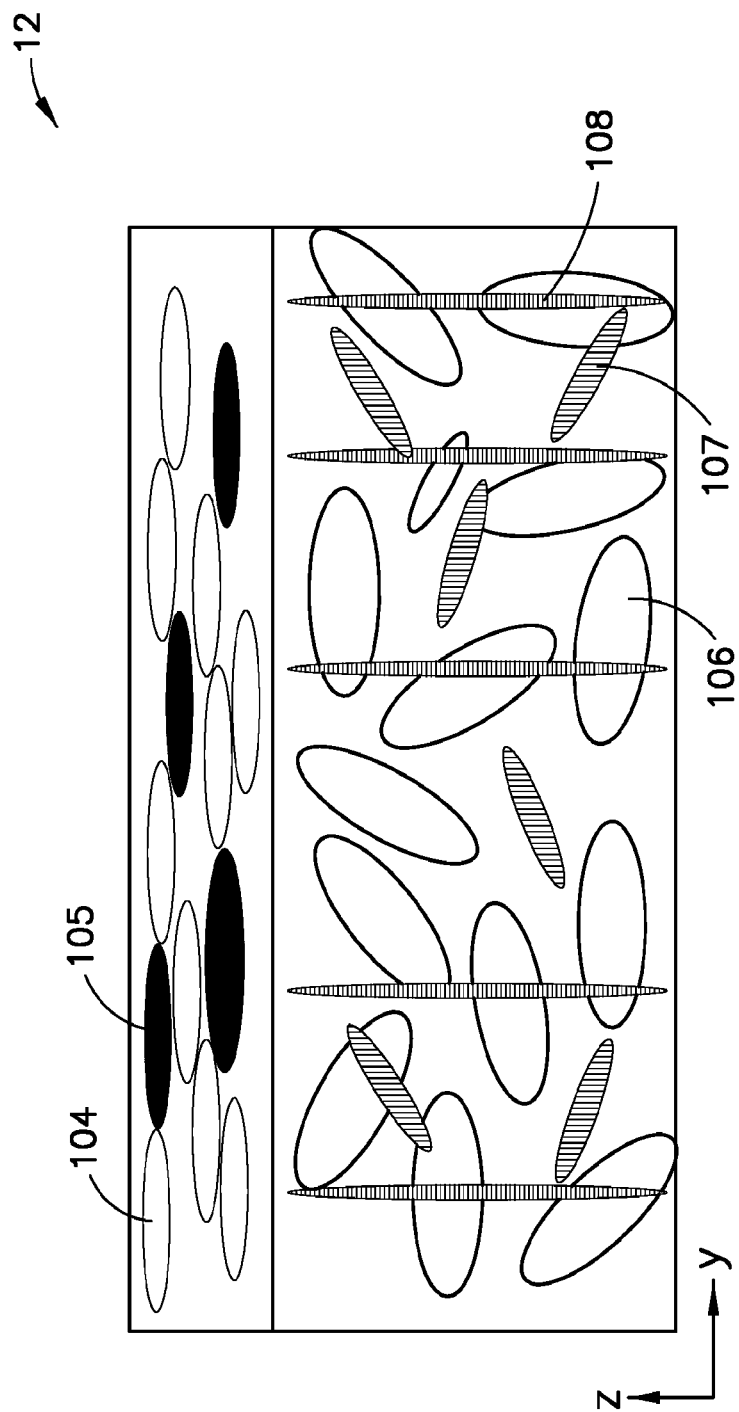
FIG. 9 illustrates constituents of a single zone of shale and constituents of a single zone of sand, where such two zones are used to represent a laminated layer of multiple fine layers of shale and sand in accordance with one embodiment of the present disclosure. The single zone of shale includes oblate spheroidal pores and kerogen inclusions all aligned in parallel with the layering with an aspect ratio ($\alpha_{shale}$). The single zone of sand has randomly oriented pores with an aspect ratio ($\alpha_{sand}$) along with microcracks with an aspect ratio ($\alpha_{crack}$). Parameters representing the constituents of the single zone of shale of FIG. 9 and parameters representing the constituents of the single zone of sand of FIG. 9 can be used in the forward modeling framework of FIG. 1.
Figure 10:
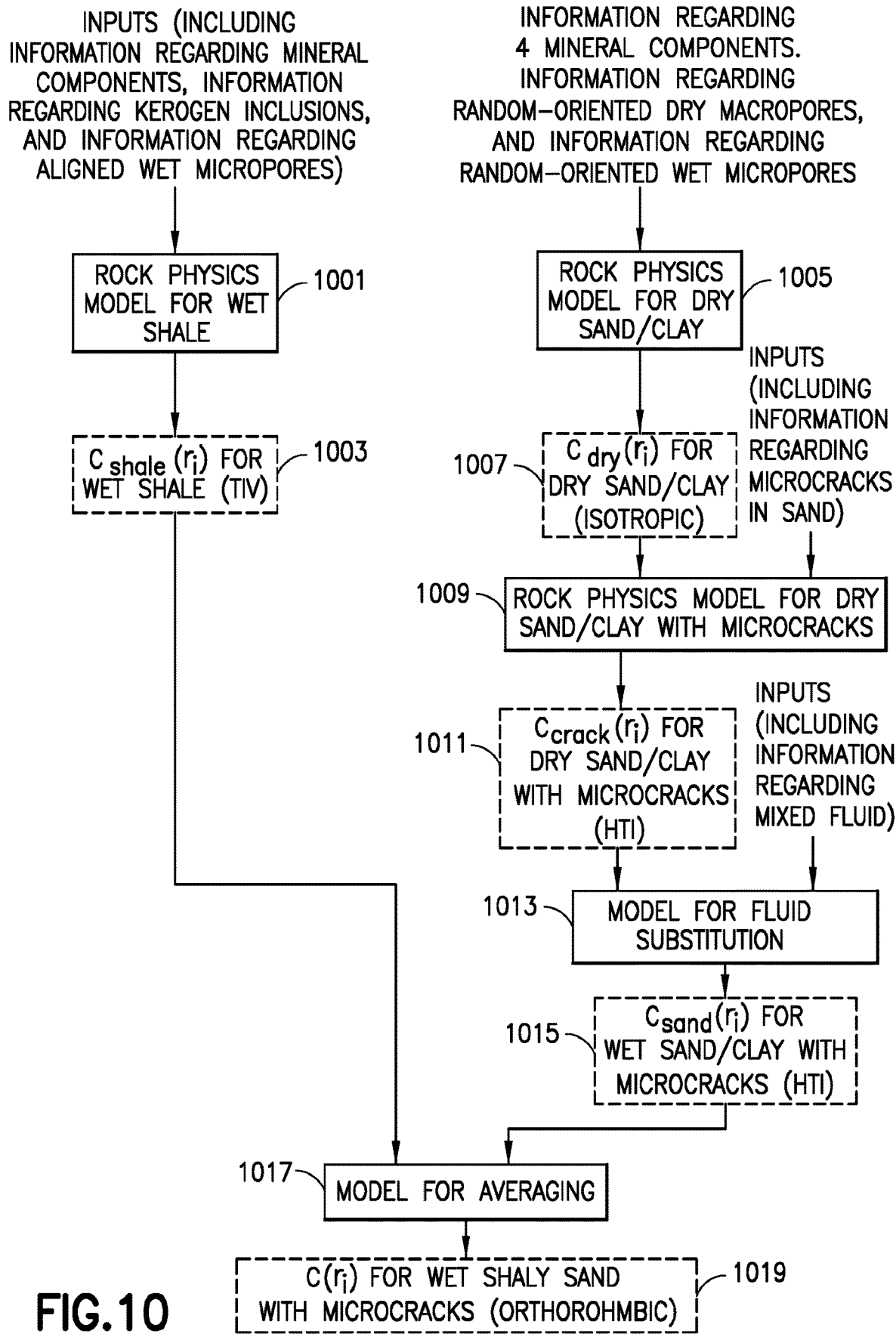
FIG. 10 shows a workflow for estimating an effective stiffness matrix for a laminate layer of shale and sand represented by the constituents of FIG. 9 in accordance with one embodiment of the present disclosure. The workflow of FIG. 10 can be part of the forward modeling framework of FIG. 1.

Stress effects can induce microcracks in the sand zones of the formation. Such microcracks can be accounted for by adding inclusions or microcracks 108 to the formation model as shown in FIG. 9. The microcracks can be aligned vertically (or in the direction transverse to the bedding) as shown or possibly aligned in some other predefined orientation. The microcracks can be described by a number of model parameters including a crack porosity $\phi_{crack}$, a crack aspect ratio $\pi_{crack}$, a crack orientation vector $t_{crack}$, and bulk modulus $K_{crack}$ of fluid that saturates the microcracks of the sand zone. In this embodiment, the forward modeling workflow of FIG. 1 can employ a petrophysical transform for computing elastic properties of the two-zones of the formation model as shown in FIG. 10. In this model, effective elastic properties of shale zone are computed in blocks 1001 to 1003 separately from effective elastic properties of sand zone computed in blocks 1005 to 1015. The results of blocks 1003 and 1015 are then combined in block 1017 to produce effective elastic properties for the combined shale and sand zones (labeled 1019). The computations are performed in each pixel to derive radial profiles of the various stiffness matrices.

In block 1001, a rock physics model for wet shale is used to determine an TIV stiffness matrix for the wet shale zone (referred to as "$C_{shale}$" and labeled box 1003). In embodiments, the rock physics model of block 901 employs Self-Consistent Approximation (SCA) followed by Differential Effective Medium Model (DEM). The rock physics model for wet shale can employ inputs such as the shale mineralogy, shale porosity $\phi_{shale}$ of the shale zone and pore shape of the grains and pores. For example, the grains and pores of the shale can be defined as oblate spheroids with major axis aligned with layer boundaries and aspect ratio defined in FIG. 4. Organic kerogen inclusions can be added to the shale given the inclusion aspect ratio and mineralogy. This model supports different aspect ratios for the pores, grains, and organic inclusions. Here, to reduce the number of free parameters, the aspect ratio of grain, pores, and kerogen inclusions can be constrained to be identical, denoted by $\alpha_{shale}$. Such operations can be the same or similar to those of block 301 as described above.

For the sand zone, block 1005 employs a rock physics model for dry sand to produce an isotropic stiffness matrix for the dry sand (referred to as "$C_{dry}$" and labeled box 1007). The inputs to the model of block 905 can include the sand mineralogy, the porosity parameter $\phi$ and the pore aspect ratio $\alpha_{sand}$ of the randomly-oriented pores of the sand zone. Such operations can be the same or similar to those of block 305 as described above.

In block 1009, a rock physics model for dry sand with microcracks is used to produce an HTI (or transverse isotropic with horizontal axis of symmetry) stiffness matrix (referred to as "$C_{crack}$" and labeled box 1011). The model first computes an isotropic stiffness matrix for dry sand using Xu-White, followed by Differential Effective Medium (DEM) to add the aligned microcracks to the dry sand background.

In block 1013 a model for fluid substitution (such as the anisotropic extension of Gassman model, known as Brown-Korringa) is applied to saturate the macropores of the sand zone with fluid of specified bulk modulus $K_{macro}$ and saturate the microcracks of the sand zone with fluid of specified bulk modulus $K_{crack}$ to determine an HTI stiffness matrix for the saturated sand and clay (referred to as "$C_{sand}$" and labeled box 1015). Such operations can be similar to those of block 309.

In block 1017, the TIV stiffness matrix $C_{shale}$ (block 1003) can be combined with the HTI stiffness matrix $C_{sand}$ (block 1015) to produce an effective orthorhombic stiffness matrix C for the combined shale and sand zones (box 1019). Block 1017 can employ an anisotropic extension of the Backus average as described in Mavko et al., "The Rock Physics Handbook: Tools for Seismic Analysis of Porous Media," Cambridge University Press, 2009. Such operations can be similar to those of block 313.

Figure 11B:
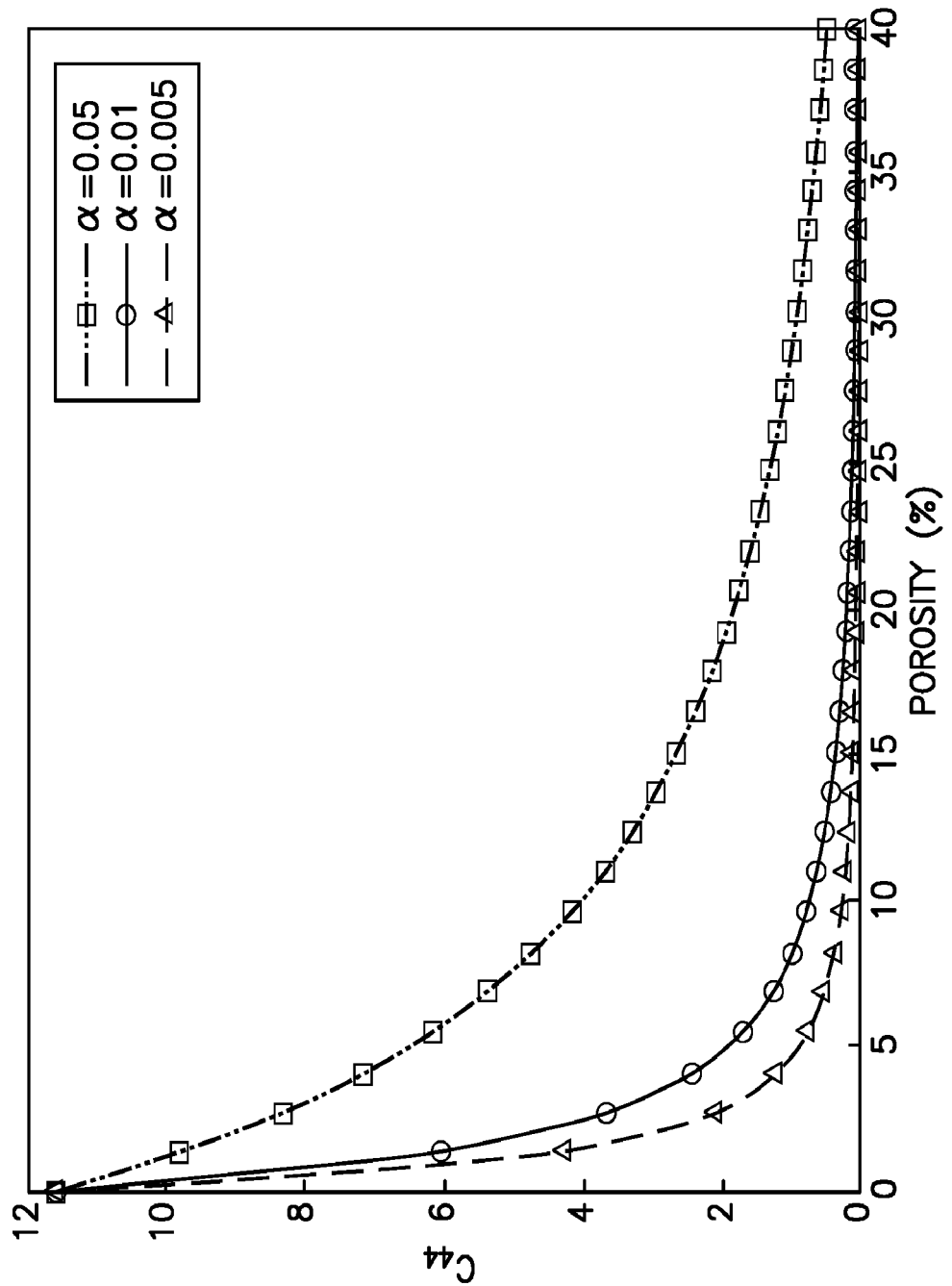
Figure 12A:
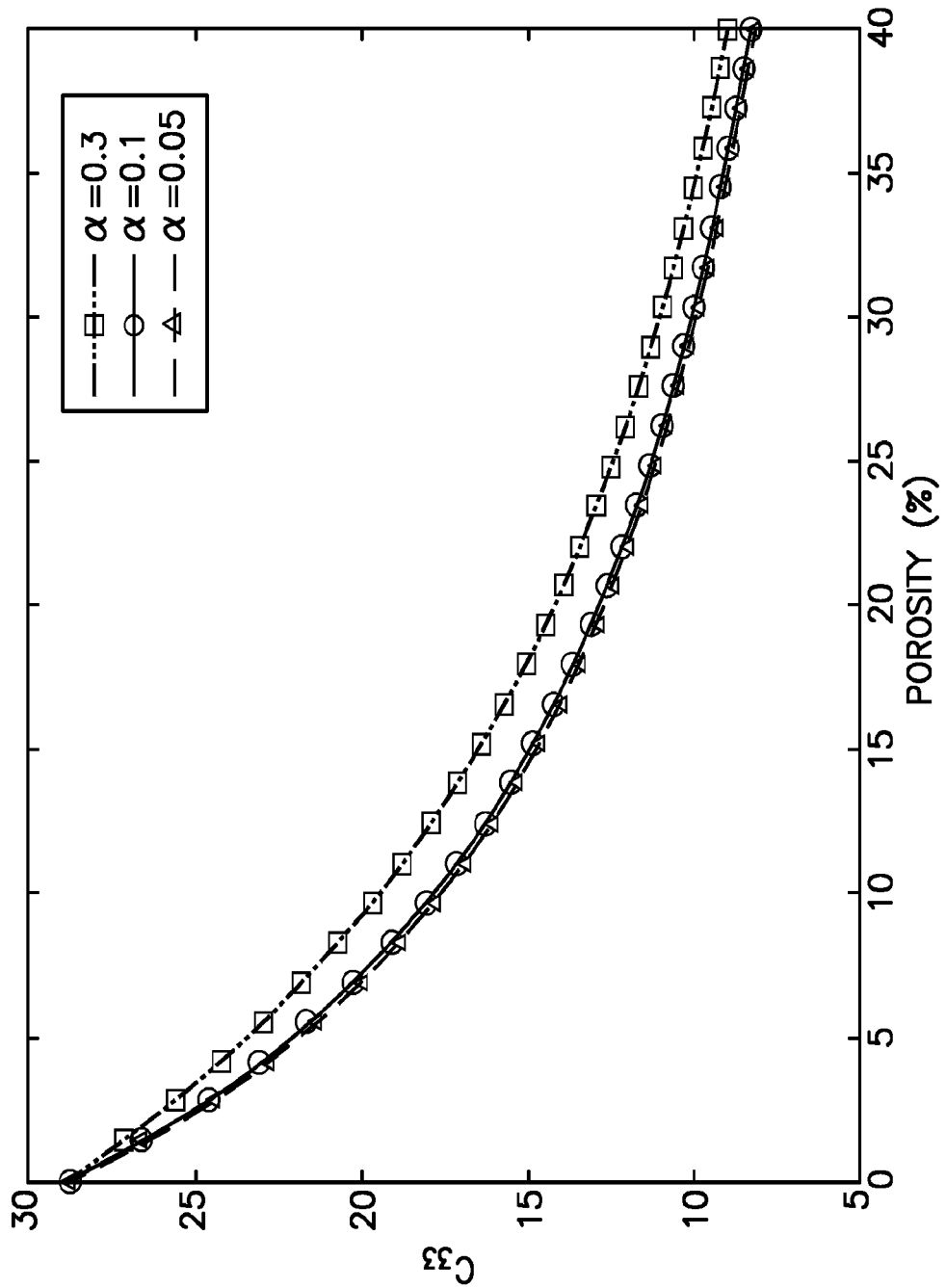
Figure 12C:
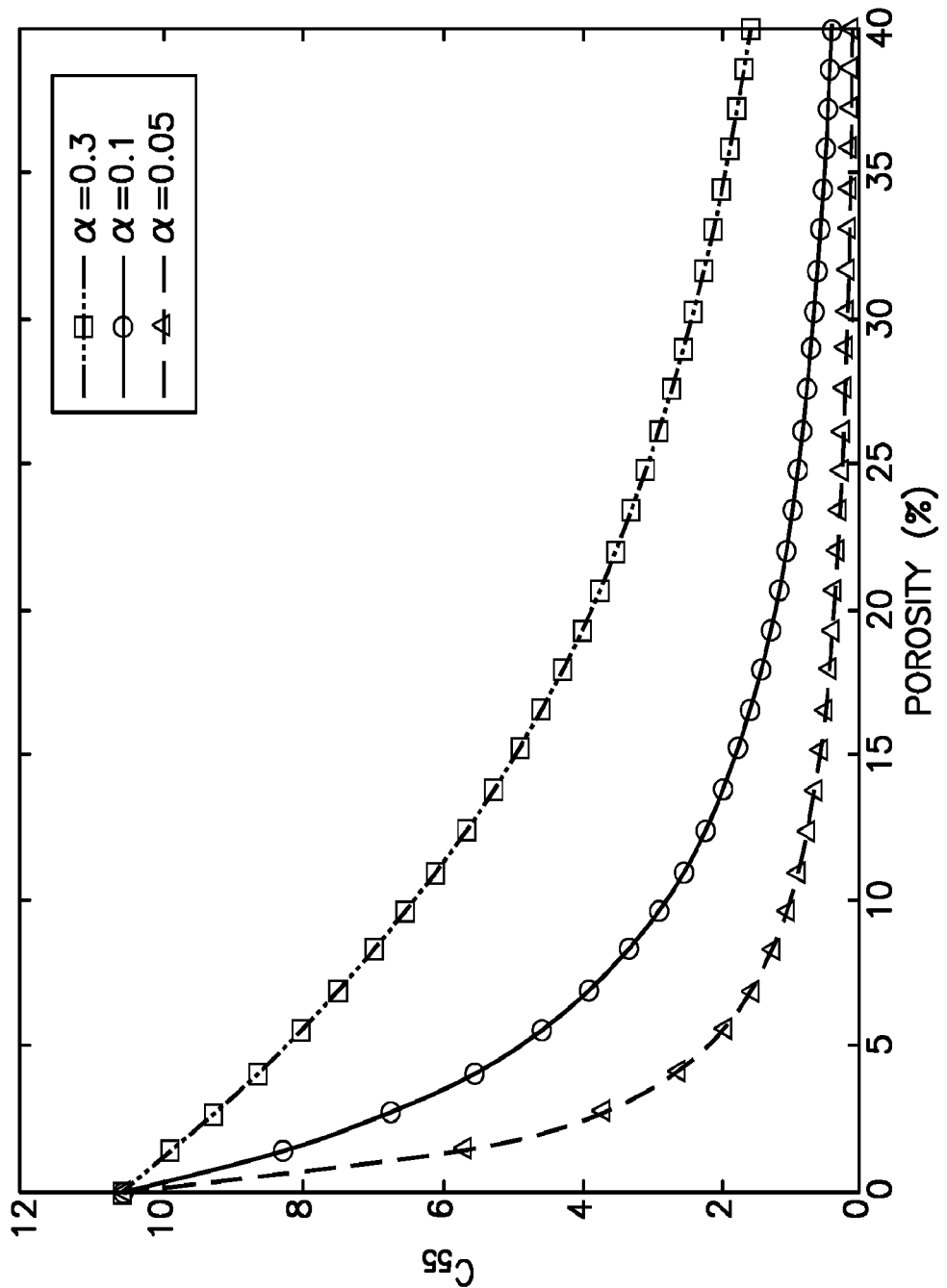
Figure 12D:
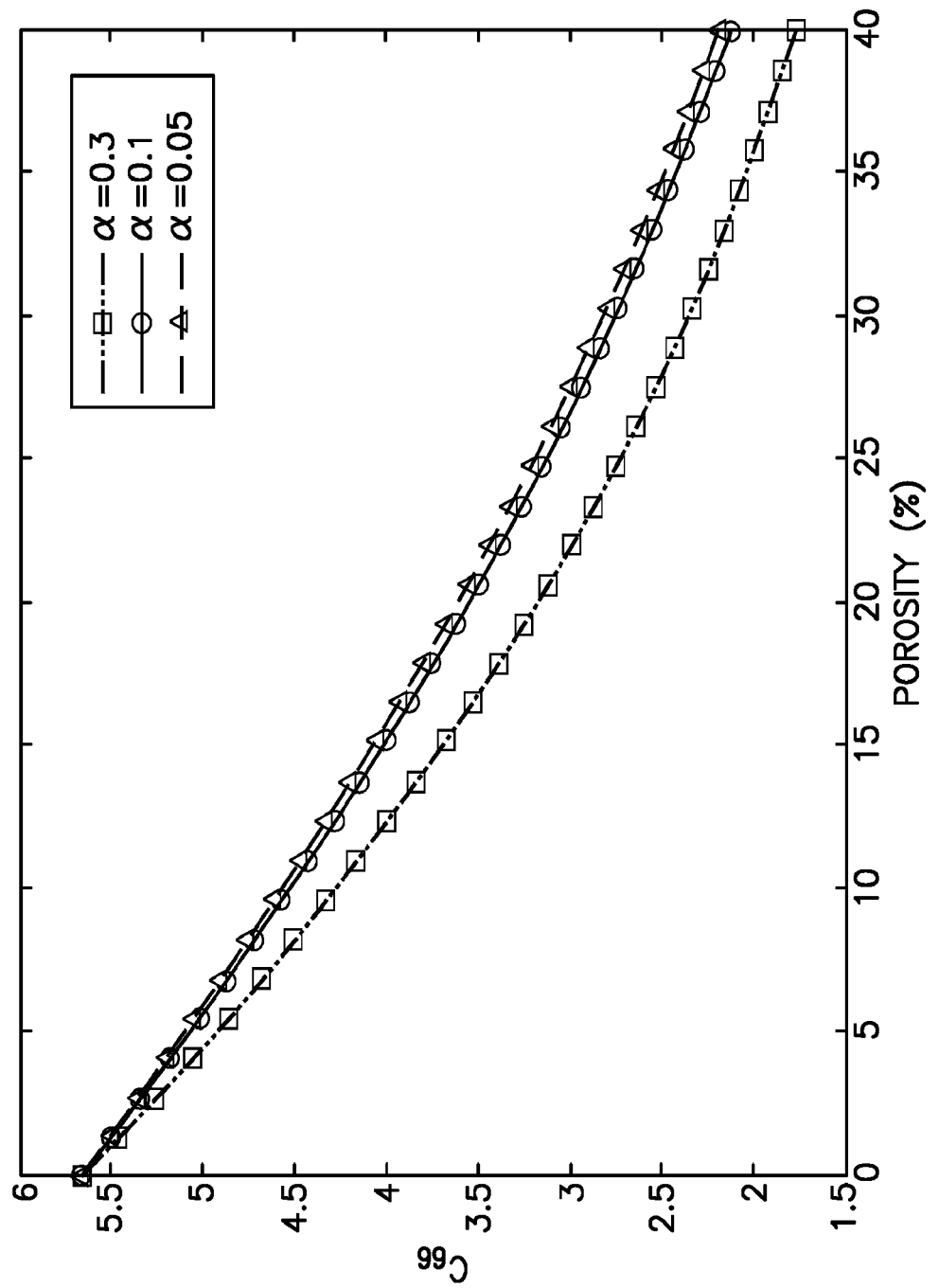
Figure 13A:
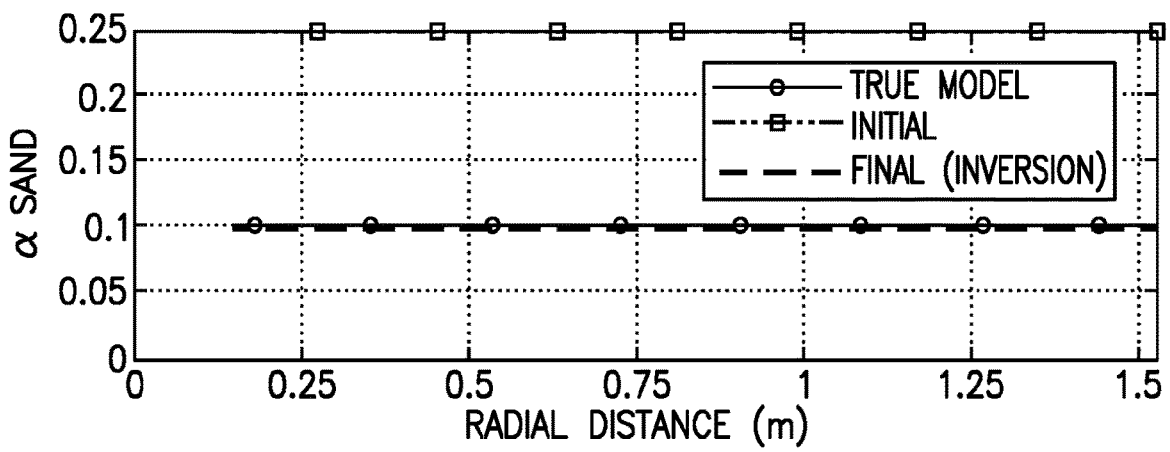
FIGS. 13A-13E illustrate formation model parameters that are reconstructed using the inversion workflow of FIGS. 8A and 8B.
Figure 13B:
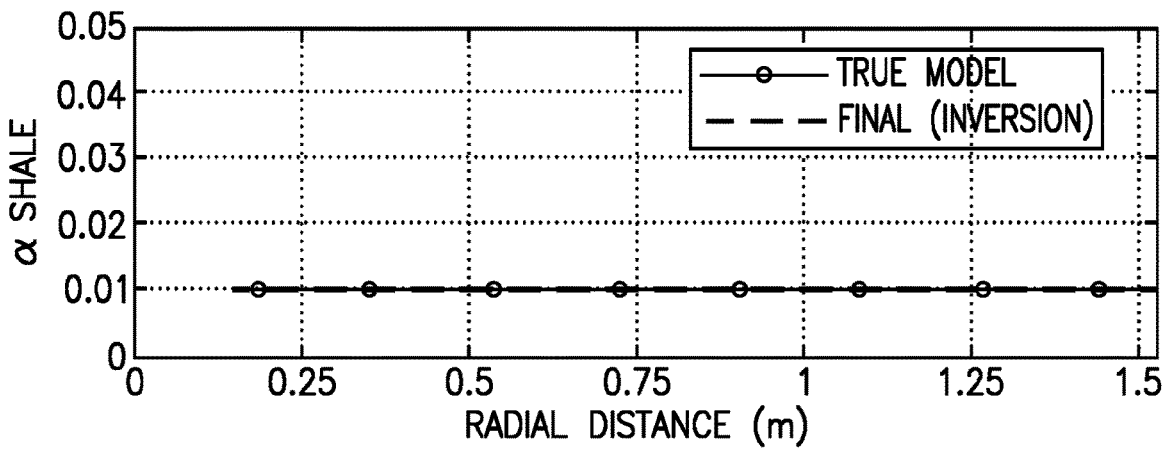
Figure 13C:
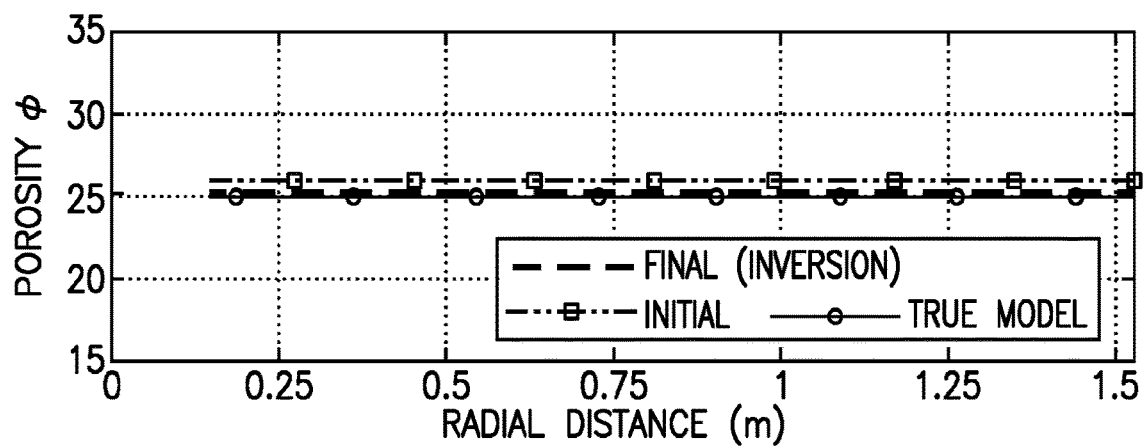
Figure 13D:
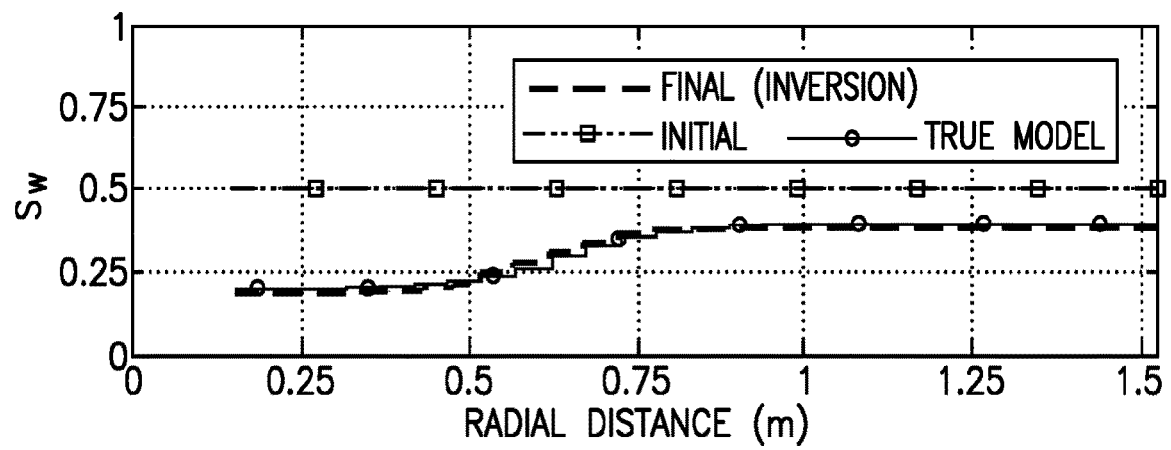
Figure 13E:
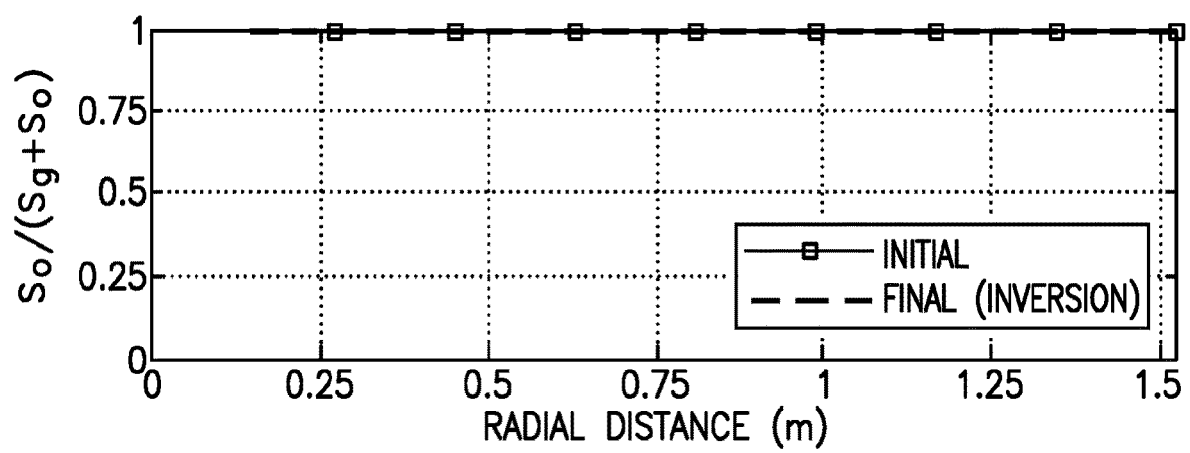
Figure 13F:
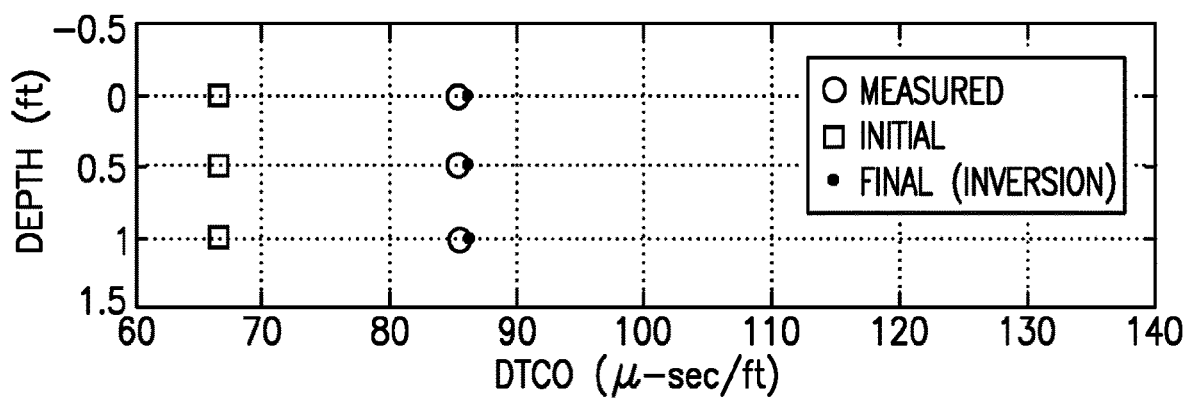
FIGS. 13F-13J illustrate measured and simulated sonic data, resistivity data, and density data generated using the inversion workflow of FIGS. 8A and 8B. Here, the data is from an oil-bearing formation drilled with oil-base mud and shale conductivities were computed using Archie's law and a known shale anisotropy ratio.
Figure 13G:
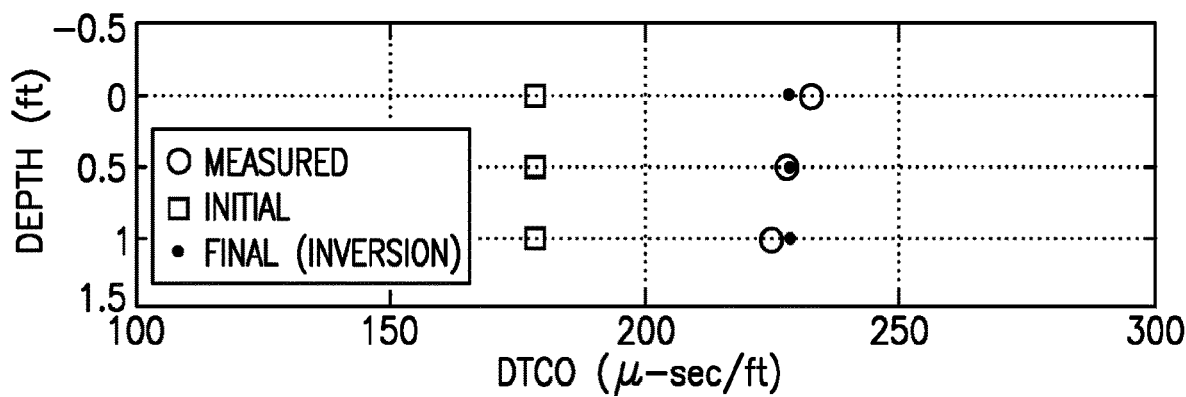
Figure 13H:
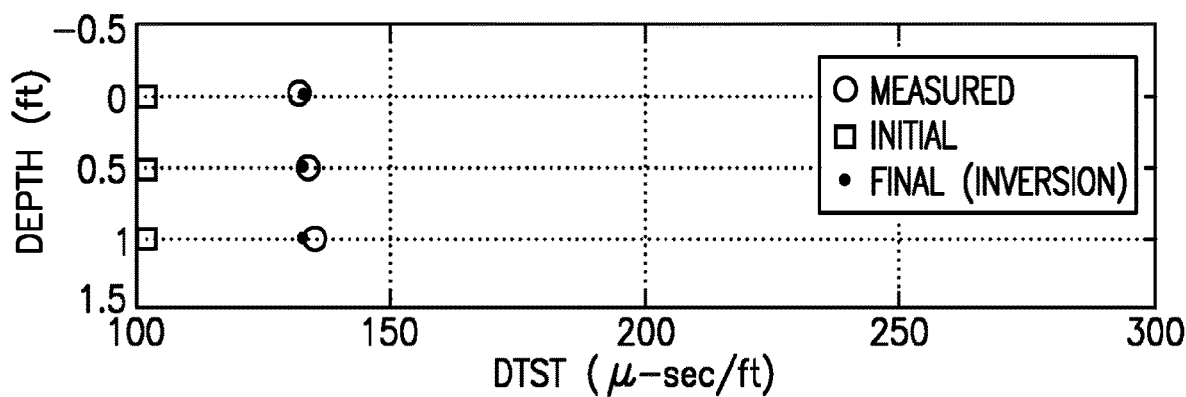
Figure 13I:
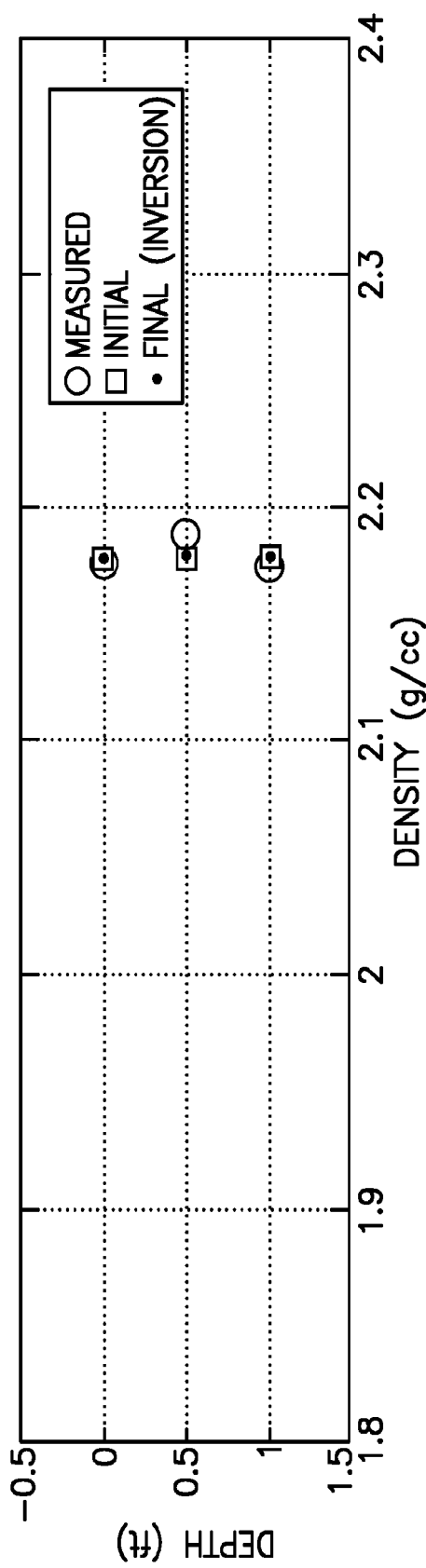
Figure 13J:
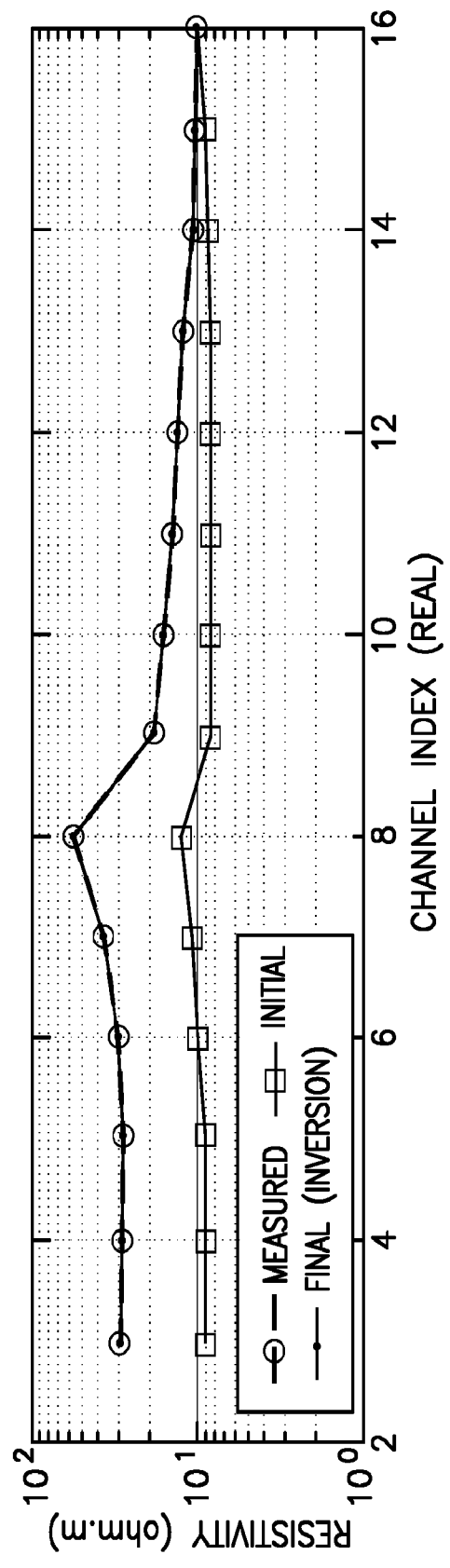
Figure 14A:
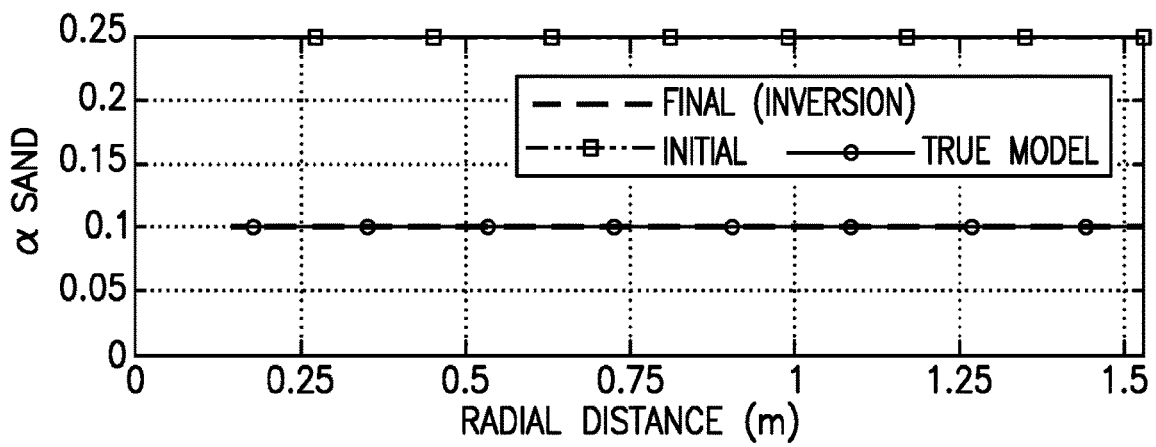
FIGS. 14A-14E illustrate formation model parameters that are reconstructed using the inversion workflow of FIGS. 8A and 8B.
Figure 14B:
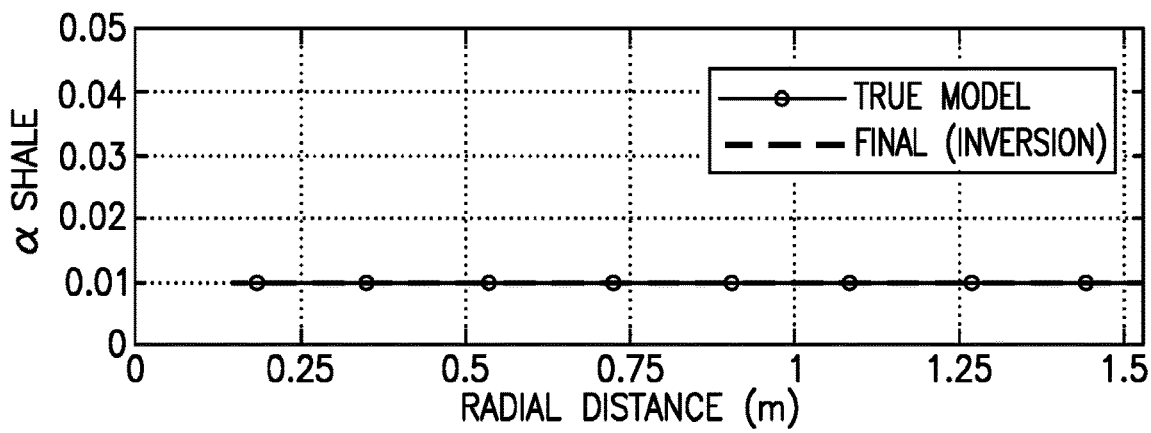
Figure 14C:
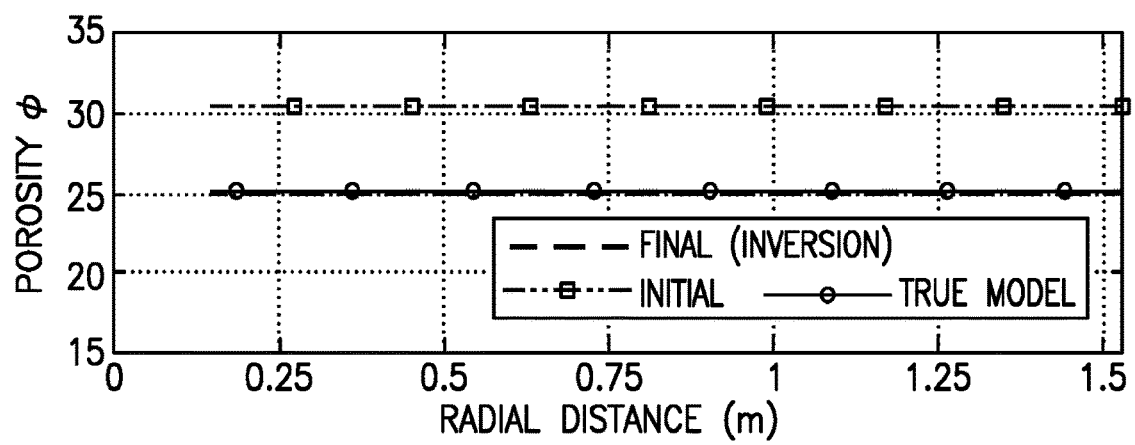
Figure 14D:
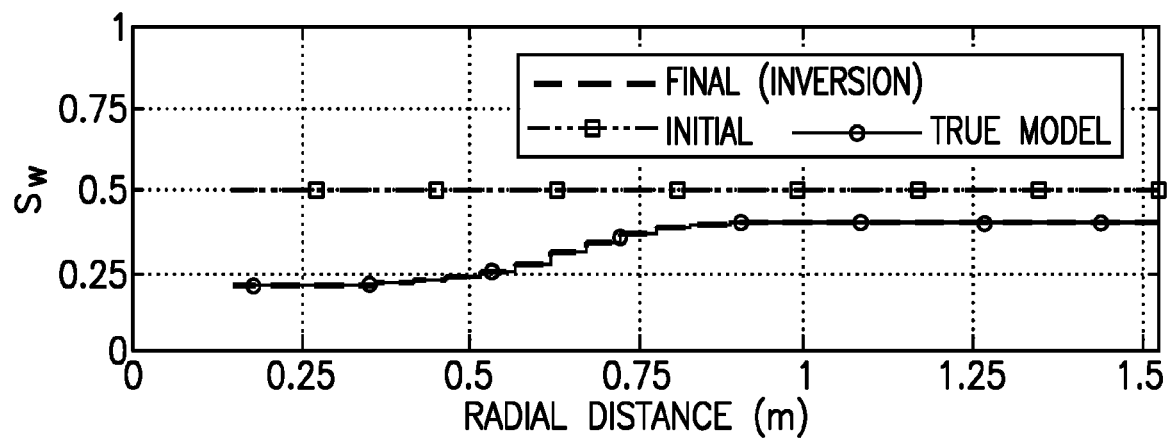
Figure 14E:
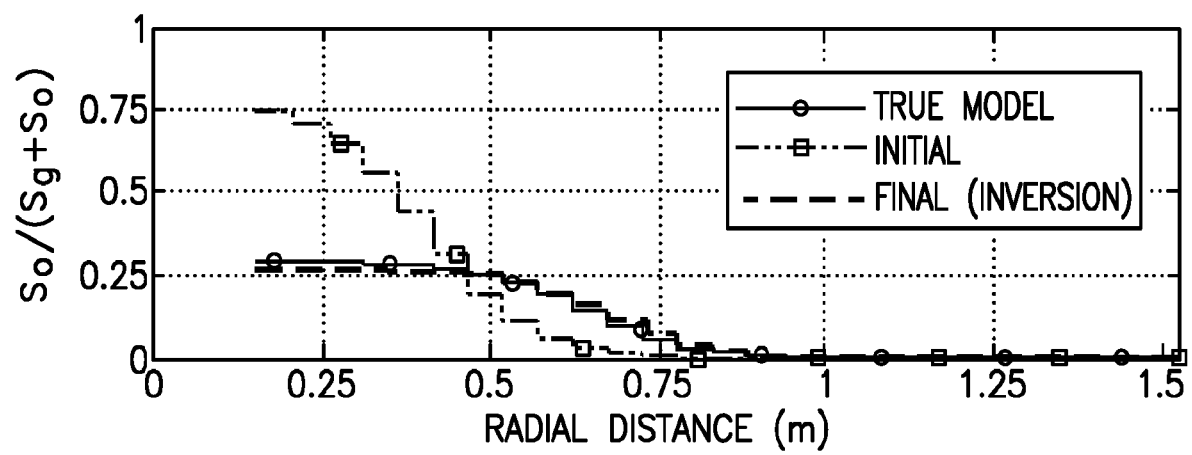
Figure 14F:
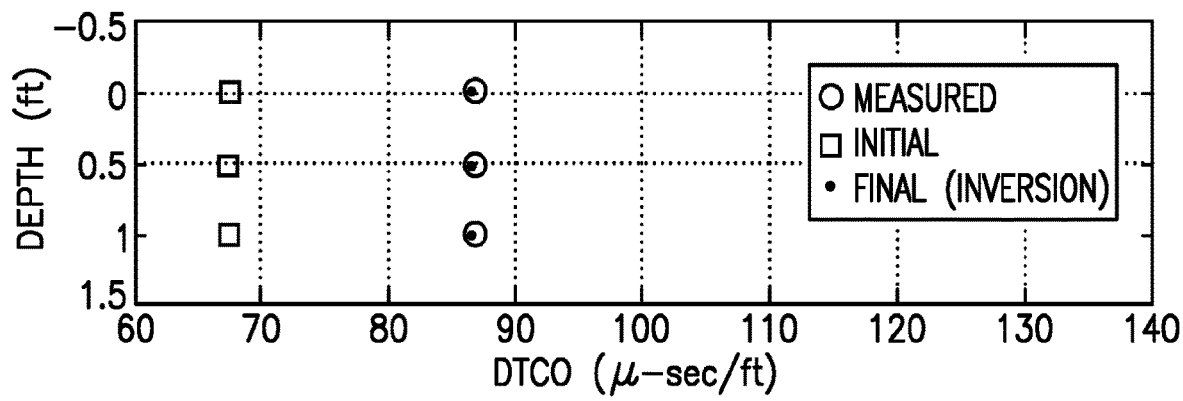
FIGS. 14F-14J illustrate measured and simulated sonic data, resistivity data, and density data generated using the inversion workflow of FIGS. 8A and 8B. Here, the data is from a gas-bearing formation drilled with oil-base mud and shale conductivities were computed using Archie's law and a known shale anisotropy ratio.
Figure 14G:
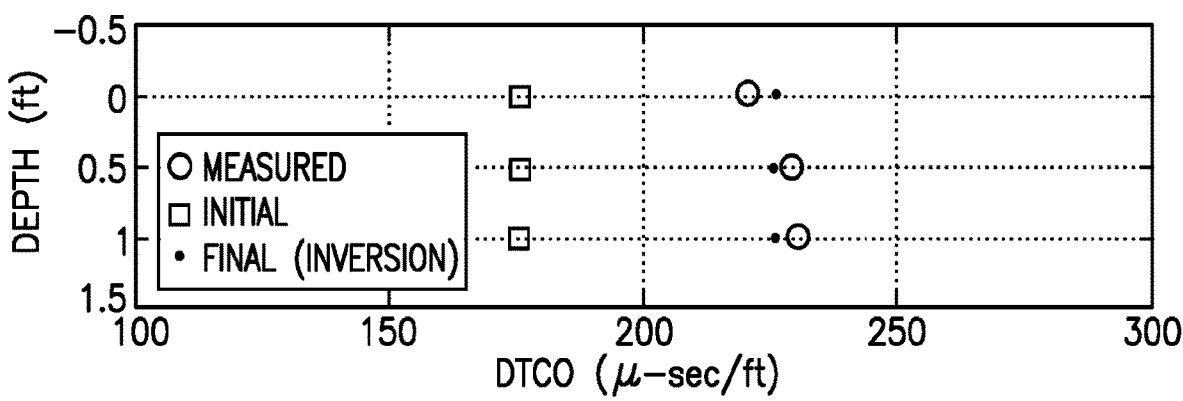
Figure 14H:
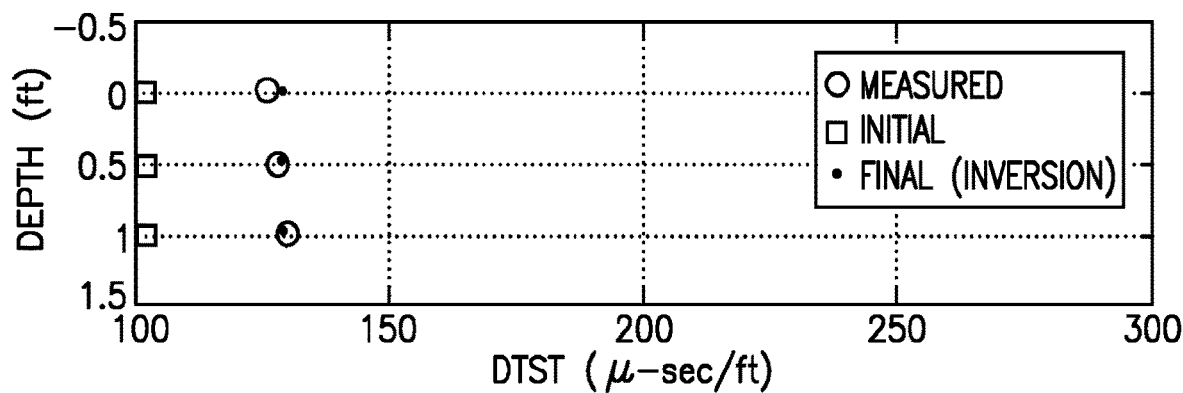
Figure 14I:
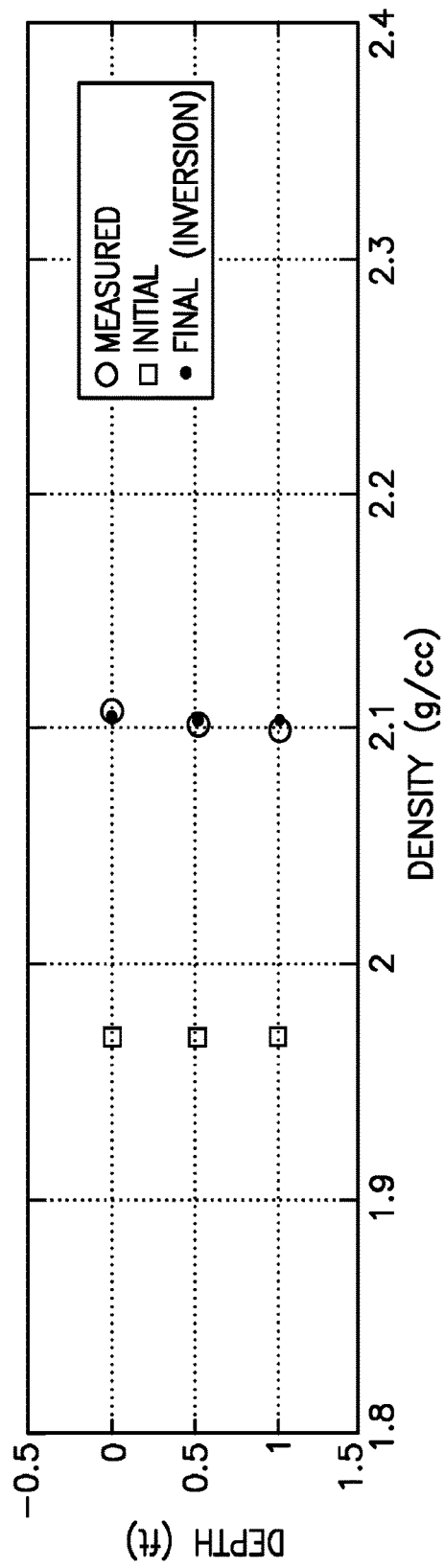
Figure 14J:
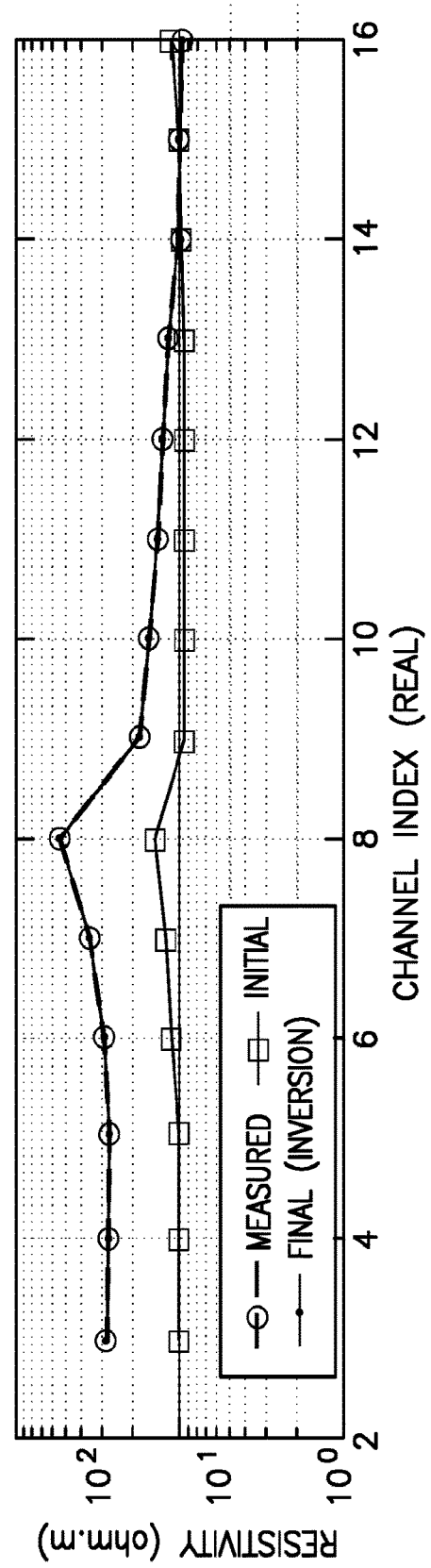
Figure 15A:
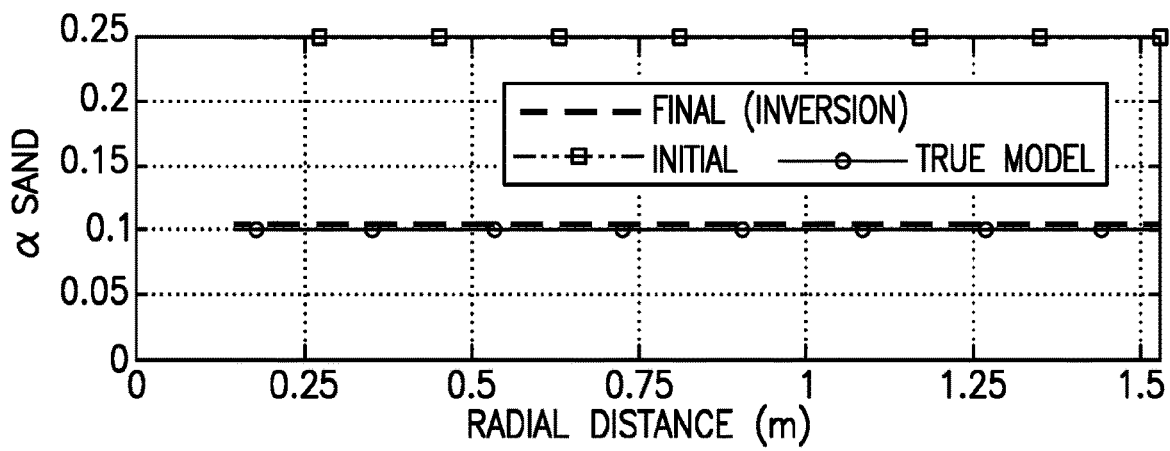
FIGS. 15A-15E illustrate formation model parameters that are reconstructed using the inversion workflow of FIGS. 8A and 8B.
Figure 15B:
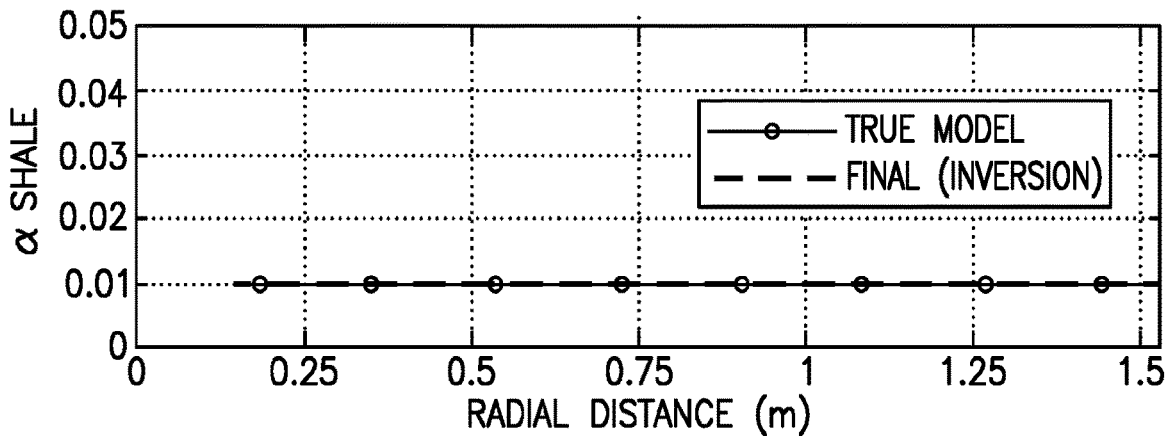
Figure 15C:
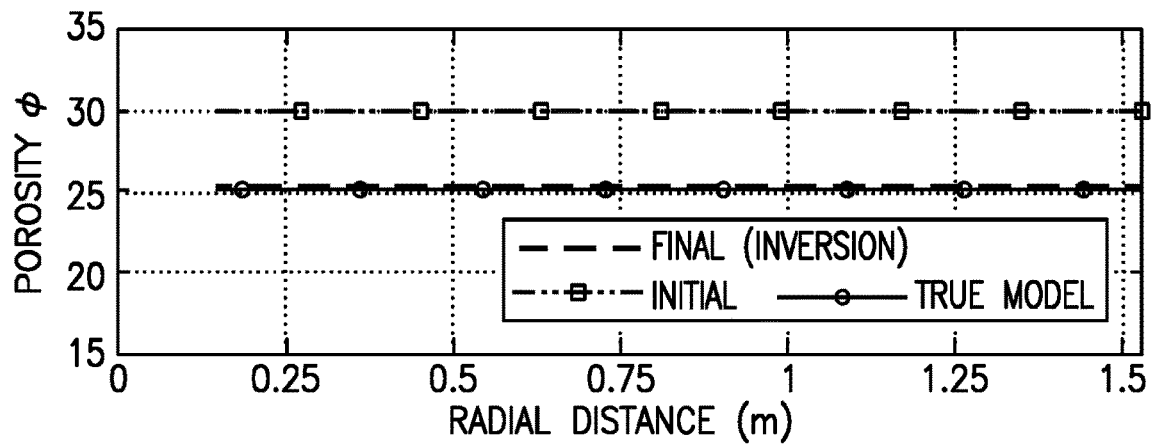
Figure 15D:
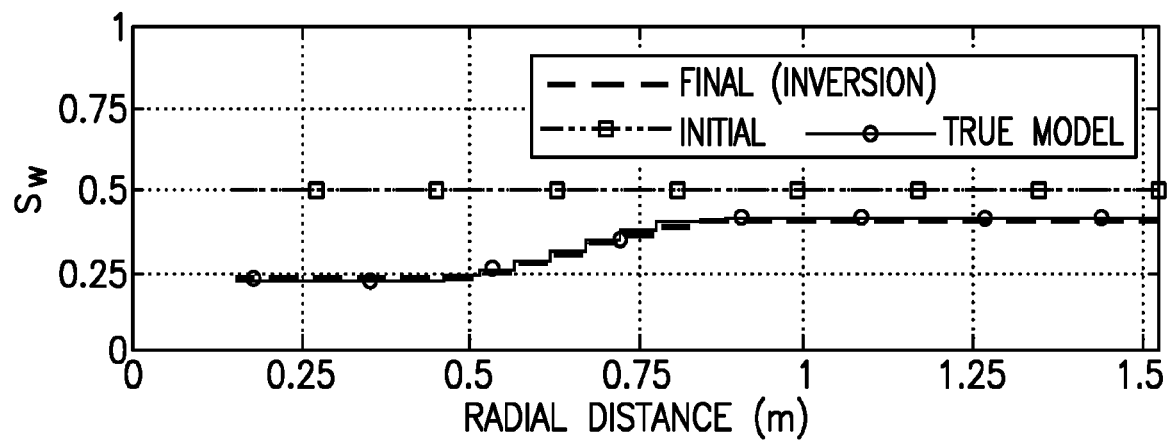
Figure 15E:
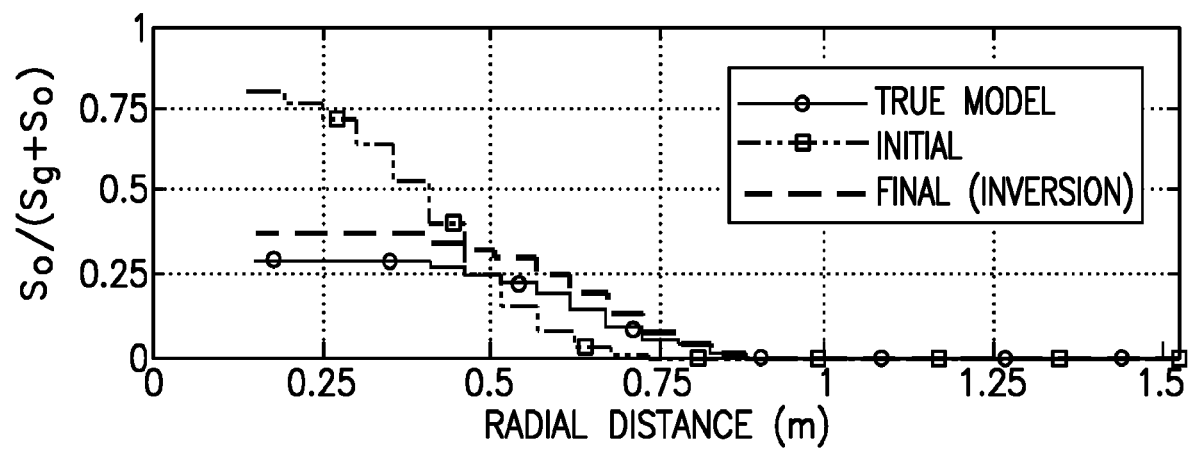
Figure 15F:
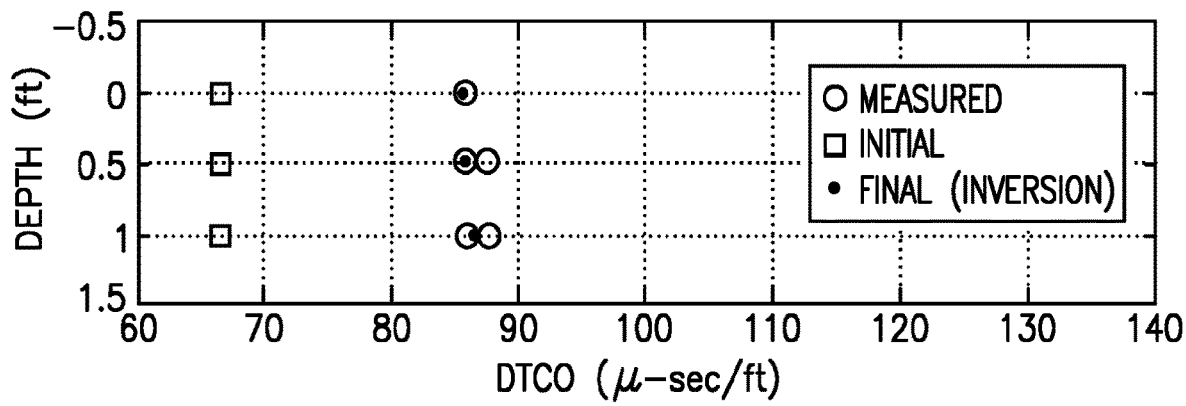
FIGS. 15F-15J illustrate measured and simulated sonic data, resistivity data, and density data generated using the inversion workflow of FIGS. 8A and 8B. Here, the data is from a gas-bearing formation drilled with oil-base mud and shale conductivities were computed using a Differential Effective Medium (DEM) model.
Figure 15G:
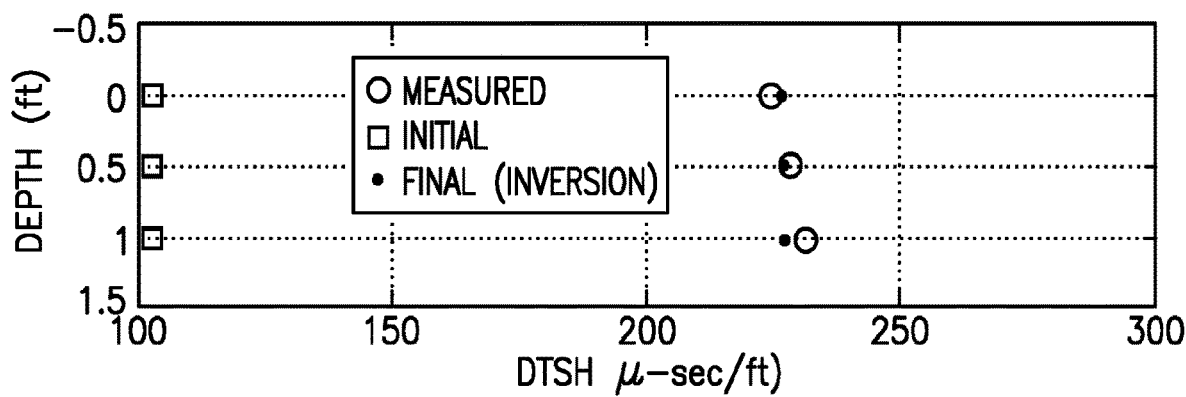
Figure 15H:
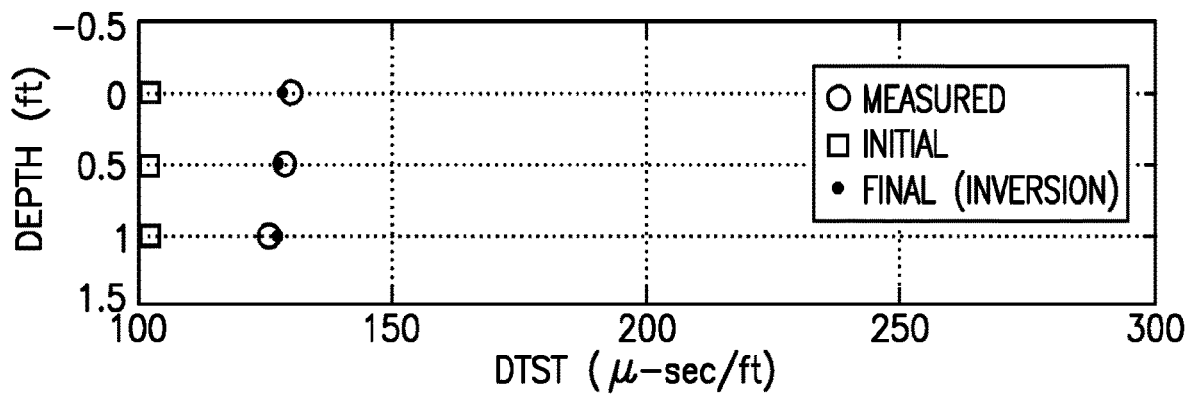
Figure 15I:
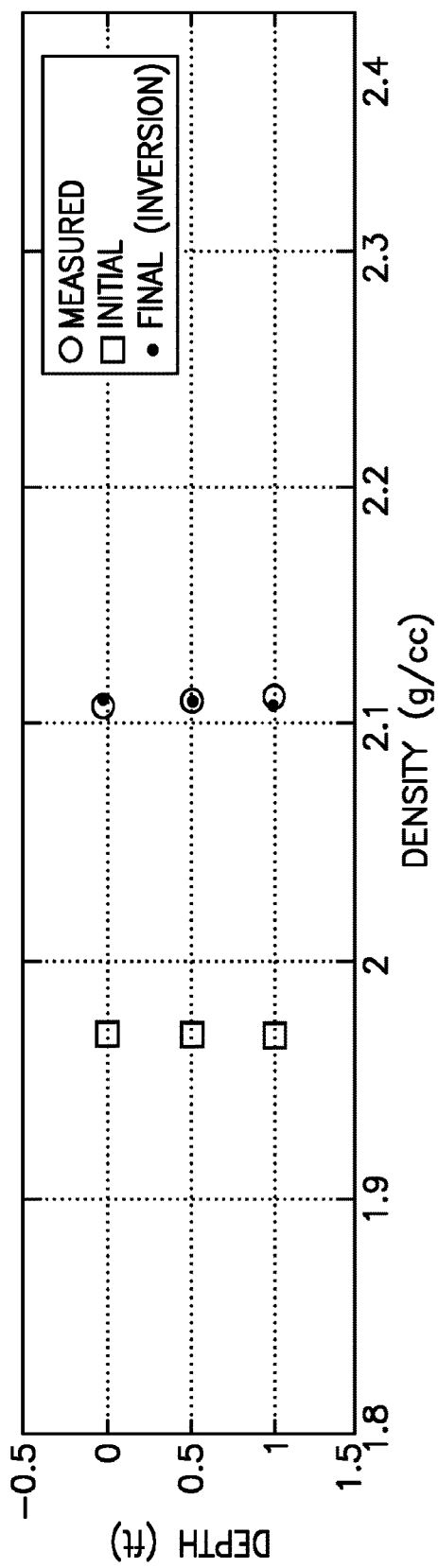
Figure 15J:
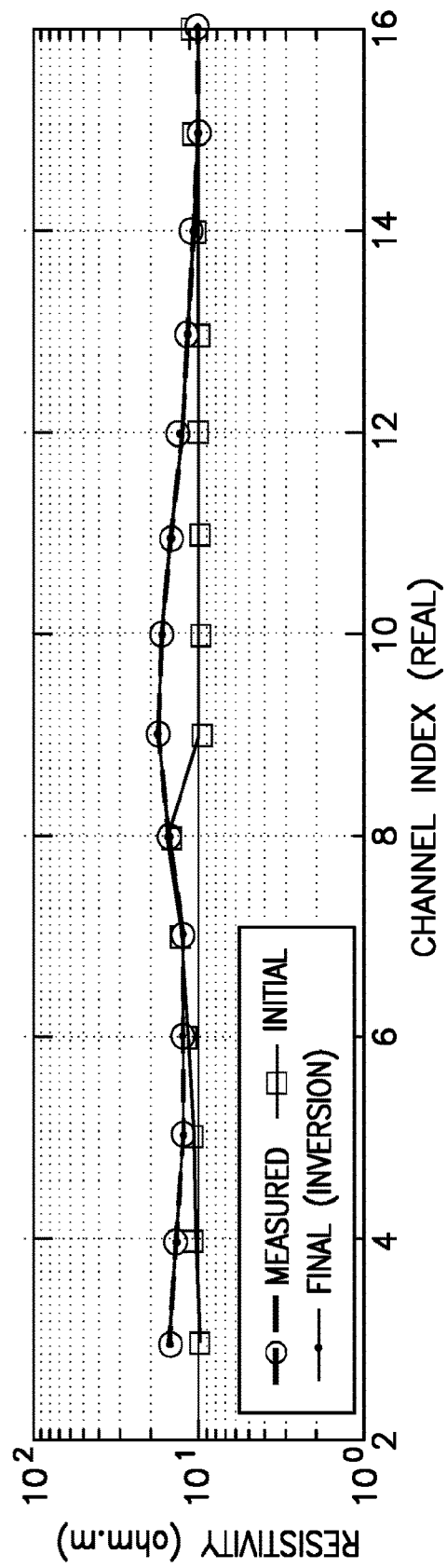

The sensitivities of the stiffness elements $C_{33}$, $C_{44}$, and $C_{55}$ of the effective stiffness matrix for the combined shale and sand zones (919) are shown in the plots of FIGS. 11A-11C and 12A-12D. To elucidate the impact of crack aspect ratio, FIGS. 11A-11C are for a formation with no shale, which shows that slow shear stiffness element $C_{44}$ is sensitive to crack aspect ratio. FIGS. 12A-12D is for 50% shale formation, and the behavior of this data is consistent with the TIV shaly sand effective stiffness matrices of FIGS. 5A-5C and 6A-6C, with shale pore shape impacting primarily the stiffness elements $C_{44}$ and $C_{55}$.

Examples for Synthetic Data

Here we present examples that employ the inversion processing of FIGS. 8A and 8B for noisy synthetic data. For all cases, the Archie parameters for the sand zone, wellbore diameter, mud properties, and mineralogy are known from independent preprocessing and given in Table 1 and 2 below.

TABLE 1

Parameters for synthetic examples

| Parameter | Value |
|---|---|
| Cementation exponent, m | 1.8 |
| Saturation exponent, n | 1.9 |
| Formation water resistivity, $R_w$ | 0.11 ohm · m |
| Shale pore aspect ratio, $\alpha_{shale}$ | 0.01 |
| Sand pore aspect ratio, $\alpha_{sand}$ | 0.1 |
| Sand macroporosity, $\phi_{sand}$ | 25% |
| Shale anisotropy ratio, $(R_v/R_h)_{shale}$ | 3.0 |
| Borehole diameter | 12.25 inch |
| Mud slowness | 265 \mu-sec/ft |
| Mud density | 1.00 g/cc |
| Mineralogy | quartz (sand), illite (shale) |
| Shale volume fraction, $V_{shale}$ | 5% |
| Clay conductivity | 10 mS/m |

TABLE 2

Elastic properties for different mineral and fluid components in synthetic examples

| Mineral or Fluid | Bulk Modulus (GPa) | Shear Modulus (GPa) | Density (g/cc) |
|---|---|---|---|
| Illite | 15.3 | 11.5 | 3.01 |
| Quartz | 37.0 | 44.0 | 2.65 |

TABLE 2-continued

Elastic properties for different mineral and fluid components in synthetic examples

| Mineral or Fluid | Bulk Modulus (GPa) | Shear Modulus (GPa) | Density (g/cc) |
|---|---|---|---|
| Water | 2.74 | — | 1.05 |
| Oil | 2.04 | — | 0.75 |
| Gas | 0.02 | — | 0.20 |

In these examples, the pore shape is constrained to be radially homogenous. Input data includes sonic slowness logs for Stoneley horizontal shear (DTST), shear (DTSH) and compressional (DTCO), triaxial induction data for axial and transverse couplings, and density data.

In the first two examples, the shale conductivities are computed from Archie's law and known anisotropy ratio for shale. In the third example, shale conductivities are computed from DEM given the clay conductivity matrix as input, and geometry of shale microstructure common to elastic and electromagnetic formation models. In all cases, the joint inversion does a good job of reconstructing porosity, fluid saturation, and pore shape of sand and shale zones. The initial guess does not match the measured data, whereas the final model from the inversion matches all the measured data.

The results for an oil-bearing formation drilled with oil-base mud, using Archie's Law to determine shale conductivity, are shown in FIGS. 13A-13J.

The results for a gas-bearing formation drilled with oil-base mud, using Archie's law to determine for shale conductivity, are shown in FIGS. 14A-14J.

The results for a gas-bearing formation drilled with oil-base mud, using DEM to determine shale conductivity, are shown in FIGS. 15A-15J. In these Figures, the final results of the inversion and the true model show good correspondence.

Figure 16:
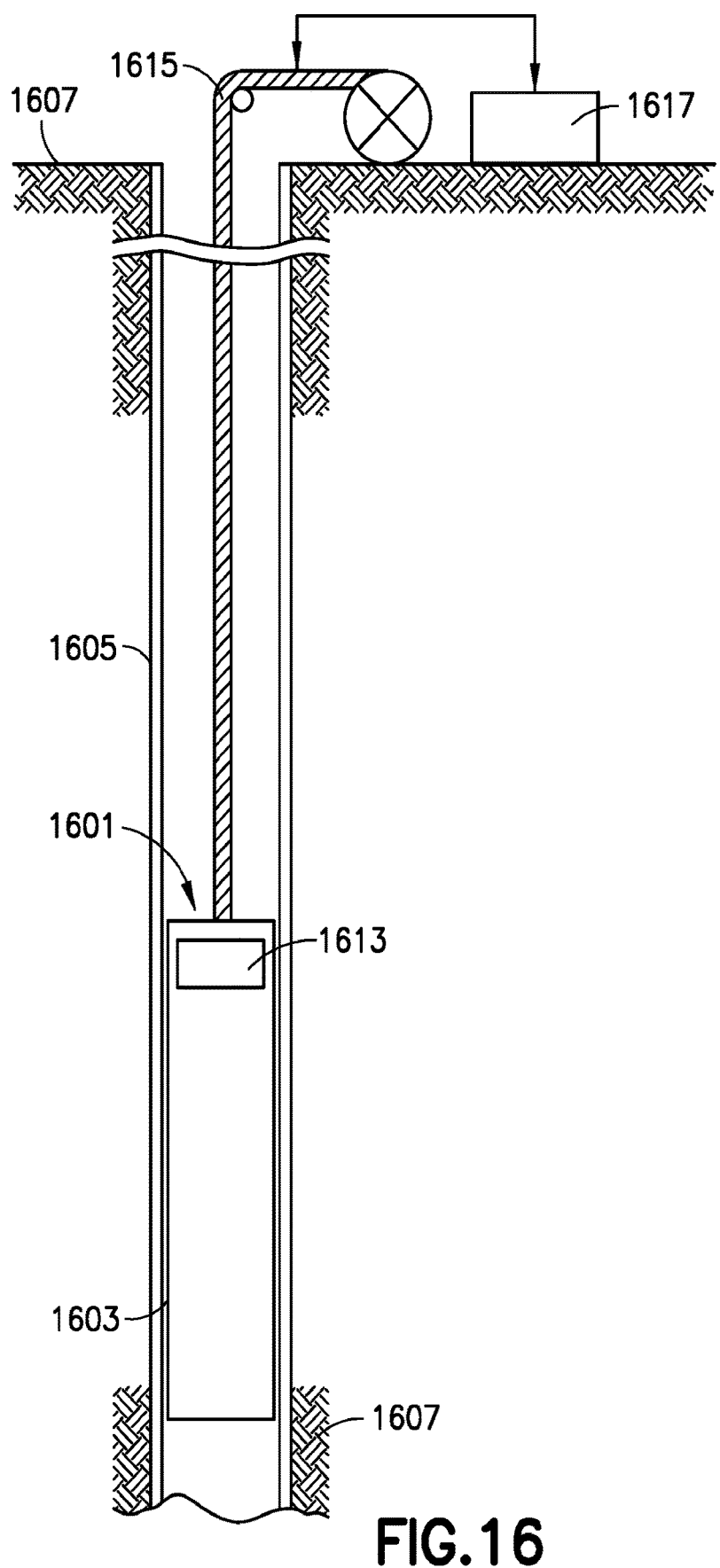
FIG. 16 illustrates an example downhole well logging system that is suitable for carrying out the example frameworks and workflows of FIGS. 1, 3, 7, 8A, 8B and/or 10.

FIG. 16 shows an example well logging system that is suitable for carrying out the workflows of FIGS. 1, 3, 7, 8A, 8B and/or 10. The system includes one or more downhole well logging instruments 1601 (one shown) with one or more housings 1603 (one shown) shaped and sealed to be moved along the interior of a well or wellbore 1605 that traverses a geological formation 1607. The housing(s) 1603 may contain measurement components for measuring resistivity data, sonic data (such as compression velocity and shear velocity) and density data of the geological formation 1607 as a function of radial direction at an interval-of-interest in the well or wellbore 1605.

By way of example, the measurement components contained with the housing(s) 1003 can include a monopole and dipole sonic logging module that measures sonic data that is sensitive to formation elastic properties at multiple radial depths of investigation (DOI) at an interval-of-interest within the well or wellbore 1605, with lower frequencies probing deeper into the geological formation 1607 than higher frequencies. The radial DOI of the sonic data measurement into the geological formation 1607 ranges from one-half of the well/wellbore diameter to three times the well/wellbore diameter. The vertical resolution of the sonic data measurement depends on the aperture of the receiver array, which ranges from six feet for the entire array, to one foot with sub-array, multi-shot processing.

The measurement components contained with the housing(s) 1603 can also include a triaxial array induction module that measures resistivity data that is sensitive to formation resistivity at multiple radial depths of investigation at an interval-of-interest within the wellbore 1605. High frequency and short spacing measurements probe shallower radially into the geological formation 1607 than low frequency and long spacing measurements. The radial DOI of the resistivity data measurement ranges from ten inches to ninety inches into the geological formation 1607. The vertical resolution of the resistivity data measurements ranges from one foot to four feet, with long spacing measurements having lower vertical resolution than short-spacing measurements.

The measurement components contained with the housing(s) 1603 can also include a gamma-gamma density module that measures density data that is sensitive to formation density at multiple radial depths of investigation at an interval-of-interest within the well or wellbore 1605. The radial DOI of the density data measurements ranges from one inch to three inches into the geological formation 1607. The vertical resolution of the density data measurements ranges from two inches to sixteen inches.

The housing(s) 1603 may also include acquisition and processing electronics 1613 that control the operation of the measurement components, storing data produced by the measurement components, processing the data and storing the results, and couple any desired portion of the data to telemetry components for transmission to the surface. The data may also be stored in the housing(s) 1603 and retrieved at the surface upon removal of the housing(s) 1603 from the well or wellbore 1605.

The housing(s) 1603 may be coupled to an armored electrical cable 1615 that may be extended into and retracted from the well or wellbore 1605. The well or wellbore 1605 may or may not include metal pipe or casing therein. The cable 1615 conducts electrical power to operate the electrical components of the instrument(s) 1601. The cable 1615 can also carry electrical signals between the acquisition and processing electronics 1613 of the instrument(s) 1601 and a surface-located data processing 1617. In alternate embodiments, coiled tubing or other conveyance mechanism can be used in place of the cable 1615 to convey the instrument(s) 1601 within the wellbore 1605.

Note that data processing operations of FIGS. 1, 3, 7, 8A, 8B and/or 10 can be carried out by the acquisition and processing electronics 1613 disposed within the housing(s) 1603, by the surface-located data processing system 1617, or by a combination of the acquisition and processing electronics 1613 and the surface-located data processing system 1617. The acquisition and processing electronics 1613 and/or the data processing system 1617 may include one or more digital-signal processors, one or more general purpose processors, and/or one or more computer or computer system as will be explained below with reference to FIG. 17 for analysis of the acquired data as well as devices for recording the acquired data with respect to position in the wellbore and/or time.

Figure 17:
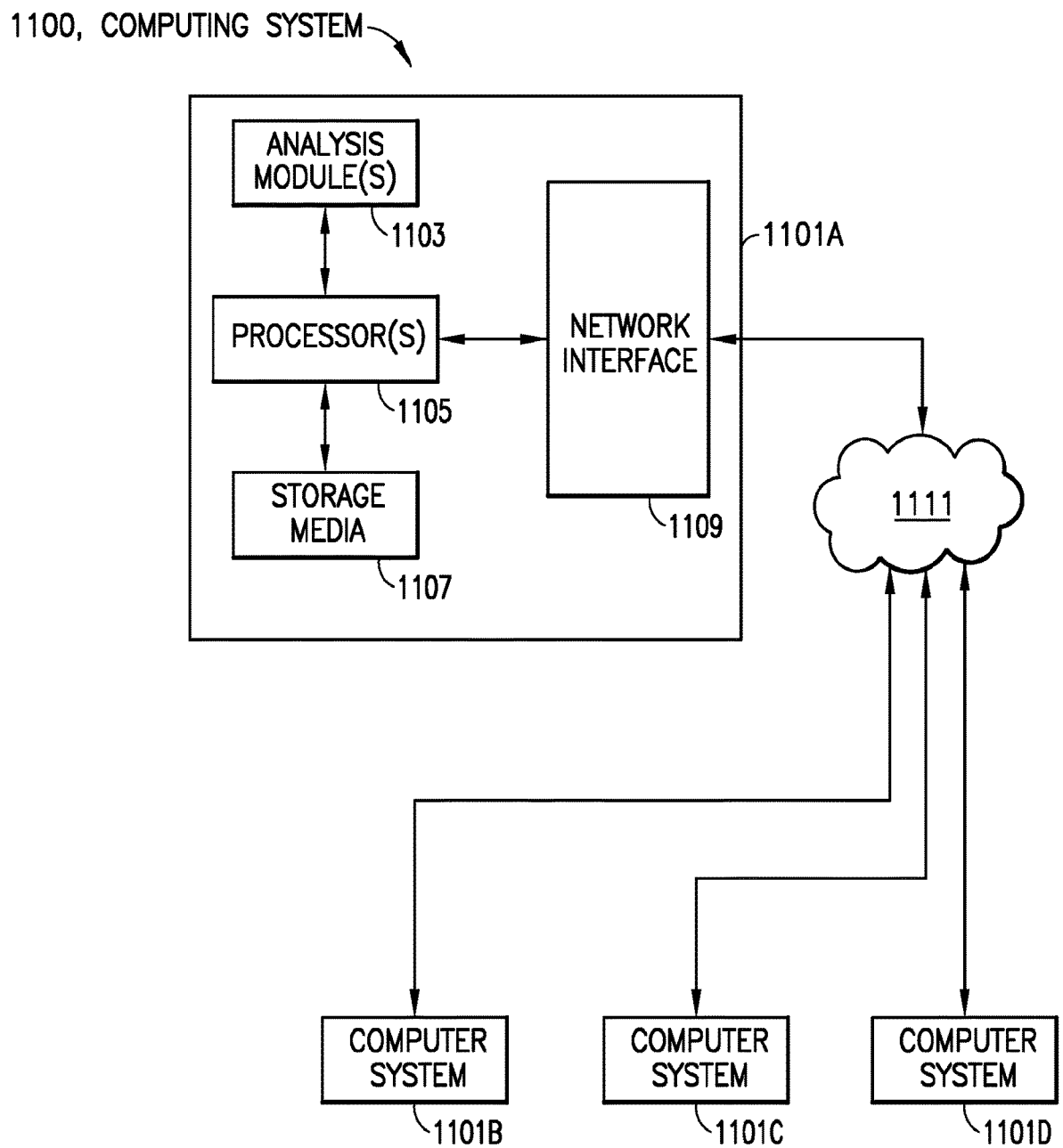
FIG. 17 illustrates an example computing system in accordance with some embodiments for carrying out the example frameworks and workflows of FIGS. 1, 3, 7, 8A, 8B and/or 10.

FIG. 17 shows an example computing system 1100 in accordance with some embodiments for carrying out the example workflow such as those to be explained above with reference to FIGS. 1, 3, 7, 8A, 8B and/or 10. The computing system 1100 can be an individual computer system 1101A or an arrangement of distributed computer systems. The computer system 1101A includes one or more analysis modules 1103 (a program of computer-executable instructions and associated data) that can be configured to perform various tasks according to some embodiments, such as the tasks described above. To perform these various tasks, an analysis module 1103 executes on one or more processors 1105, which is (or are) connected to one or more storage media 1107. The processor(s) 1105 can also be connected to a network interface 1109 to allow the computer system 1101A to communicate over a data network 1111 with one or more additional computer systems and/or computing systems, such as 1101B, 1101C, and/or 1101D. Note that computer systems 1101B, 1101C and/or 1101D may or may not share the same architecture as computer system 1101A, and may be located in different physical locations, e.g. computer systems 1101A and 1101B may be on a ship underway on the ocean, in a well logging unit disposed proximate a wellbore drilling, while in communication with one or more computer systems such as 1101C and/or 1101D that are located in one or more data centers on shore, other ships, and/or located in varying countries on different continents. Any one or more of the computer systems may be disposed in the well logging instrument (whether wireline as in FIG. 16 or LWD as in FIG. 18).

The processor 1105 can include a microprocessor, microcontroller, processor module or subsystem, programmable integrated circuit, programmable gate array, digital signal processor (DSP), or another control or computing device.

The storage media 1107 can be implemented as one or more non-transitory computer-readable or machine-readable storage media. Note that while in the embodiment of FIG. 17, the storage media 1107 is depicted as within computer system 1101A, in some embodiments, storage media 1107 may be distributed within and/or across multiple internal and/or external enclosures of computing system 1101A and/or additional computing systems. Storage media 1107 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 1103 can be provided on one computer-readable or machine-readable storage medium of the storage media 1107, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

Figure 18:
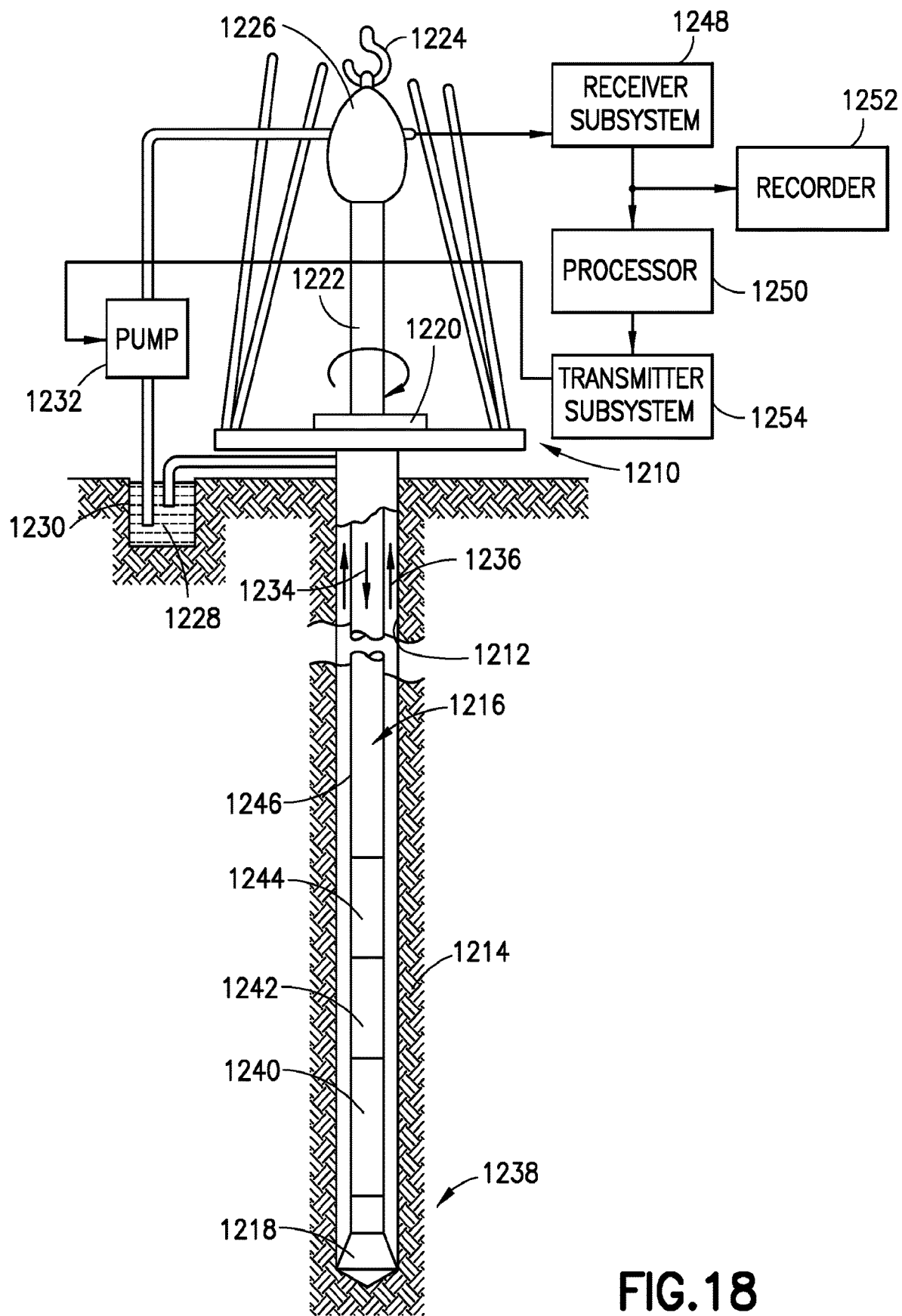
FIG. 18 illustrates an example logging-while-drilling (LWD) system that is suitable for carrying out the example frameworks and workflows of FIGS. 1, 3, 7, 8A, 8B and/or 10.

It should be appreciated that computing system 1100 is only one example of a computing system, and that computing system 1100 may have more or fewer components than shown, may combine additional components not depicted in the embodiment of FIG. 18, and/or computing system 1100 may have a different configuration or arrangement of the components depicted in FIG. 17. The various components shown in FIG. 17 may be implemented in hardware, software, or a combination of both hardware and software, including one or more signal processing and/or application specific integrated circuits.

Further, the operations of the workflow described above may be implemented by running one or more functional modules in information processing apparatus such as general-purpose processors or application specific chips, such as ASICs, FPGAs, PLDs, SOCs, or other appropriate devices. These modules, combinations of these modules, and/or their combination with general hardware are all included within the scope of protection of the invention.

FIG. 18 shows an example logging-while-drilling (LWD) system that is suitable for carrying out the workflows of FIGS. 1, 3, 7, 8A, 8B and/or 10. In this system, a platform and derrick 1210 are positioned over a wellbore 1212 that may be formed in the geological formation 1214 by rotary drilling. A drill string 1216 may be suspended within the wellbore 1212 and may include a drill bit 1218 attached thereto and rotated by a rotary table 1220 (energized by means not shown), which engages a kelly 1222 at the upper end of the drill string 1216. The drill string 1216 is typically suspended from a hook 1224 attached to a traveling block (not shown). The kelly 1222 may be connected to the hook 1224 through a rotary swivel 1226 which permits rotation of the drill string 1216 relative to the hook 1224. Alternatively, the drill string 1216 and drill bit 1218 may be rotated from the surface by a "top drive" type of drilling rig.

Drilling fluid or mud 1228 is contained in a mud pit 1230 adjacent to the derrick 1210. A pump 1232 pumps the drilling fluid 1228 into the drill string 1216 via a port in the swivel 1226 to flow downward (as indicated by the flow arrow 1234) through the center of the drill string 1216. The drilling fluid exits the drill string via ports in the drill bit 1218 and then circulates upward in the annular space between the outside of the drill string 1216 and the wall of the wellbore 1212, as indicated by the flow arrows 1236. The drilling fluid 1228 thereby lubricates the drill bit 1218 and carries formation cuttings to the surface. At the surface, the drilling fluid 1228 is returned to the mud pit 1230 for recirculation. If desired, a directional drilling assembly (not shown) could also be employed.

A bottom hole assembly ("BHA") 1238 may be mounted within the drill string 1216, preferably near the drill bit 1218. The BHA 1238 may include subassemblies for making measurements, processing and storing information and for communicating with surface-located components. Such measurements may correspond to those made using the instrument 1601 as explained above with reference to FIG. 16. The BHA 1238 is typically located within several drill collar lengths of the drill bit 1218. In the illustrated BHA 1238, a stabilizer collar section 1240 is shown disposed immediately above the drill bit 1218, followed in the upward direction by a drill collar section 1242, another stabilizer collar section 1244 and another drill collar section 1246. This arrangement of drill collar sections and stabilizer collar sections is illustrative only, and other arrangements of components in any implementation of the BHA 1238 may be used. The need for or desirability of the stabilizer collars will depend on drilling conditions as well as on the demands of the measurement.

In the arrangement shown in FIG. 18, the measurement components of the well logging instrument may be located in the drill collar section 1242 above the stabilizer collar 1240. Such components could, if desired, be located closer to or farther from the drill bit 1218, such as, for example, in either stabilizer collar section 1240 or 1244 or the drill collar section 1246.

The BHA 1238 may also include a telemetry subassembly (not shown) for data and control communication with surface-located components. Such telemetry subassembly may be of any suitable type, e.g., a mud pulse (pressure or acoustic) telemetry system, wired drill pipe, etc., which receives output signals from LWD measuring instruments in the BHA 1238) and transmits encoded signals representative of such outputs to the surface where the signals are received and decoded in a receiver subsystem 1248, and supplied to a processor 1250 and/or a recorder 1252. A surface transmitter subsystem 1254 may also be provided for establishing communication with the BHA 1238.

Power for the LWD instrumentation of the BHA 1238 may be provided by battery or, as known in the art, by a turbine generator disposed in the BHA 1238 and powered by the flow of drilling fluid. The LWD instrumentation may also include directional sensors (not shown separately) that make measurements of the geomagnetic orientation or geodetic orientation of the BHA 1238 and the gravitational orientation of the BHA 1238, both rotationally and axially.

Note that data processing operations of FIGS. 1, 3, 7, 8A, 8B and/or 10 can be carried out by the acquisition and processing electronics of the BHA 1238, by the surface-located data processor 1250, or by a combination of the acquisition and processing electronics of the BHA 1238 and the surface-located processor 1250. The acquisition and processing electronics of the BHA 1238 and/or the processor 1250 may include one or more digital-signal processors, one or more general purpose processors, and/or one or more computer or computer system as discussed above with reference to FIG. 17 for analysis of the detected signals as well as devices for recording the signals communicated from the BHA 1238 with respect to position in the wellbore and/or time.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A method for determining properties of a laminated formation traversed by a well or wellbore, comprising:
    obtaining measured sonic data, resistivity data, and density data for an interval-of-interest of the laminated formation;
deriving a formation model that describes properties of the laminated formation at the interval-of-interest, wherein the formation model represents the laminated formation at the interval-of-interest as first and second zones of different first and second rock types, wherein the first zone comprises a TIV (transverse isotropic with vertical axis of symmetry) rock medium; and the second zone comprises an isotropic rock medium or HTI (transverse isotropic with horizontal axis of symmetry) rock medium, and wherein the TIV rock medium of the first zone comprises shale, and the isotropic rock medium of the second zone comprises sand with randomly-oriented macropores; the properties of the laminated formation at the interval-of-interest include a radial profile of at least one parameter representing pore shape for the shale of the first zone, a radial profile of at least one parameter representing pore shape for the randomly-oriented macropores of the sand of the second zone, and a parameter representing a bulk modulus for fluid that saturates the randomly-oriented macropores of the sand of the second zone; the at least one parameter representing pore shape for the shale of the first zone preferably comprises a pore aspect ratio for the shale of the first zone; and the at least one parameter representing pore shape for the randomly-oriented macropores of the sand of the second zone preferably comprises a pore aspect ratio for the randomly-oriented macropores of the sand of the second zone;
    using the formation model to derive simulated sonic data, resistivity data, and density data for the interval-of-interest; and
    using the measured sonic data, resistivity data, and density data for the interval-of-interest and the simulated sonic data, resistivity data, and density data for the interval-of-interest to refine the formation model and determine properties of the laminated formation at the interval-of-interest.

2. The method of claim 1, wherein:
the second zone comprises an HTI rock medium having microcracks aligned in a predefined orientation; and
the properties of the laminated formation at the interval-of-interest include a radial profile of at least one parameter representing pore shape for the microcracks of the second zone and a bulk modulus for fluid that saturates the microcracks of the second zone.

3. The method of claim 2, wherein:
the at least one parameter representing pore shape for the microcracks of the second zone comprises a pore aspect ratio for the microcracks of the second zone.

4. The method of claim 1, wherein:
the properties of the laminated formation at the interval-of-interest further include at least one of a radial profile of water saturation, a radial profile of gas saturation, a radial profile of oil saturation, and formation porosity.

5. The method of claim 1, further comprising:
determining a radial profile of effective stiffness data for a combined first and second zones of the formation model by
    i) determining first stiffness data for the first zone at a given radial dimension,
    ii) determining second stiffness data for the second zone at the given radial dimension,
    iii) combining the first stiffness data and the second stiffness data to produce effective stiffness data for the combined first and second zones at the given radial dimension, and
    iv) repeating the operations of i) to iii) for a plurality of radial dimensions; and
using the radial profile of the effective stiffness data to derive the simulated sonic data and simulated density data for the interval-of-interest.

6. The method of claim 5, wherein:
the first stiffness data comprises a first stiffness matrix that is based on information that specifies a pore shape of the first zone;
the second stiffness data comprises a second stiffness matrix that is based on information that specifies a pore shape of the second zone; and
the second stiffness matrix for the second zone is preferably based on a stiffness matrix for the rock medium of the second zone assuming the rock medium of the second zone is dry and calculations that modify such stiffness matrix to account for fluid that saturates pore space of the rock medium of the second zone.

7. The method of claim 1, further comprising:
determining a radial profile of effective resistivity data for a combined first and second zones of the formation model by
    i) determining first resistivity data for the first zone at a given radial dimension,
    ii) determining second resistivity data for the second zone at the given radial dimension, iii) combining the first resistivity data and the second resistivity data to produce effective stiffness data for the combined first and second zones at the given radial dimension, and iv) repeating the operations of i) to iii) for a plurality of radial dimensions; and using the radial profile of the effective resistivity data to derive the simulated resistivity data for the interval-of-interest.

8. The method of claim 7, wherein:

the first resistivity data is based on information that specifies a pore shape of the first zone; and the second resistivity data is based on information that specifies a pore shape of the second zone.

9. The method of claim 1, further comprising:

using a first petrophysical transform to derive a radial profile of an effective anisotropic resistivity for the combined first and second zones;

using a tool response simulator to derive the simulated resistivity data for the interval-of-interest based on the radial profile of effective anisotropic resistivity for the interval-of-interest;

using a second petrophysical transform to derive a radial profile of an effective stiffness matrix for a combined first and second zones and a radial profile of density of the combined first and second zones; and using at least one tool response simulator to derive the simulated sonic data for the interval-of-interest based on the radial profile of the effective stiffness matrix and the radial profile of density for the interval-of-interest.

10. The method of claim 9, wherein:

the second petrophysical transform is based on a rock physics model.

11. The method of claim 9, further comprising:

using a tool response simulator to derive the simulated density data for the interval-of-interest based on the radial profile of density for the interval-of-interest.

12. The method of claim 11, wherein:

the second petrophysical transform is based on a rock physics model or a density model.

13. The method of claim 1, further comprising:

(i) determining initial estimates for parameters of the formation model representing formation porosity, pore shape of the first zone, pore shape of the second zone, water saturation, and gas saturation for the interval-of-interest based on joint inversion of the measured sonic data and measured density data for the interval-of-interest;

(ii) determining an initial estimate for radial profile of water saturation for the interval-of-interest based the parameters of the formation model determined in i) in conjunction with inversion of the measured resistivity data for the interval-of-interest;

(iii) determining initial estimates for a radial profile of gas saturation, a radial profile of pore shape of the first zone, and a radial profile of pore shape of the second zone for the interval-of-interest based on the parameters of the formation model determined in ii) in conjunction with joint inversion of the measured sonic data and the measured density data for the interval-of-interest; and (iv) determining a final radial profile of formation porosity, a final radial profile of water saturation, a final radial profile of gas saturation, a final radial profile of pore shape of the first zone, and a final radial profile of pore shape of the second zone for the interval-of-interest based on the parameters of the formation model determined in iii) in conjunction with joint inversion of the measured resistivity data, the measured sonic data and the measured density data for the interval-of-interest.

14. The method of claim 1, further comprising:

using a downhole tool to derive the measured sonic data, resistivity data, and density data for the interval-of-interest.

15. The method of claim 14, wherein:

the downhole tool is one of a wireline tool and a logging-while-drilling tool.

16. A data processor programmed to determine properties of a laminated formation traversed by a well or wellbore by:

obtaining measured sonic data, resistivity data, and density data for an interval-of-interest of the laminated formation;

deriving a formation model that describes properties of the laminated formation at the interval-of-interest, wherein the formation model represents the laminated formation at the interval-of-interest as first and second zones of different first and second rock types, wherein the first zone comprises a TIV (transverse isotropic with vertical axis of symmetry) rock medium; and the second zone comprises an isotropic rock medium or HTI (transverse isotropic with horizontal axis of symmetry) rock medium, and wherein the TIV rock medium of the first zone comprises shale, and the isotropic rock medium of the second zone comprises sand with randomly-oriented macropores; the properties of the laminated formation at the interval-of-interest include a radial profile of at least one parameter representing pore shape for the shale of the first zone, a radial profile of at least one parameter representing pore shape for the randomly-oriented macropores of the sand of the second zone, and a parameter representing a bulk modulus for fluid that saturates the randomly-oriented macropores of the sand of the second zone; the at least one parameter representing pore shape for the shale of the first zone preferably comprises a pore aspect ratio for the shale of the first zone; and the at least one parameter representing pore shape for the randomly-oriented macropores of the sand of the second zone preferably comprises a pore aspect ratio for the randomly-oriented macropores of the sand of the second zone;

using the formation model to derive simulated sonic data, resistivity data, and density data for the interval-of-interest; and using the measured sonic data, resistivity data, and density data for the interval-of-interest and the simulated sonic data, resistivity data, and density data for the interval-of-interest to refine the formation model and determine properties of the laminated formation at the interval-of-interest.

17. The data processor of claim 16, wherein:

the rock medium of the second zone further comprises microcracks aligned in a predefined orientation; and the properties of the laminated formation at the interval-of-interest include a radial profile of at least one parameter representing pore shape for the microcracks of the second zone and a bulk modulus for fluid that saturates the microcracks of the second zone.

* * * * *